Figure 1:
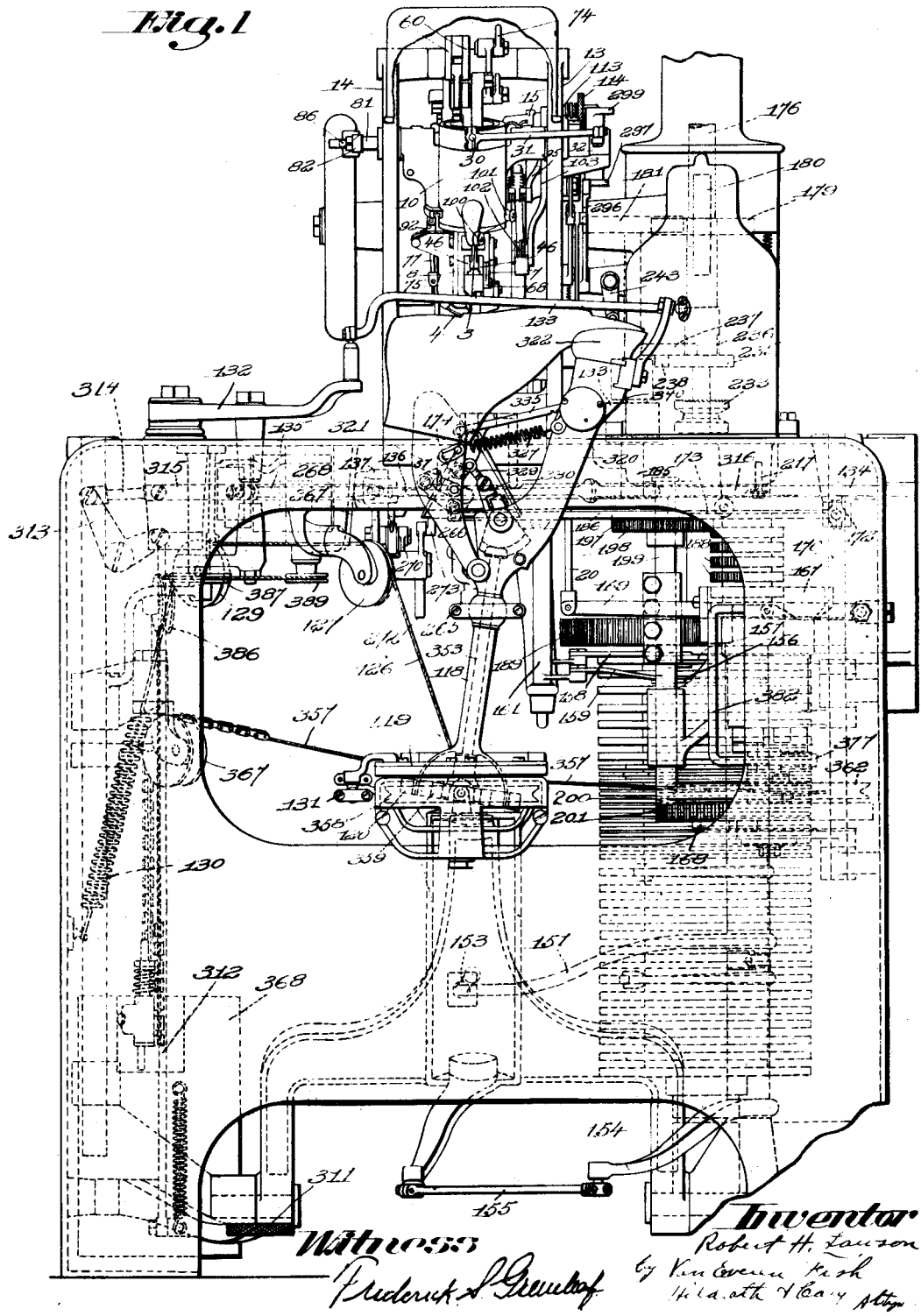

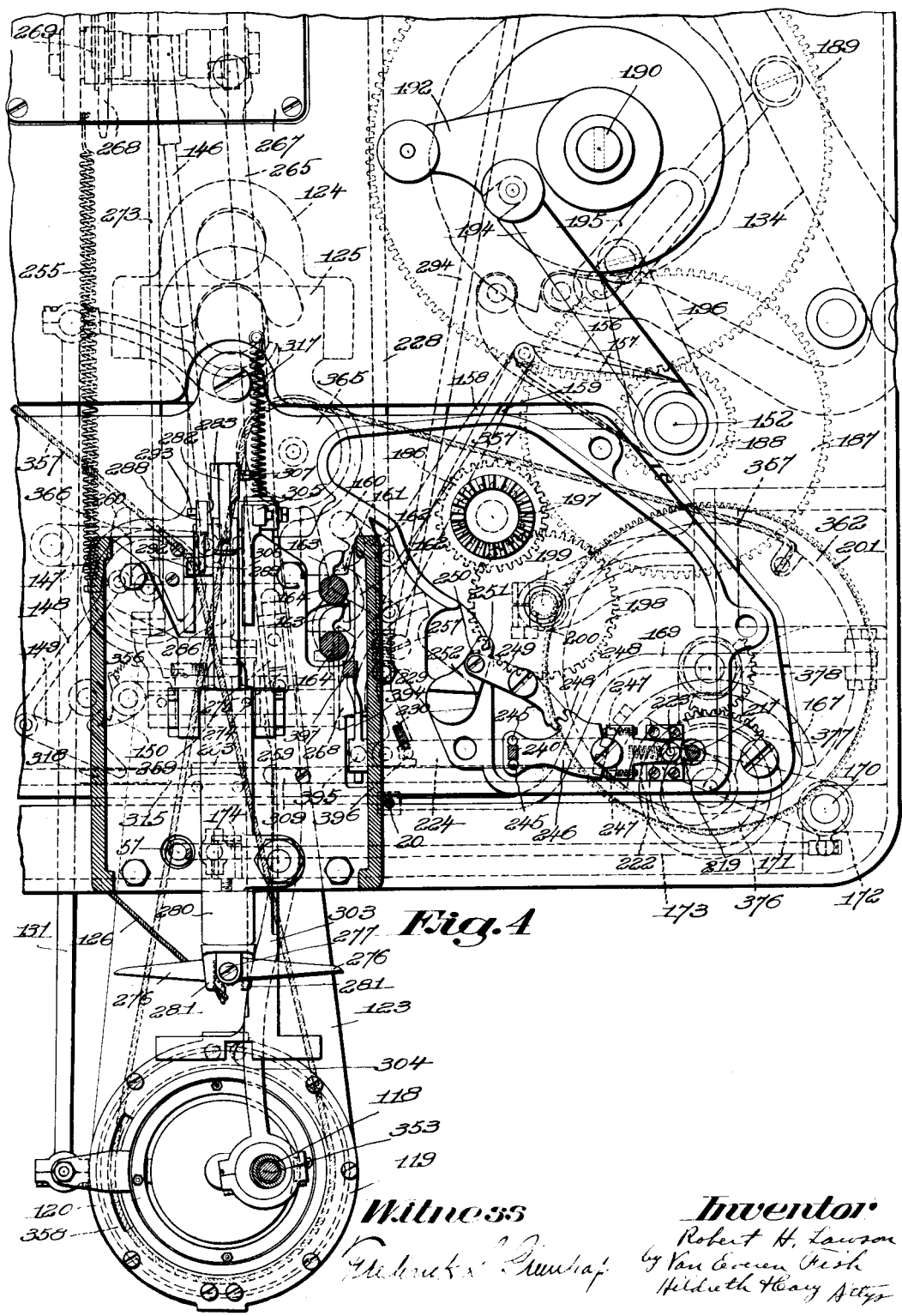

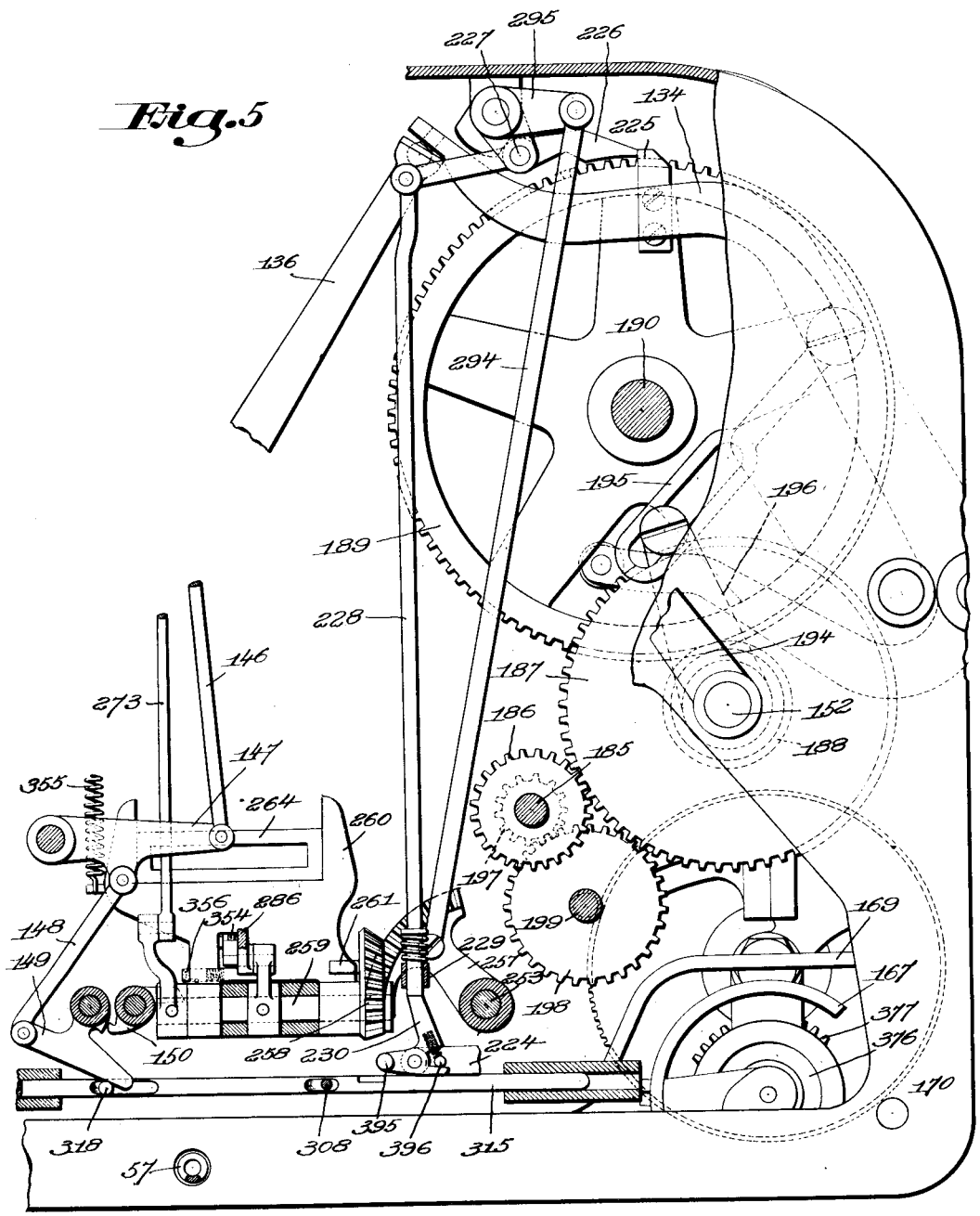

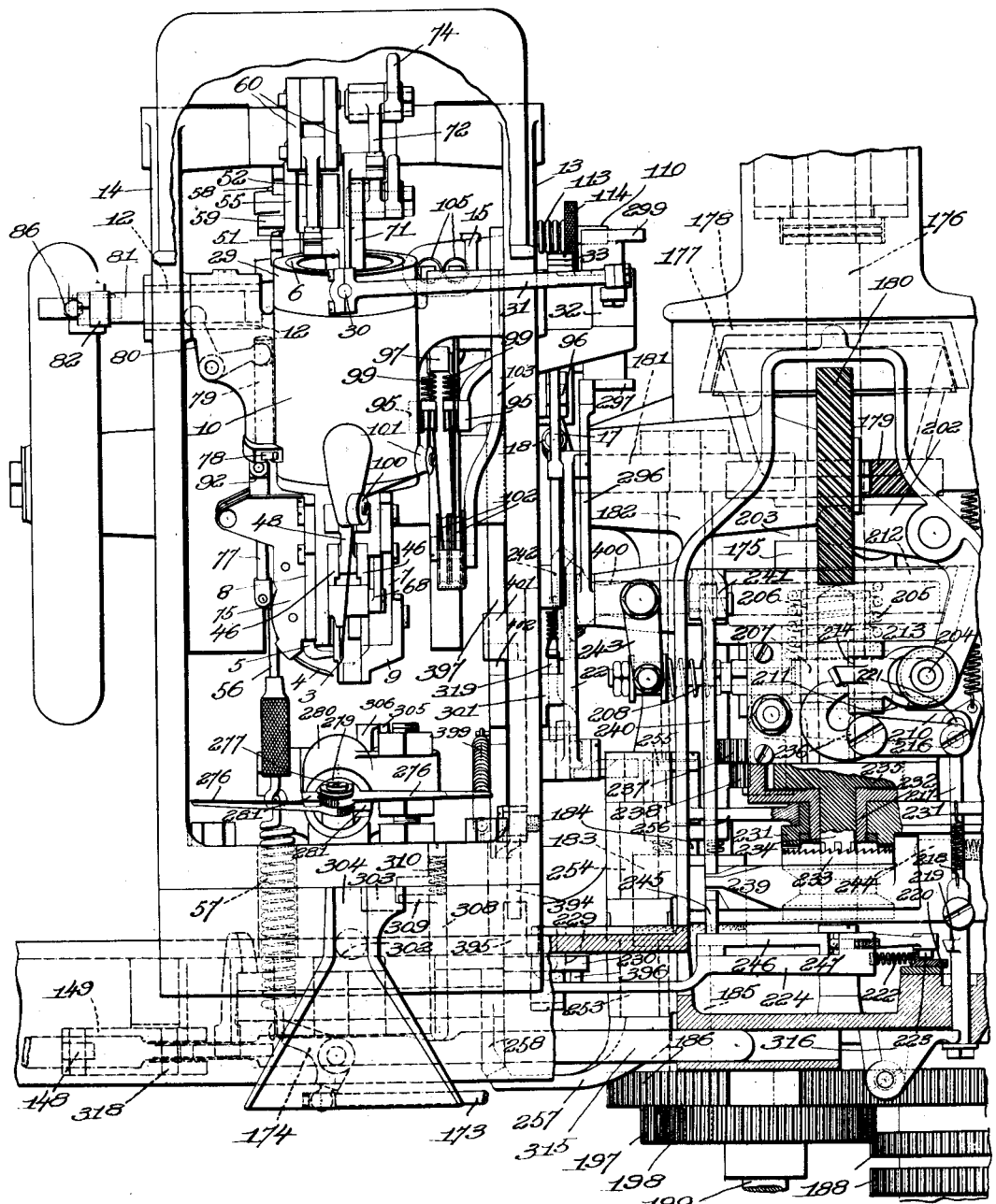

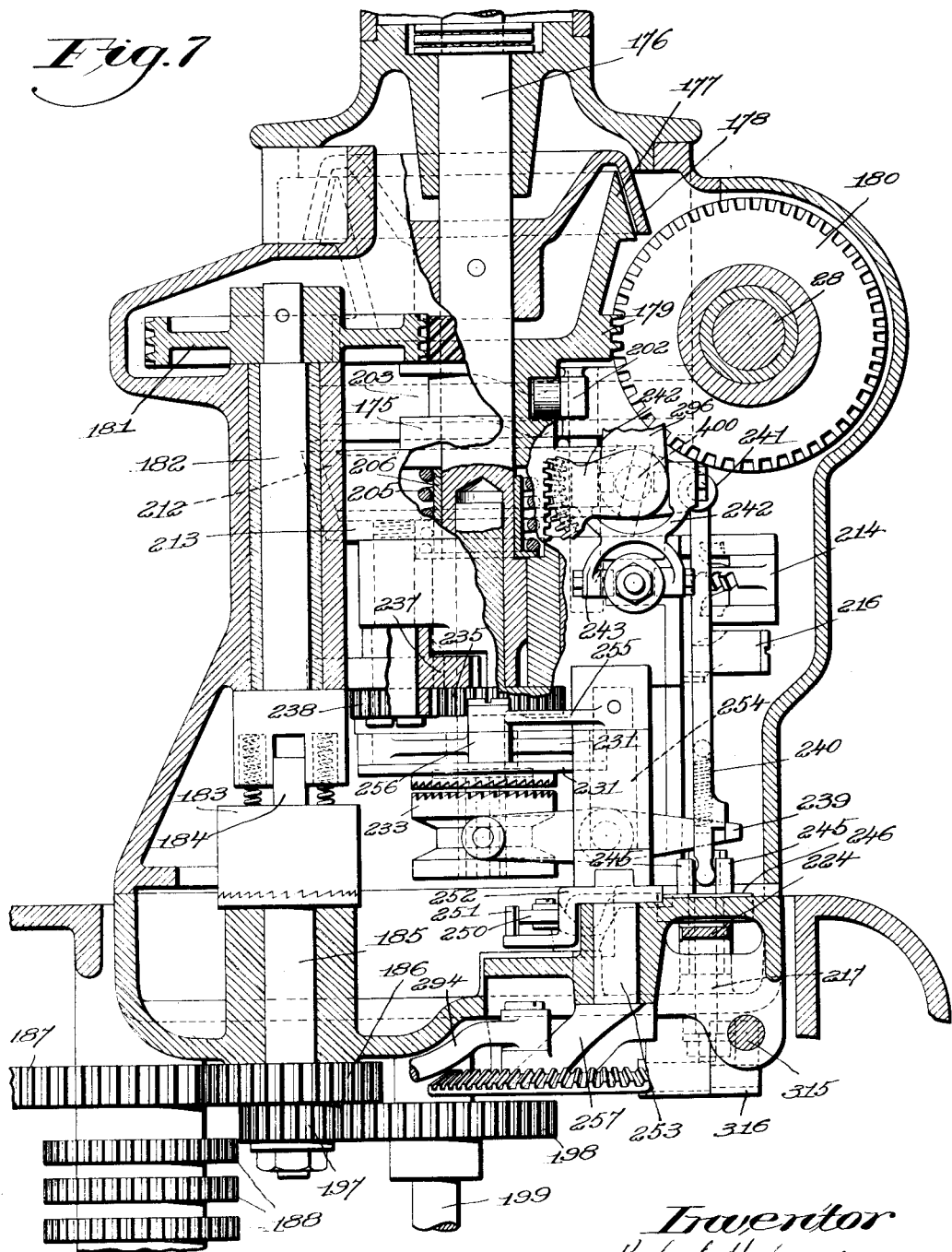

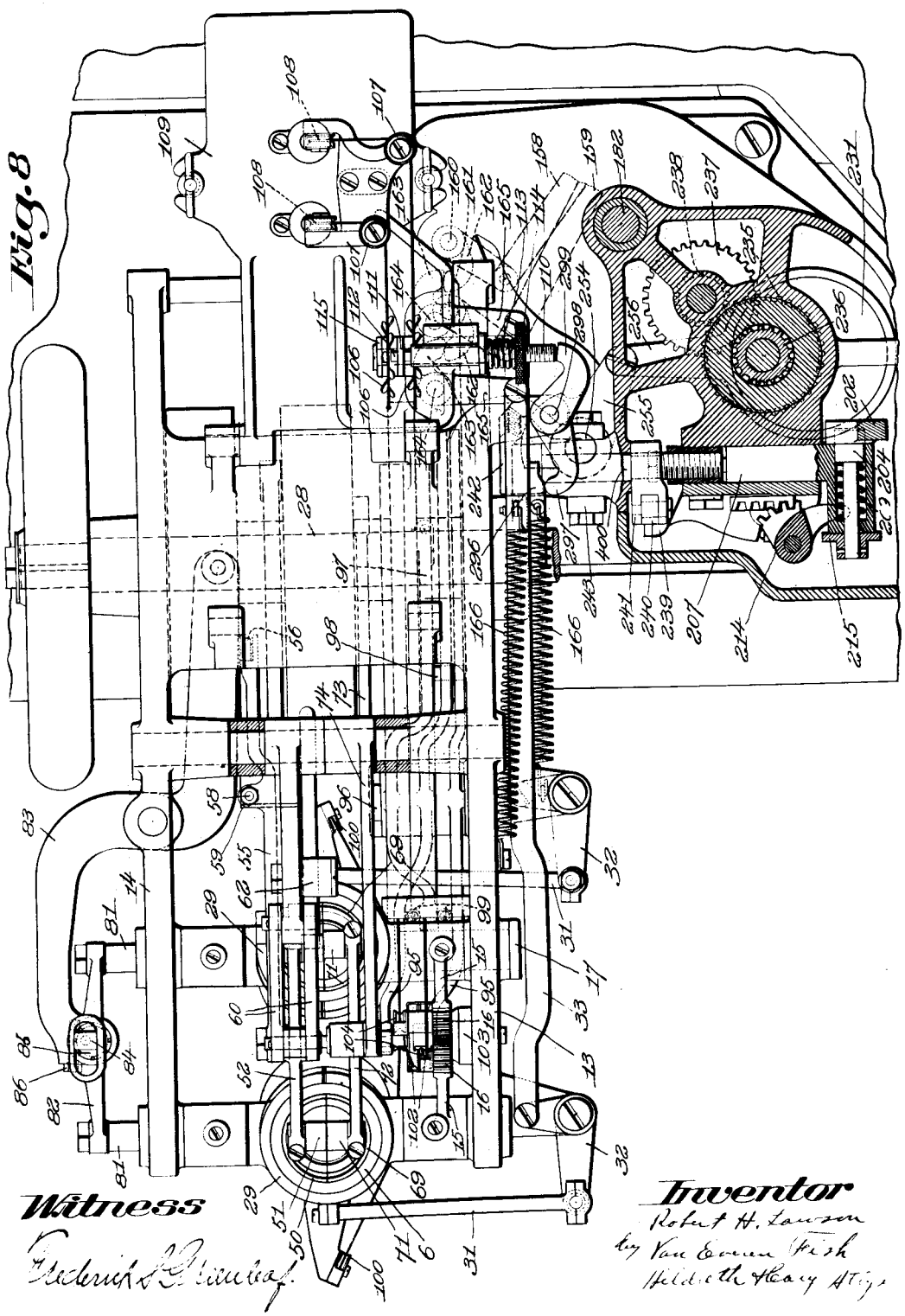

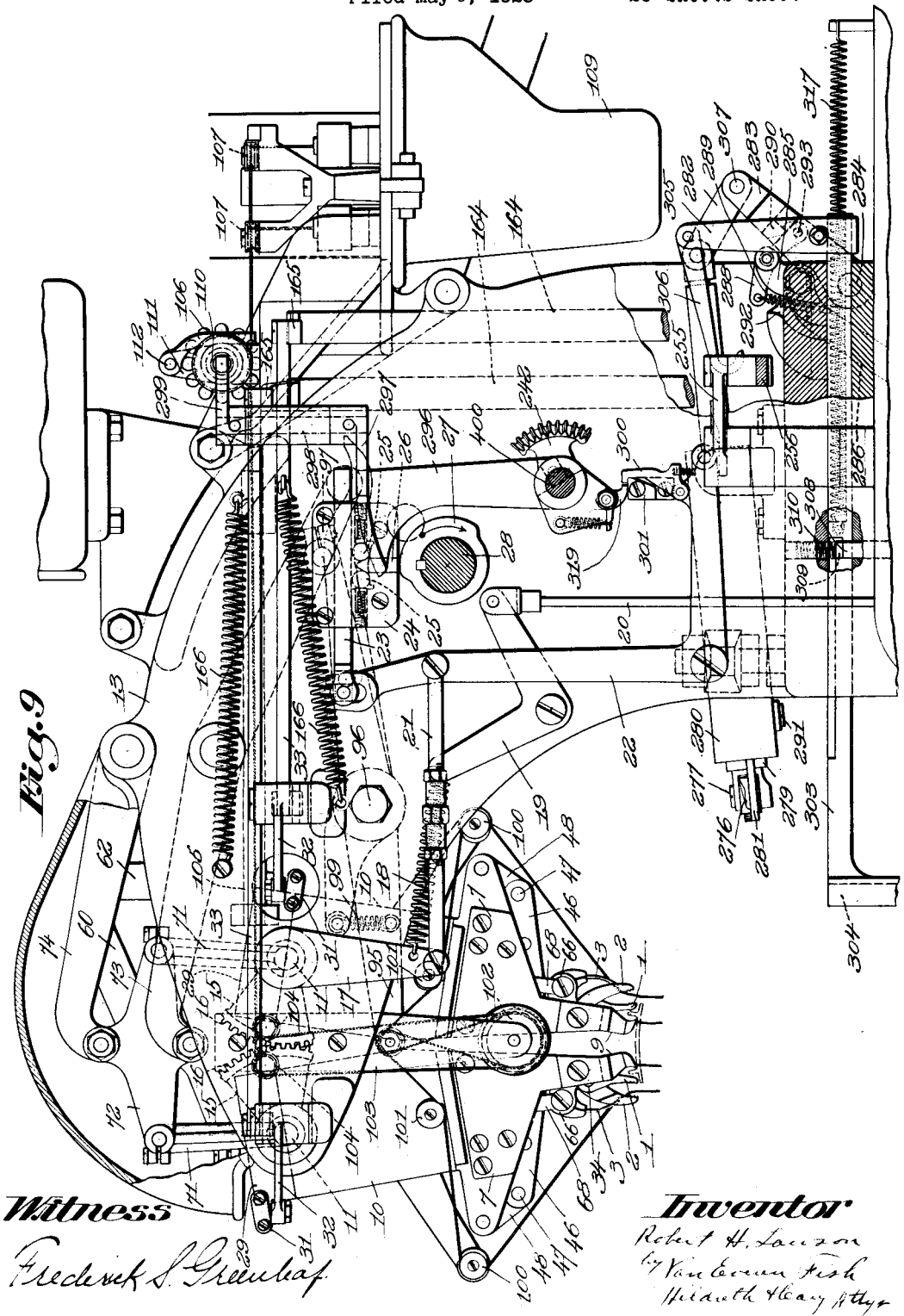

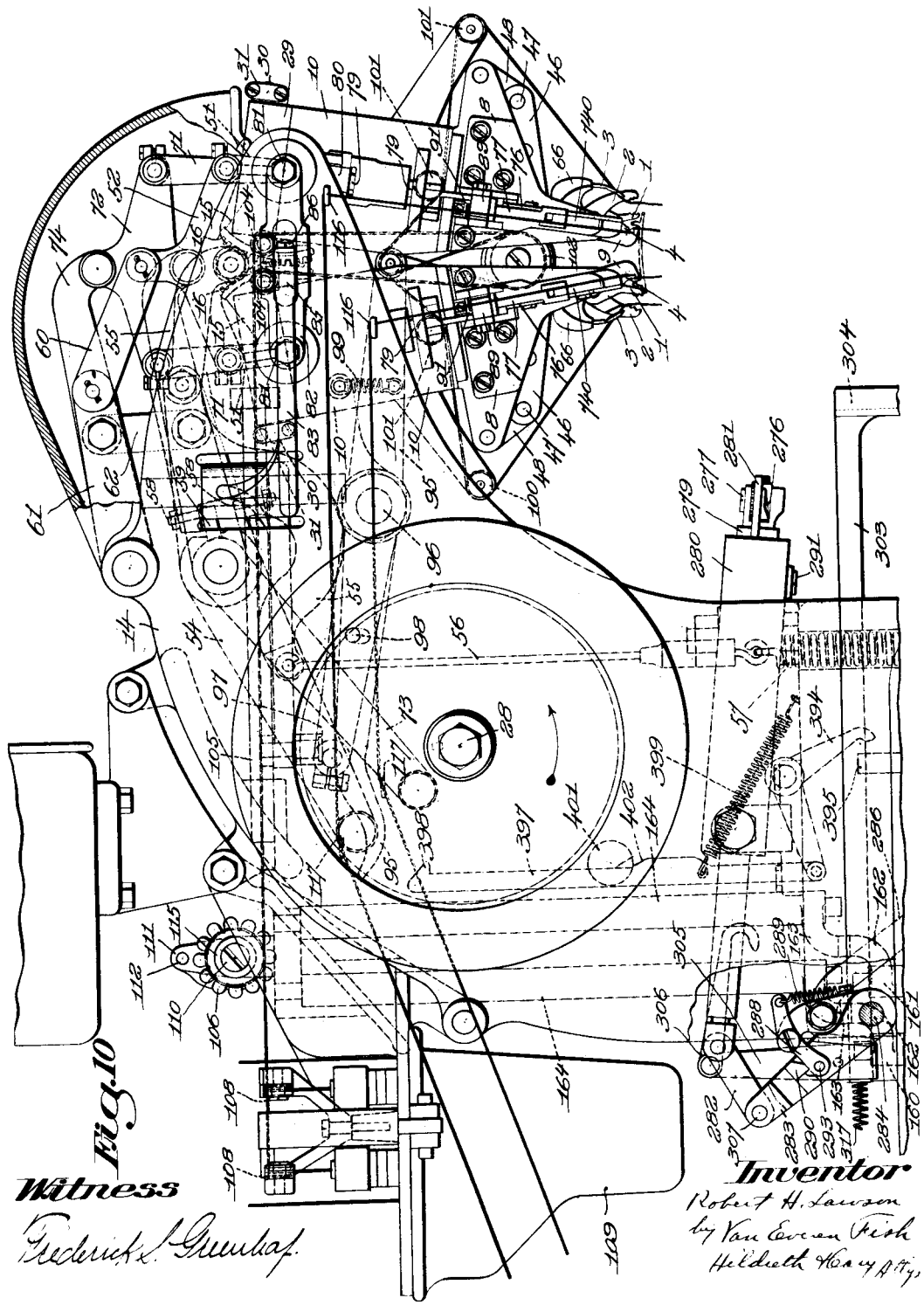

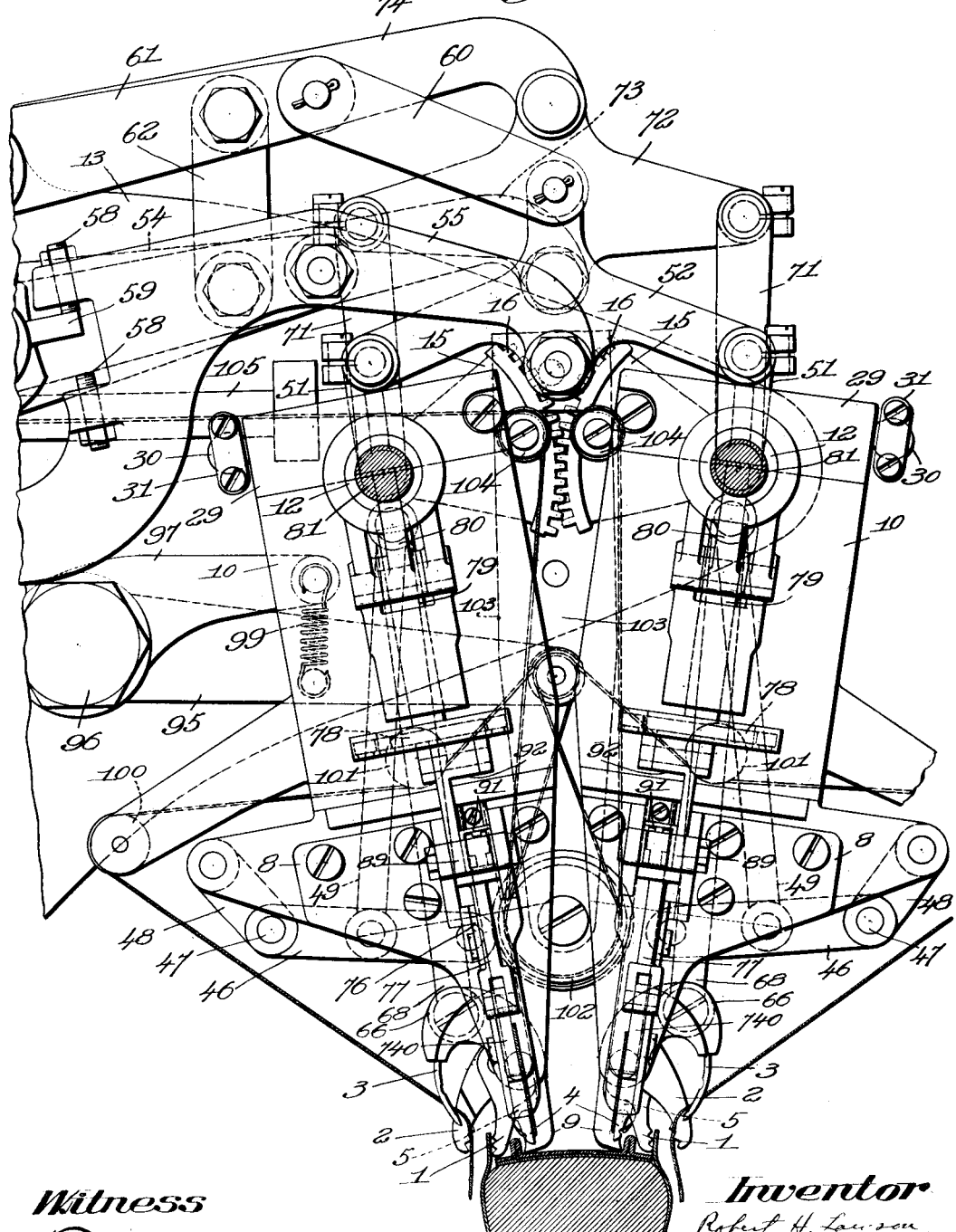

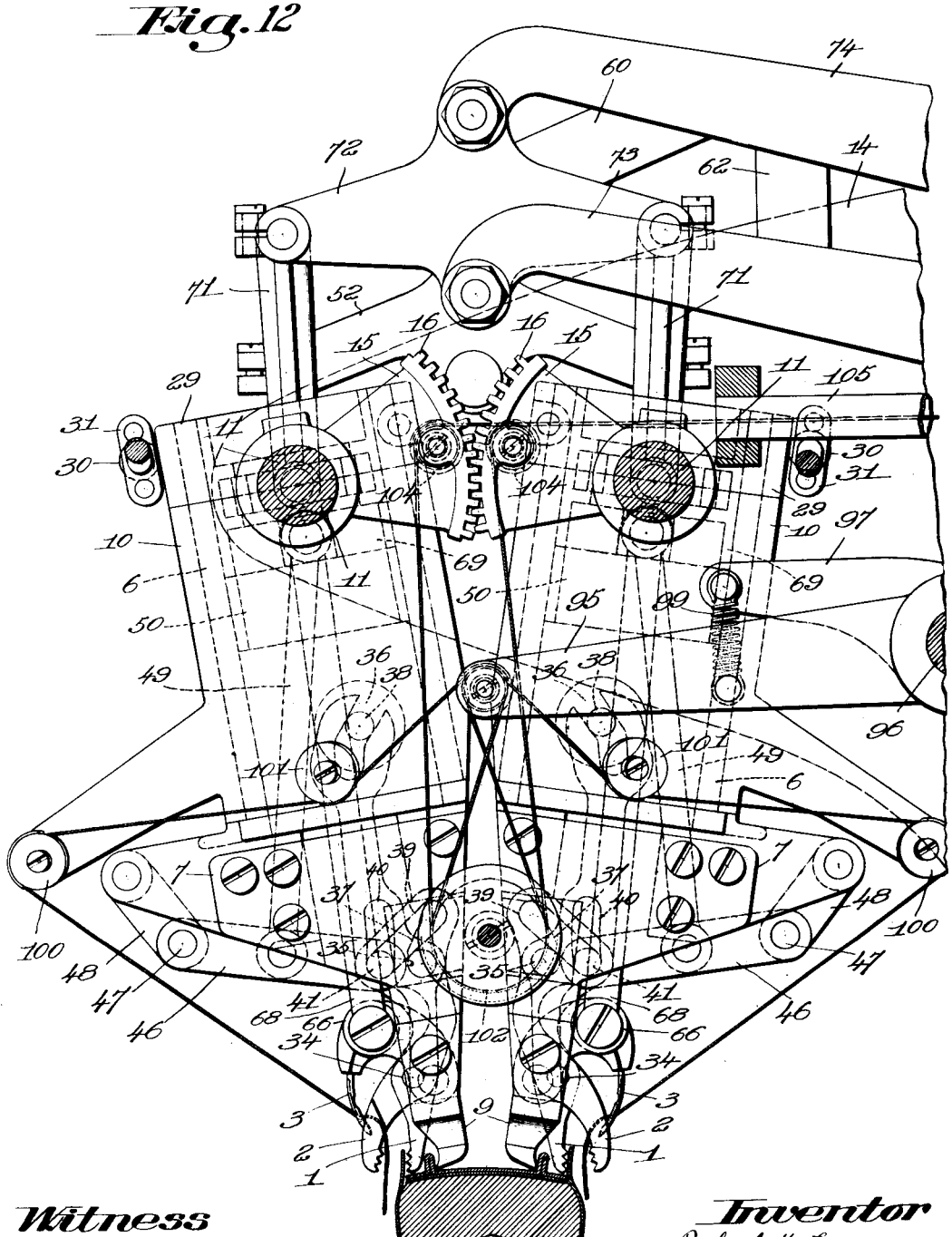

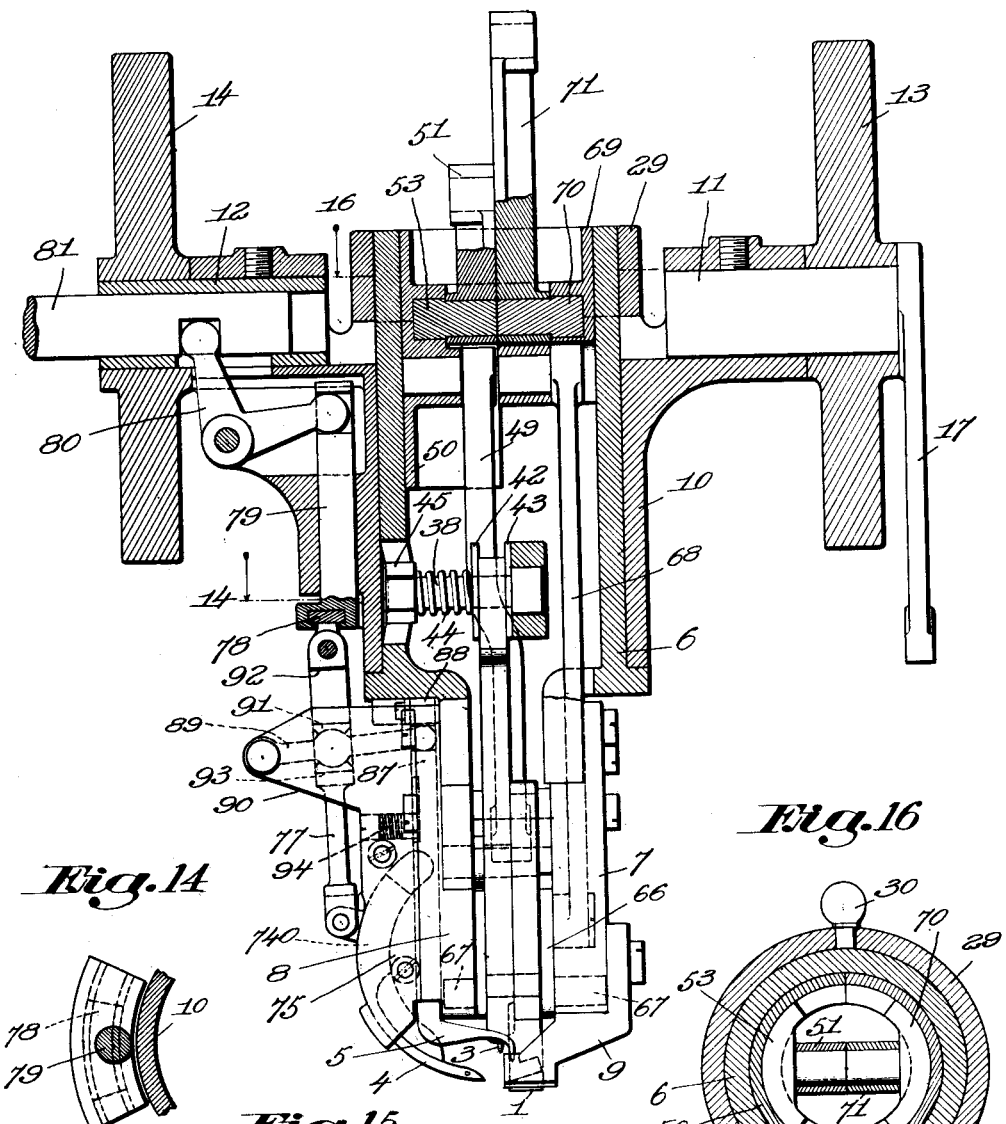

March 26, 1929.　　　R. H. LAWSON　　　1,706,619
MACHINE FOR AND METHOD OF MAKING SHOES
Filed May 9, 1923　　　26 Sheets-Sheet 14
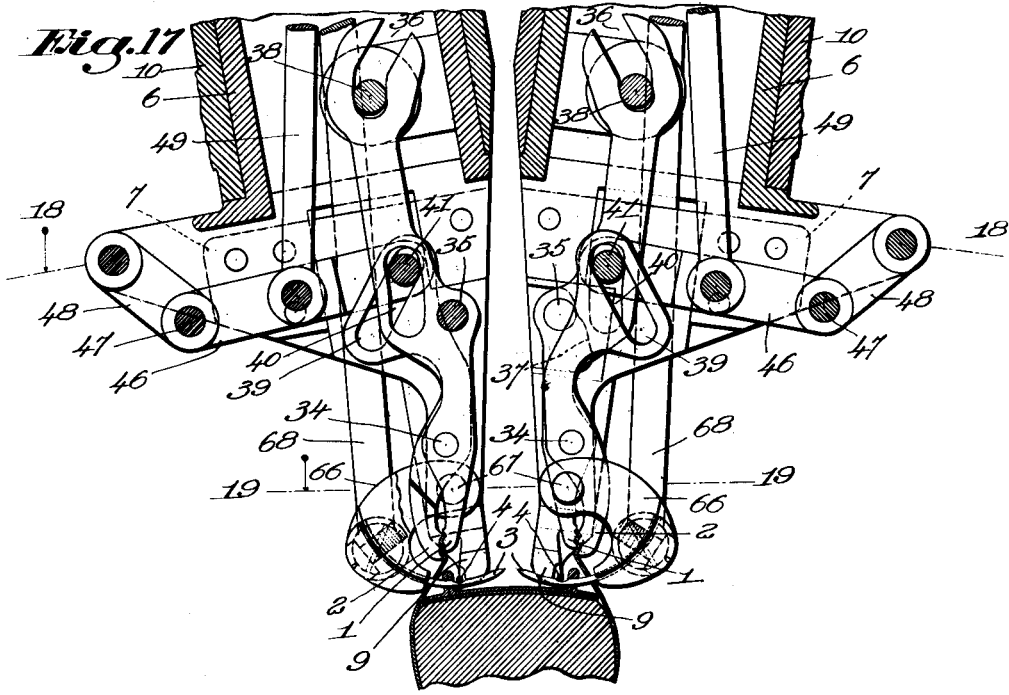
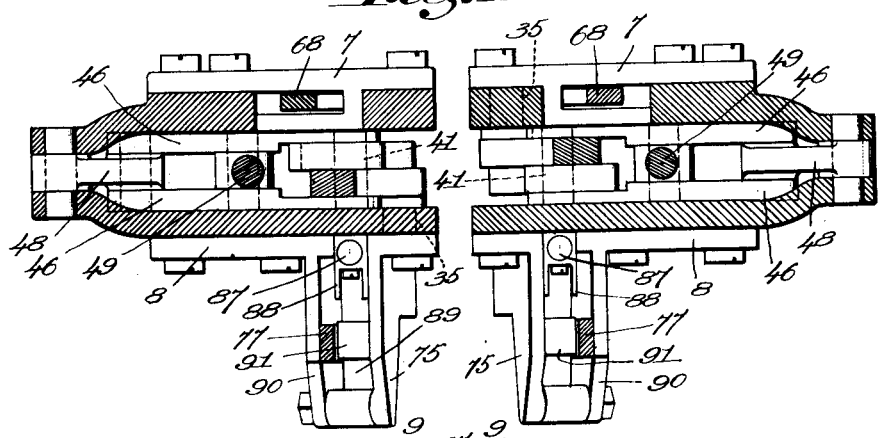
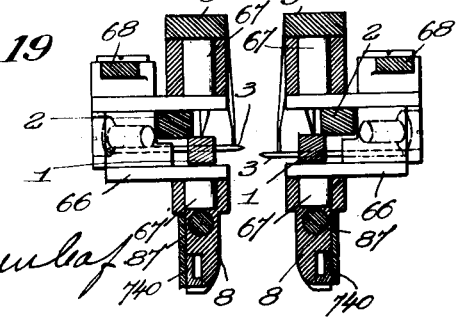

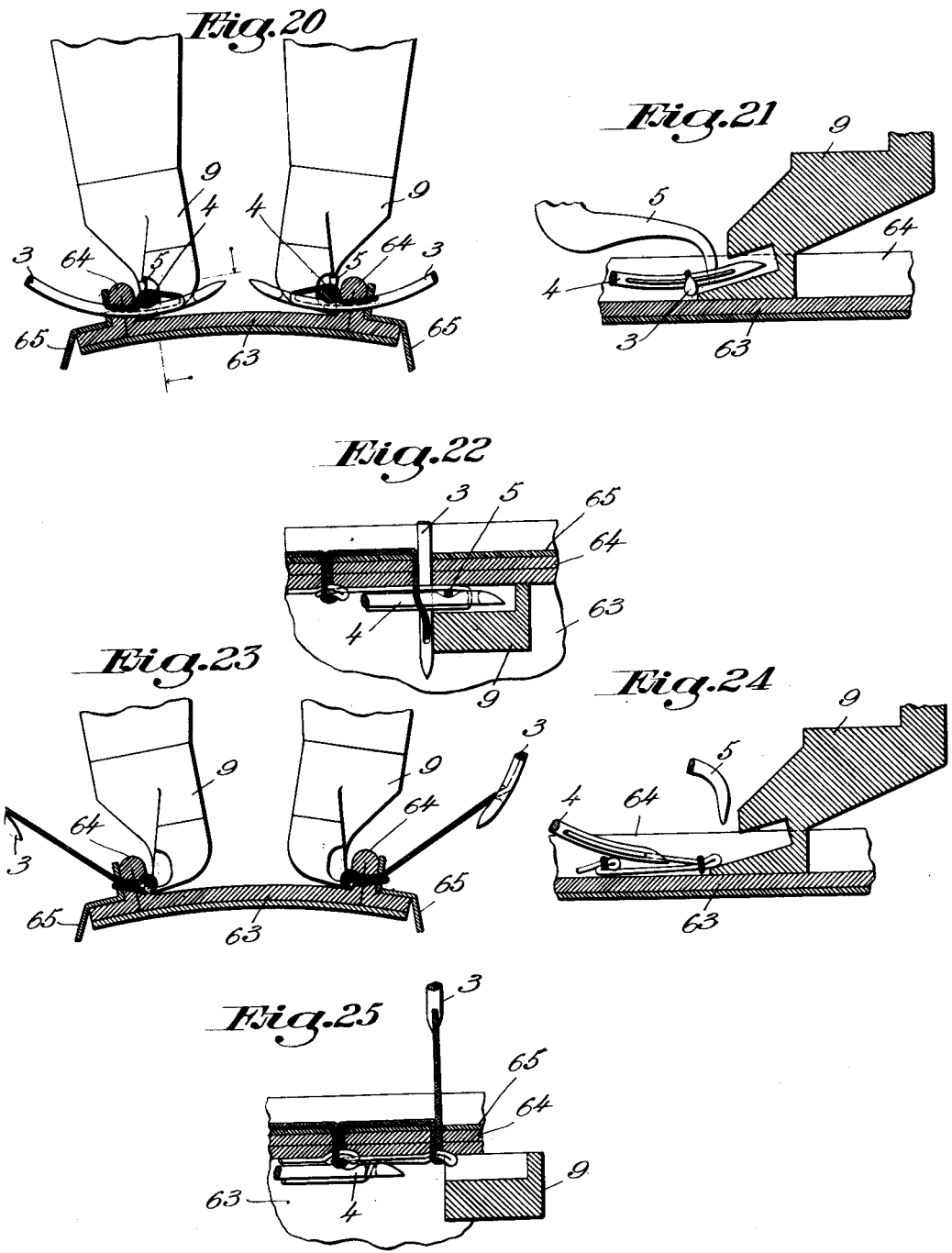

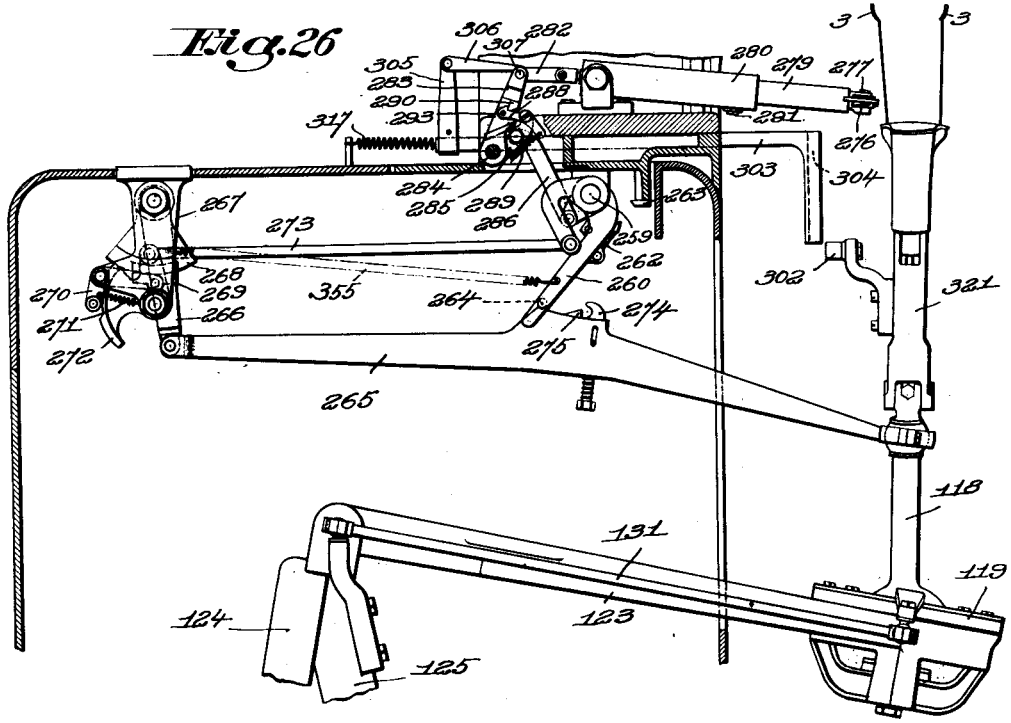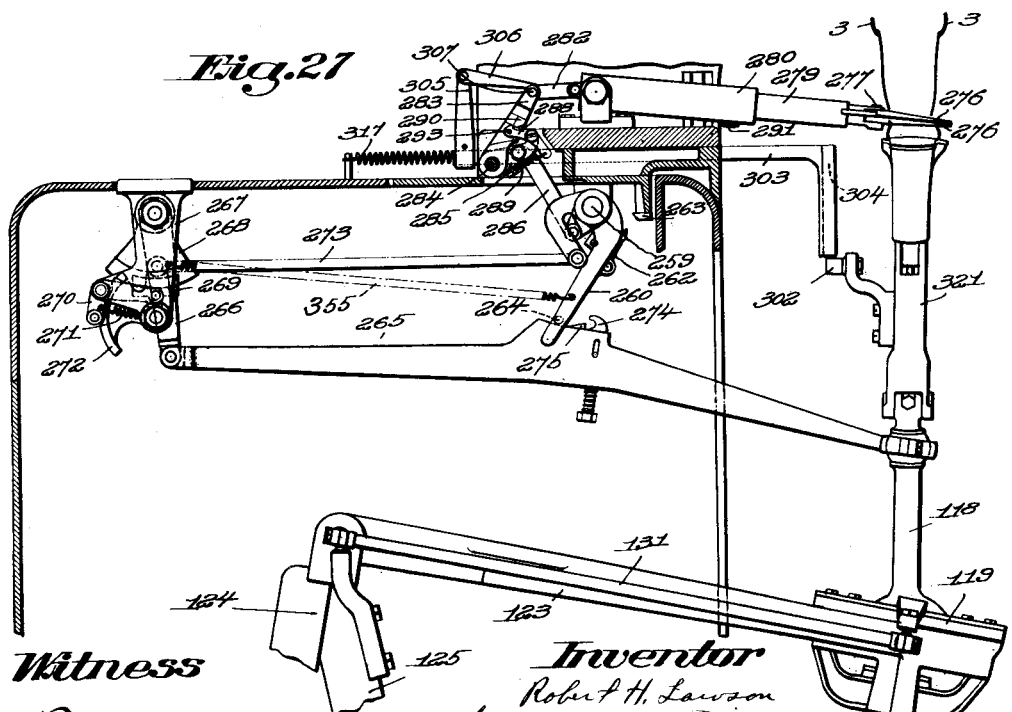

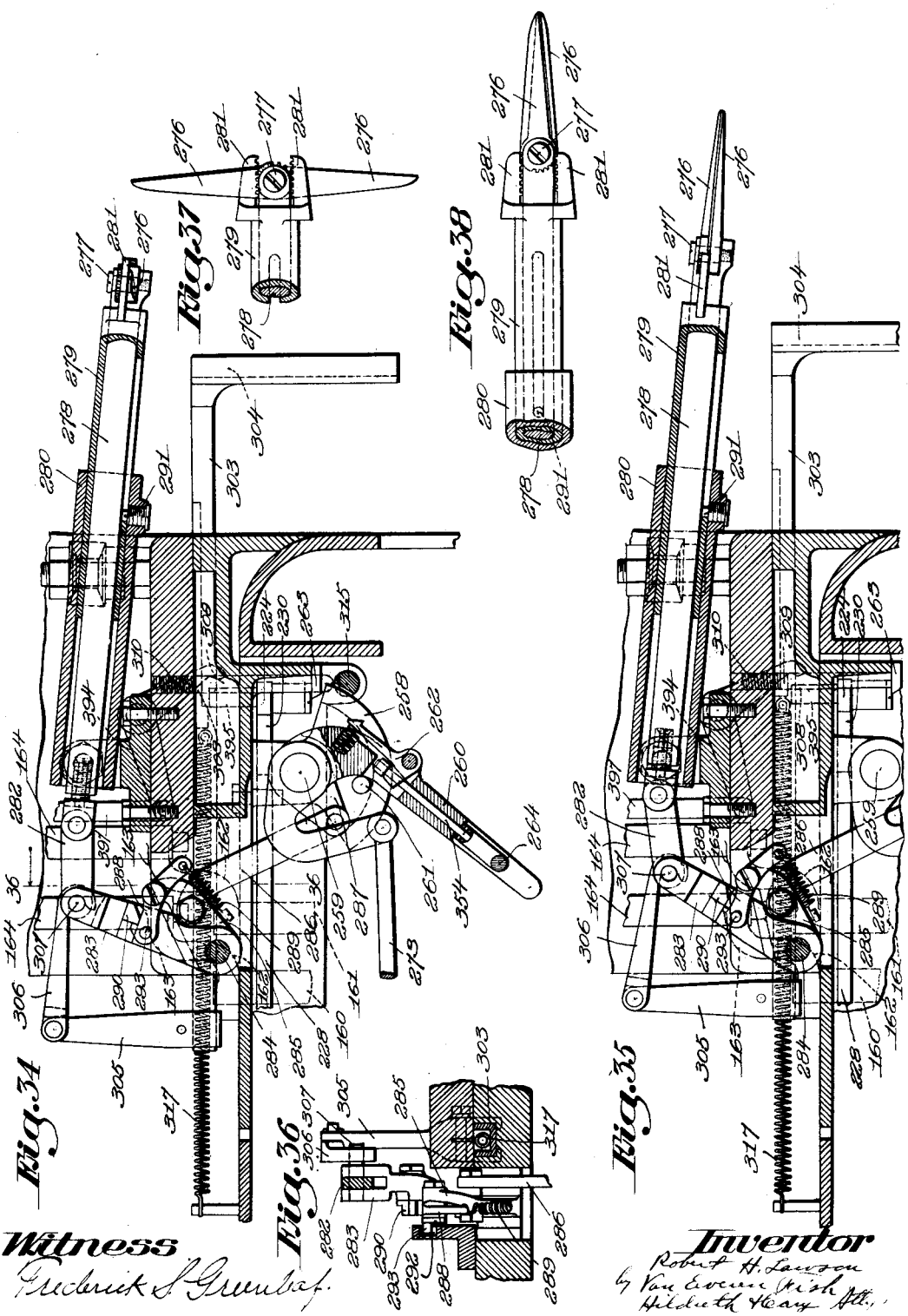

March 26, 1929.  R. H. LAWSON  1,706,619
MACHINE FOR AND METHOD OF MAKING SHOES
Filed May 9, 1923   26 Sheets-Sheet 20
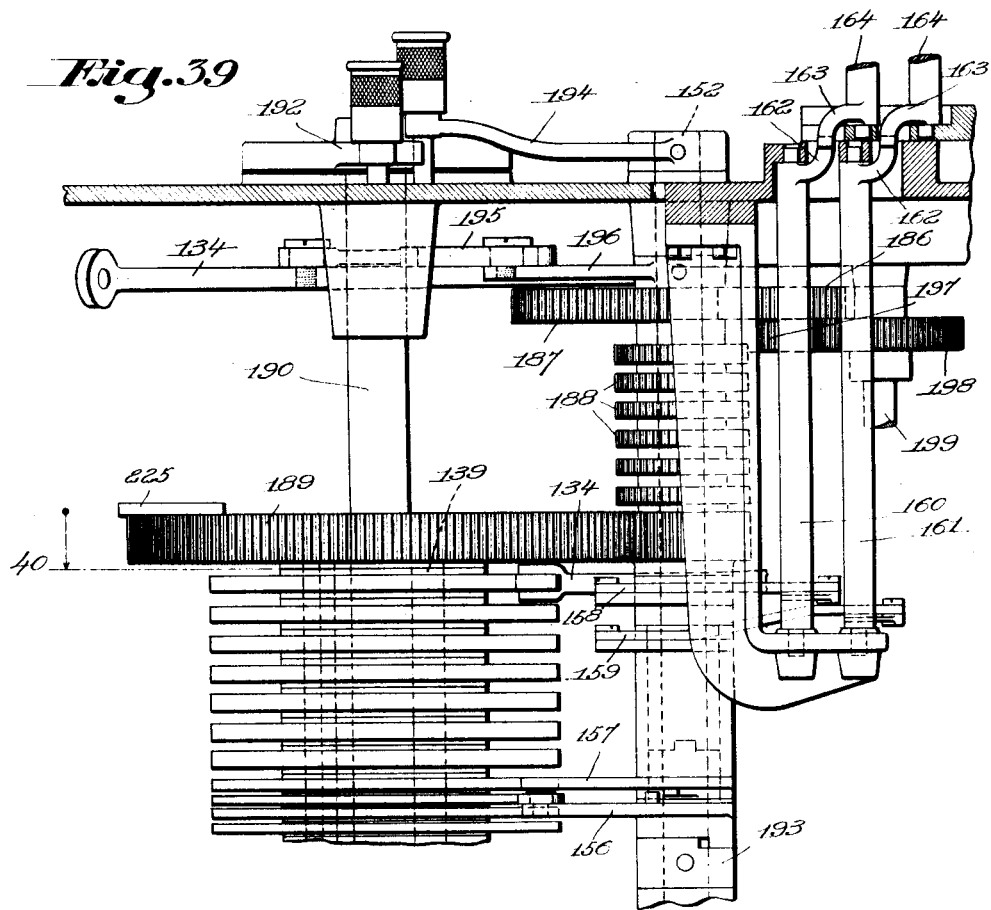
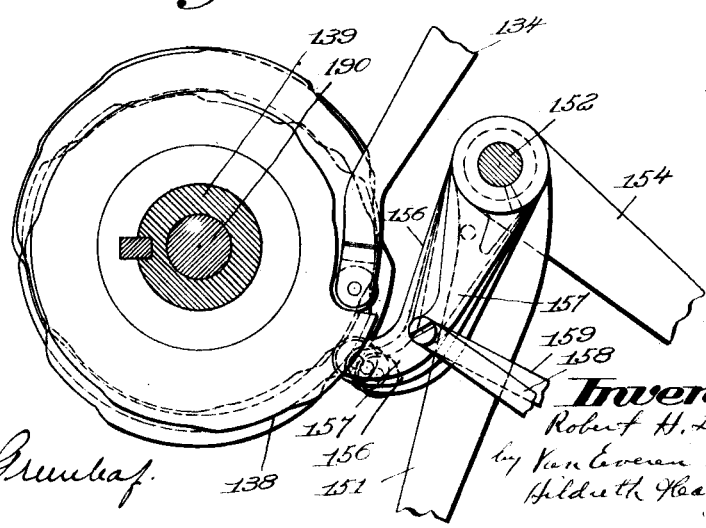

March 26, 1929.  R. H. LAWSON  1,706,619
MACHINE FOR AND METHOD OF MAKING SHOES
Filed May 9, 1923  26 Sheets-Sheet 21
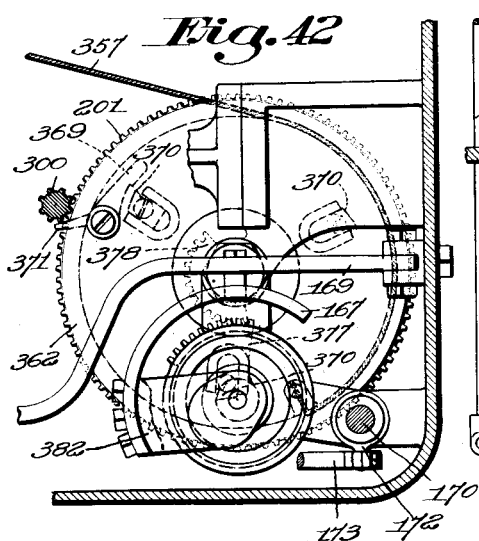
Fig. 42
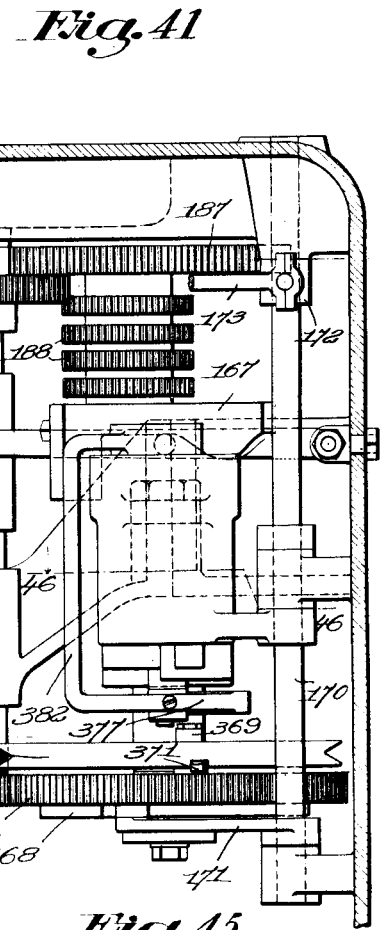
Fig. 41
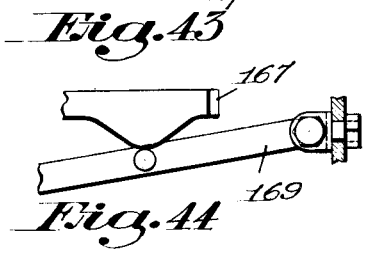
Fig. 43
Fig. 44
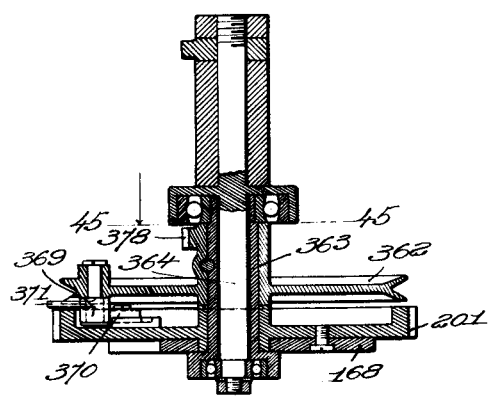
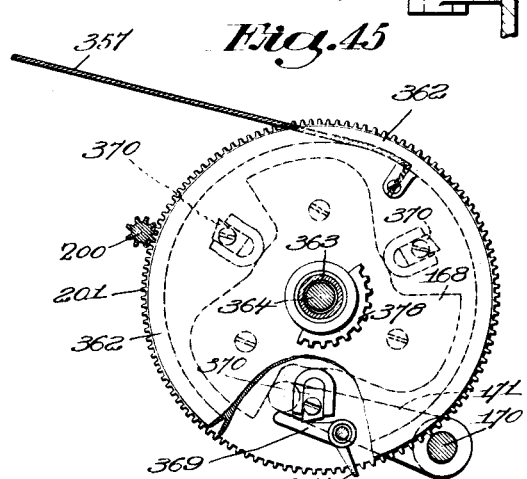
Fig. 45

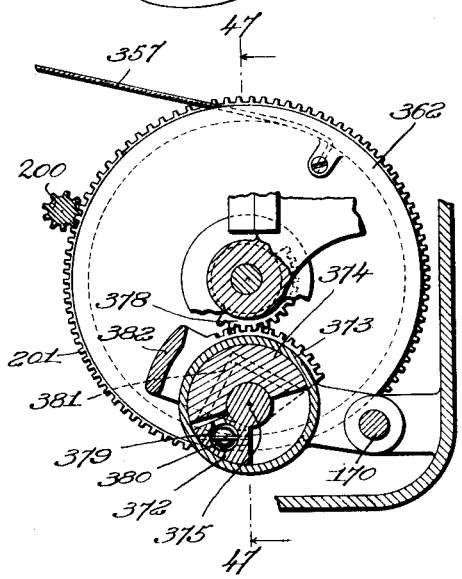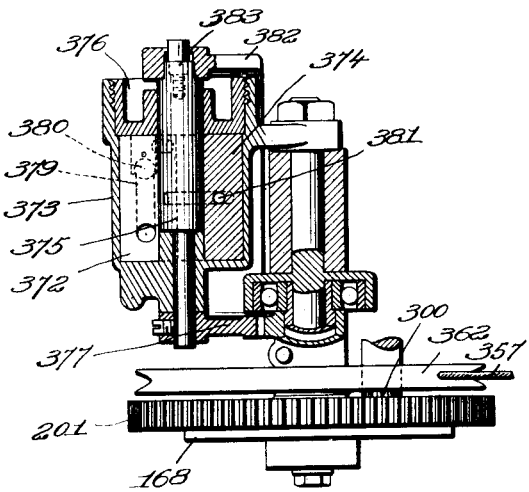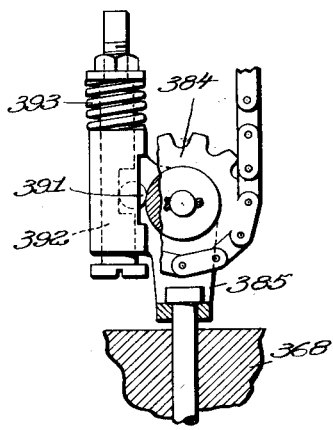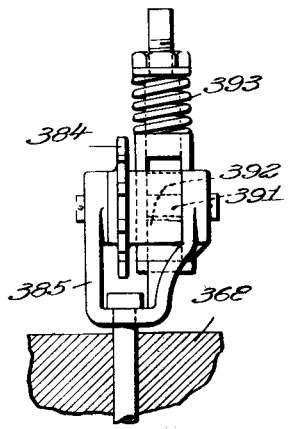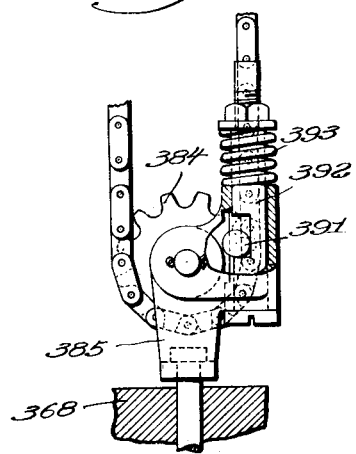

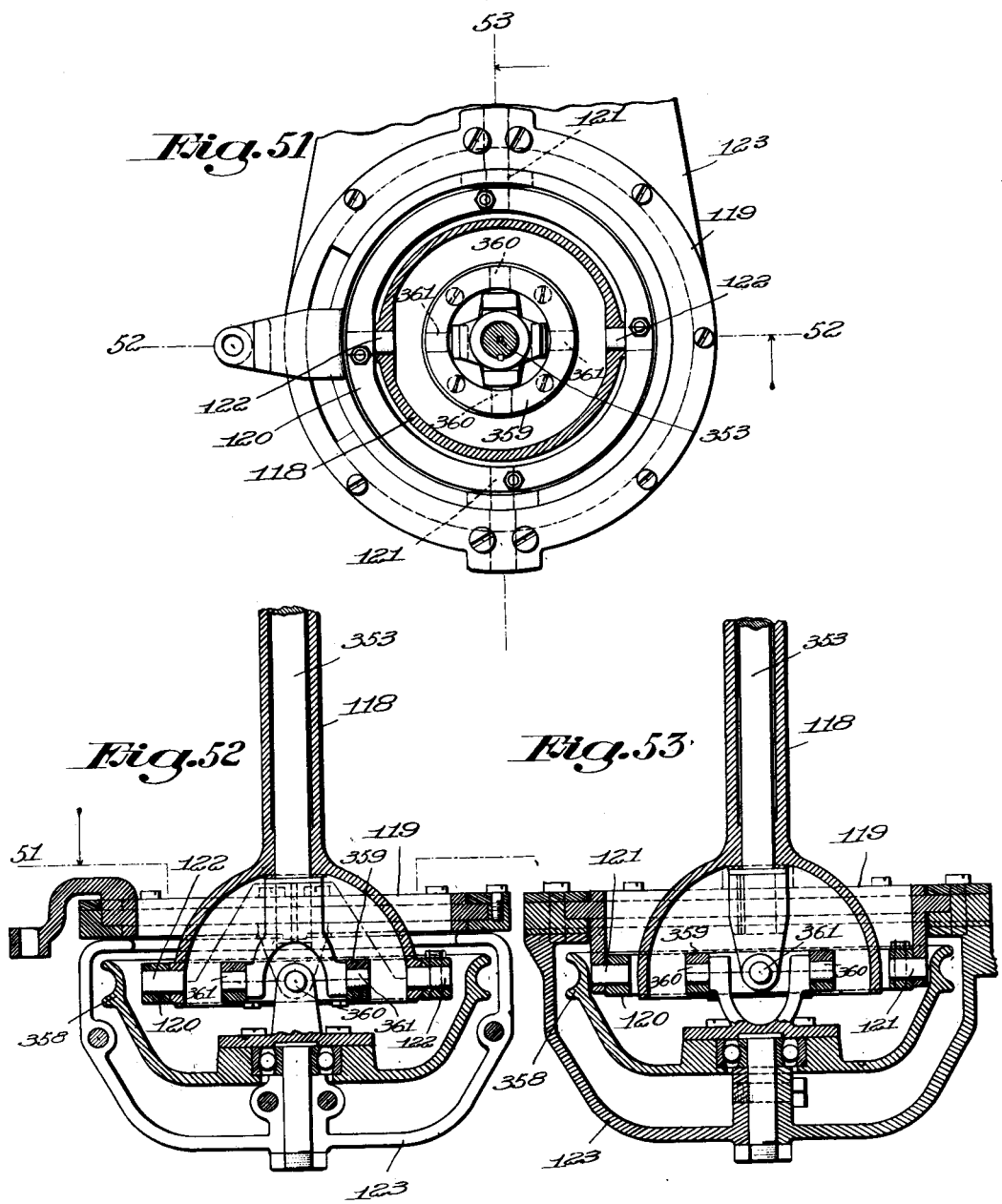

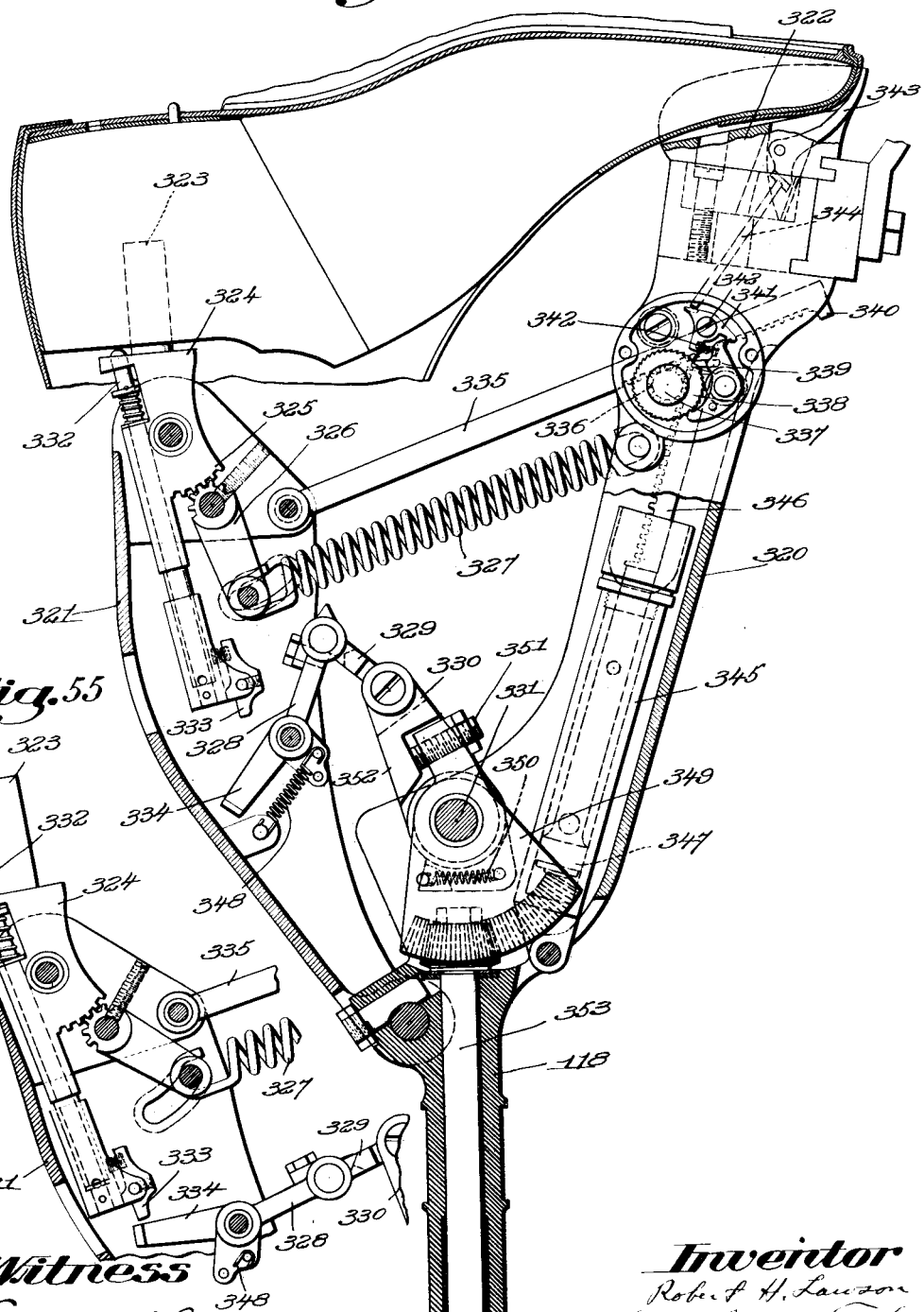

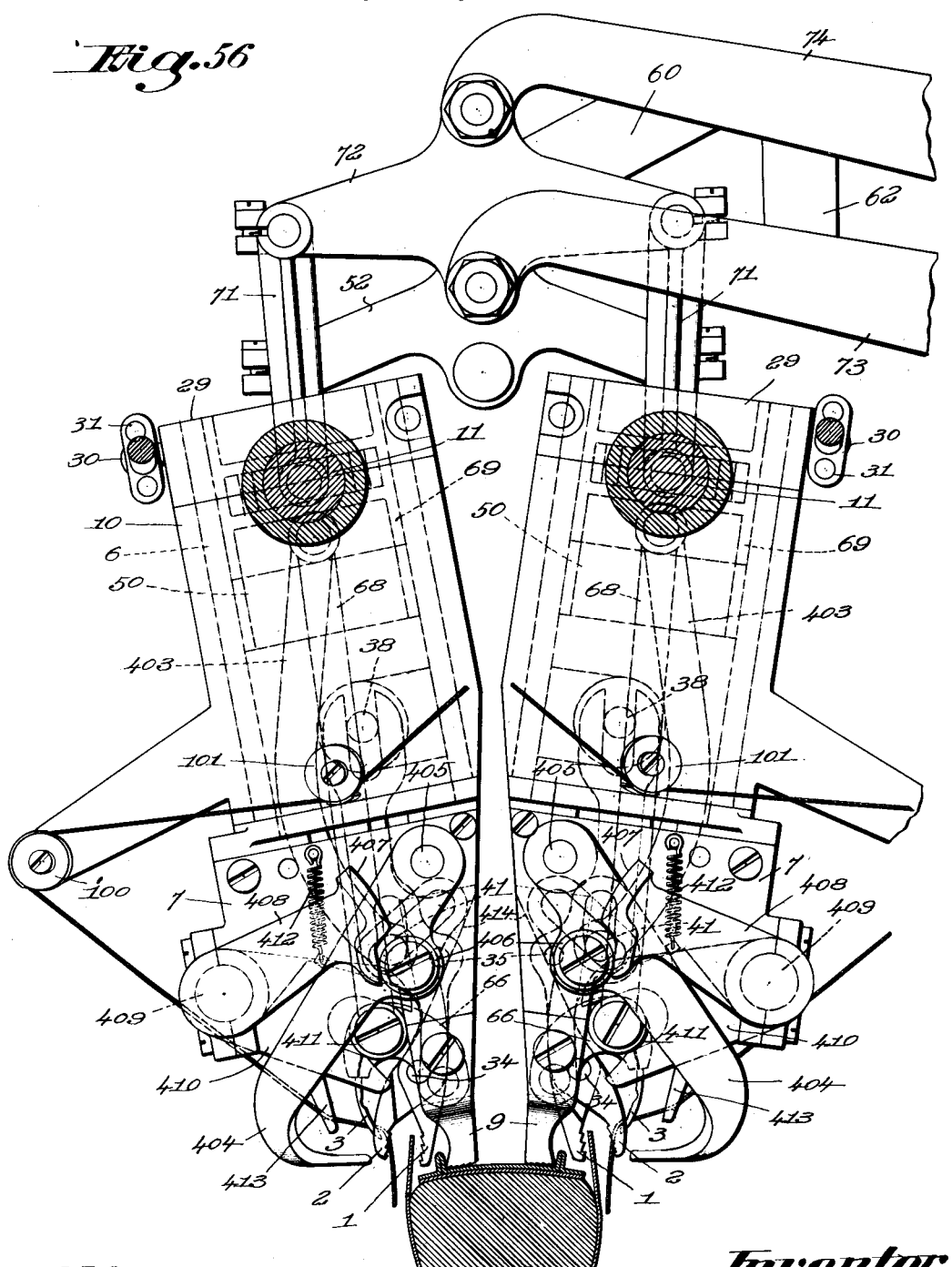

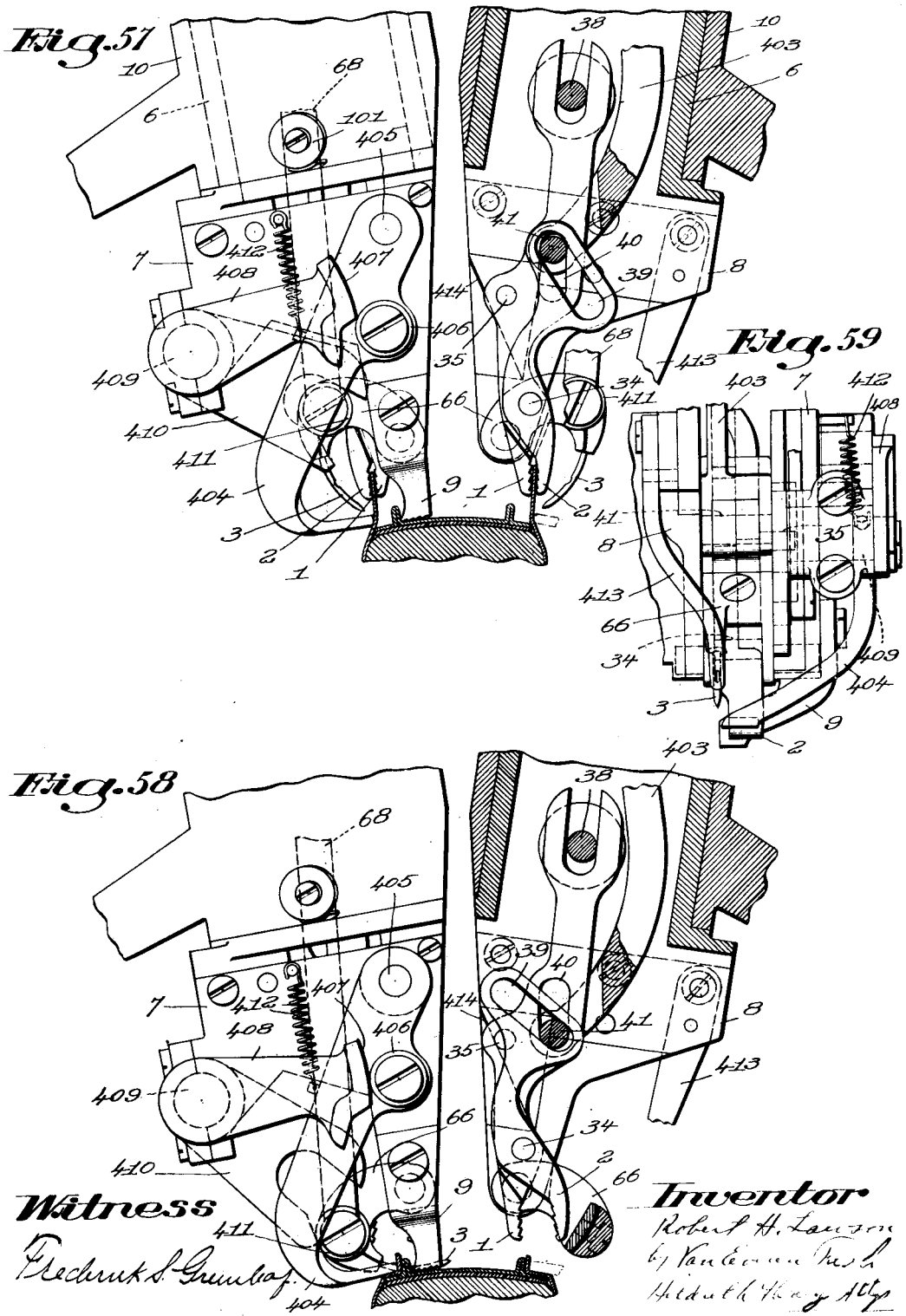

Patented Mar. 26, 1929.

1,706,619

UNITED STATES PATENT OFFICE.

ROBERT H. LAWSON, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR AND METHOD OF MAKING SHOES.

Application filed May 9, 1923. Serial No. 637,749.

The present invention relates primarily to the lasting of shoes. The invention is herein set forth with particular reference to lasting the sides of shoes. In accordance with its general object, the invention provides an automatic lasting machine of the type designed to last successive portions of each side of a shoe upper progressively. Certain features of the invention, however, are not limited to use in machines which are wholly automatic in character, but may be embodied in machines in which some at least of the required relative movements of the operating instrumentalities and shoe are produced or controlled by the operator. Also certain features of the invention are not limited to lasting machines or operations relating to lasting, but may be utilized to advantage in other shoe machines or shoe making operations.

In lasting the sides of shoes by machine according to the practice before this invention, first the upper is seized by grippers and secured in lasted position progressively along one side of the shoe and thereafter the opposite side of the shoe is similarly lasted so that there is a serious liability that in the lasting of the first side the upper will be pulled away from the opposite side to such an extent that it will be impossible to draw the upper back into proper position when the opposite side is being lasted.

One important object of the present invention, therefore, is to provide a practicable machine for lasting shoes in which the upper is worked over the last at opposite sides of the shoe simultaneously and in which the lasting devices and shoe are relatively moved to transfer the point of operation along the shoe. By the provision of devices acting simultaneously on both sides of the shoe the lasting operation can be performed in a uniformly reliable and satisfactory manner without any attention on the part of the operator, except the placing of a shoe on the jack and the removal of the lasted shoe therefrom, and possibly the performance of minor auxiliary operations such as bringing the shoe to starting position and throwing the machine into operation.

It is within the scope of the invention to employ any suitable form of devices for securing the upper in lasted position. To avoid waste of upper material, and in case the shoe being operated upon is a welt or turn shoe, to leave the inner surface of the rib or channel uncovered, it is desirable that the fastenings be inserted along curvilinear lines substantially parallel to the sole edge. This result is attained in the illustrated embodiment of the invention by the provision of sewing mechanism operating to sew simultaneously the opposite marginal portions of the upper to the rib of a sole upon the last. The upper is thus secured in place by stitches, and the well-known objectionable features of metallic fastenings, such as tacks, are avoided. Also the further advantages are gained of an upper fastening which, if desired, can remain permanently in the shoe, and which not only will not interfere with the inseaming and other subsequent operations, but which will also reinforce the inseam and materially improve the quality of the shoe. The sewing mechanism which it is preferred to use to secure the upper in position is a mechanism which forms a loop lock stitch, that is to say, a stitch in which each loop of thread which is passed through the upper and sewing rib is prevented by another loop from being drawn back through the work. This method of securing an upper is especially advantageous where the space available adjacent to the working point is limited and where, therefore, a simple, compact mechanism is desirable or necessary. It is accordingly peculiarly well adapted for securing the opposite margins of an upper simultaneously to a sole.

A feature of the present invention, particularly applicable to an automatic machine, is the provision, in a machine which lasts both sides of a shoe simultaneously, of means, operating during the lasting operation, to impart relative positioning movements to the jack and the lasting devices to compensate for one or more of the curvatures of the shoe sole.

It is desirable, and with many styles of last essential, that the upper be drawn in a direction extending somewhat toward the heel of a shoe while the portion of the upper just at the rear of the forepart is being operated upon. This result is attained in accordance with the present invention by the provision, in a machine which lasts both sides of a shoe simultaneously, of means for imparting relative positioning movements to the jack and lasting devices to compensate for the longitudinal curvature of the surface of the shoe sole. The best results are attained when these positioning movements are such as to maintain the direction of the updraw movement of the lasting devices substantially normal to the longitudinal curvature.

To enable the lasting devices at opposite sides of the shoe to act satisfactorily and in a similar manner on the upper and to insert fastenings at corresponding points, relative positioning movements are imparted to the jack and lasting devices in accordance with the present invention, to compensate for the transverse curvature of the surface of the shoe sole. These movements in the machine hereinafter described maintain the opposite sides of the bottom of the shoe and the lasting devices in the proper relative positions vertically.

The other relative positioning movements which are imparted to the jack and the lasting devices in accordance with the present invention compensate for the edge curvature of the sole. These movements in the machine hereinafter described locate the faces of the upper engaging grippers substantially parallel with the edge of the portion of the upper to be seized and cause the needles of the sewing mechanism to move in paths substantially normal to the sewing rib at the point of operation.

While the present invention contemplates utilizing any or all of the above movements and producing the movements in any desired way, in the automatic machine hereinafter described as illustrative of the various features of the invention all of these movements are employed, the movements to compensate for the longitudinal and transverse curvature of the sole surface being imparted to the jack to bring the surface at the point of operation into the desired plane, and the movements to compensate for the edge curvature of the sole being imparted to supports mounted to rotate about axes substantially perpendicular to the shoe sole, upon which supports the lasting devices are carried.

In addition to the features of invention above referred to, the automatic machine hereinafter described as illustrative of the various features of the present invention embodies a novel means for determining the starting point of the operation which is performed progressively along the shoe, a novel mechanism for relatively locating the shoe and the operating mechanism laterally, a novel mechanism for controlling and actuating the parts of an automatic jack, a novel thread cutting mechanism, and a novel mechanism for stopping the machine when a misstitch occurs in either seam, as well as many novel constructions, combinations and arrangements of parts, all of which, while particularly useful when embodied in an automatic machine for lasting the sides of shoes, are capable of use in other machines and in other relations. Also the machine may be used in practising various steps and methods in the manufacture of shoes, which steps and methods, as hereinafter described and claimed, constitute features of the invention.

Figure 2:
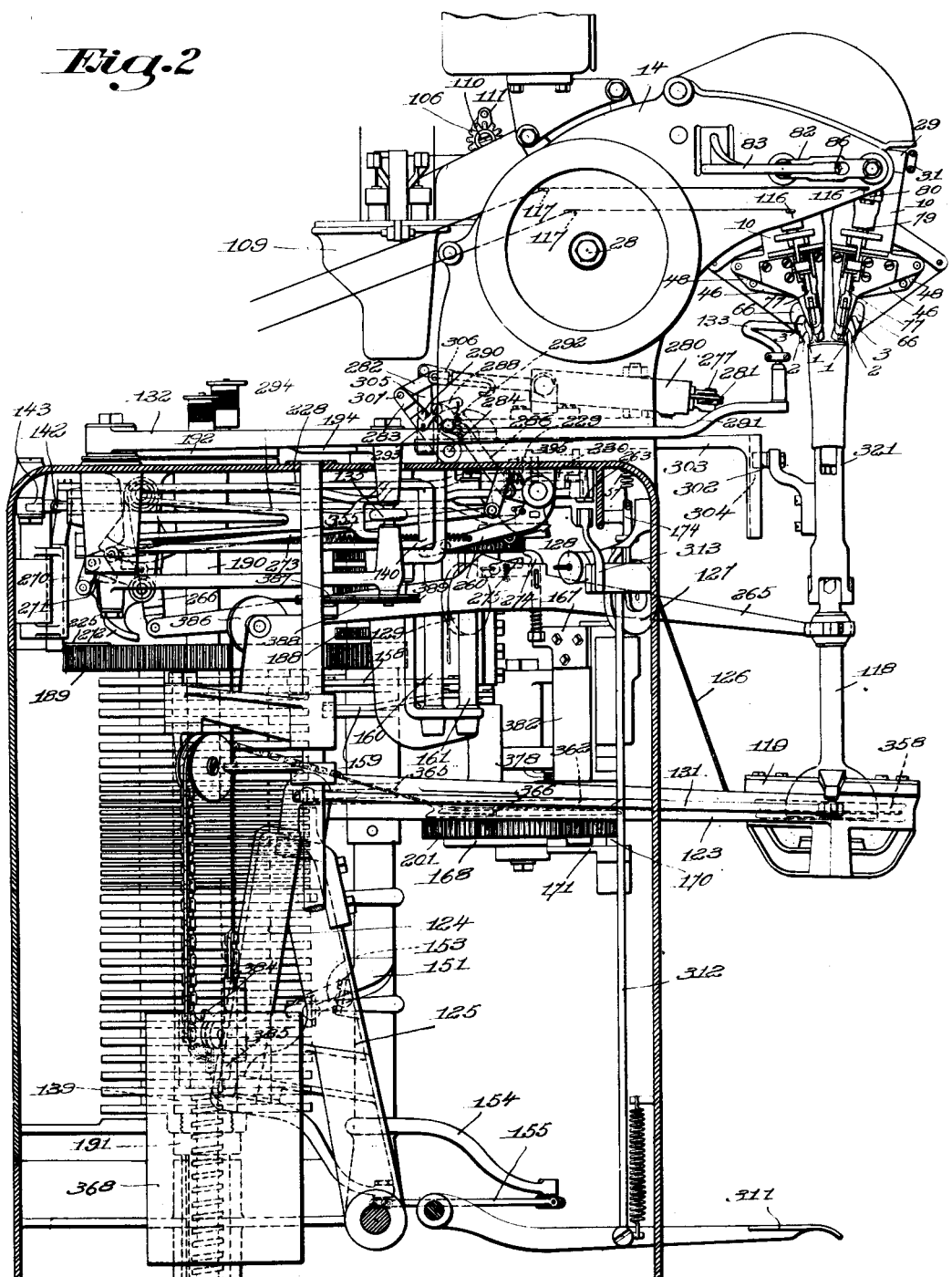
Figure 3:
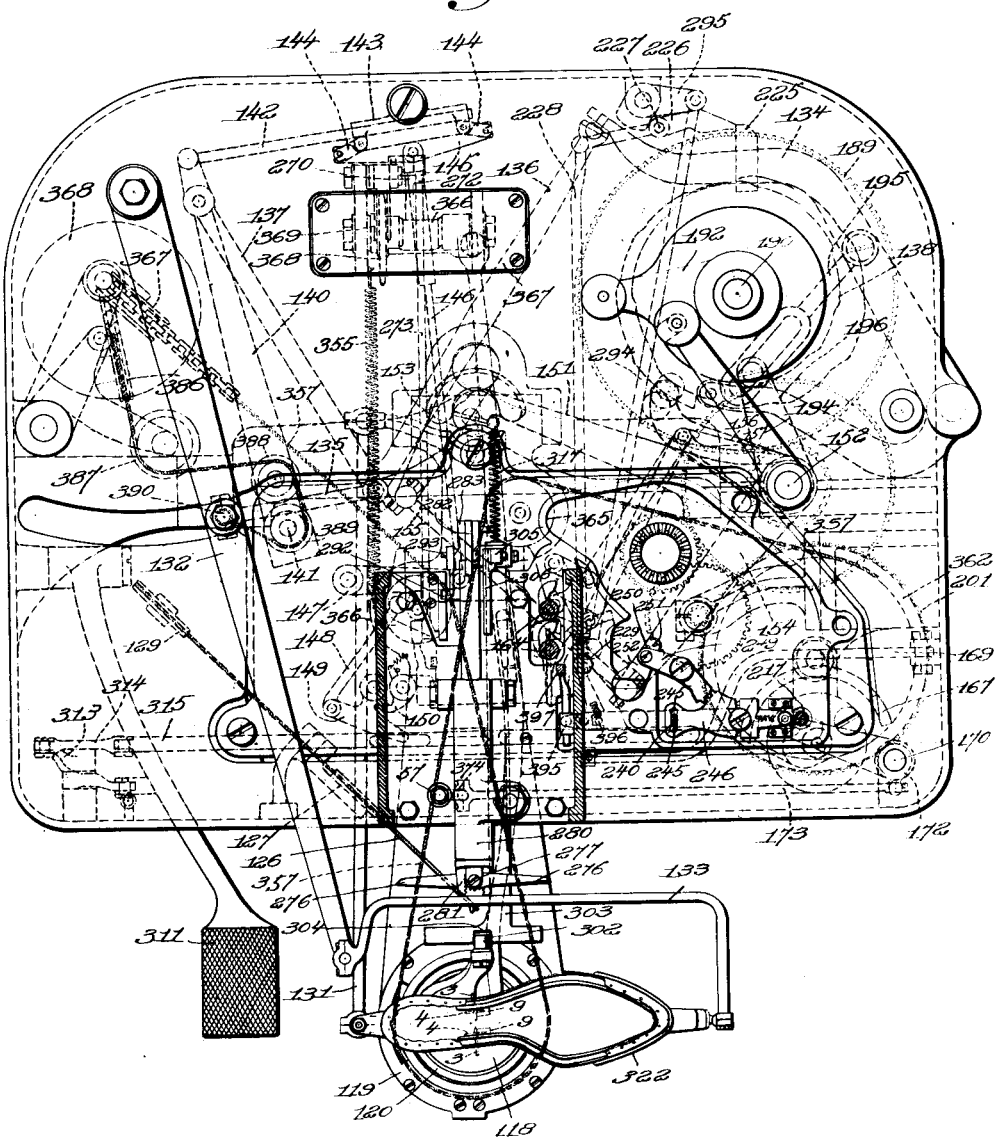
Figure 28:
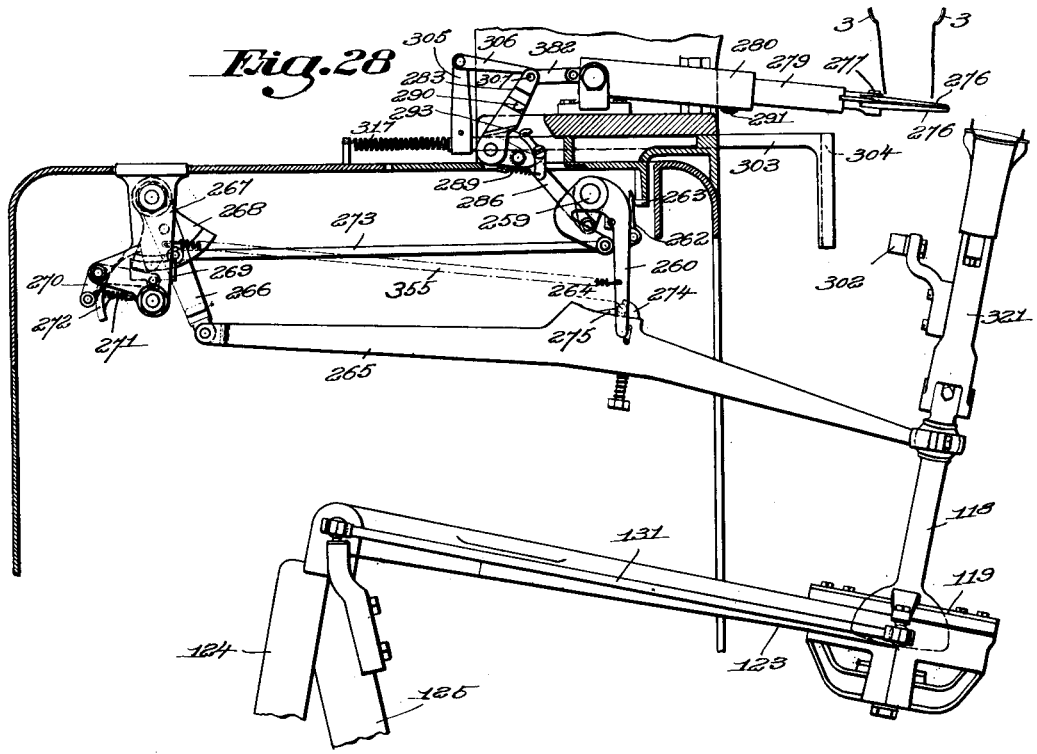
Figures 29, 30:
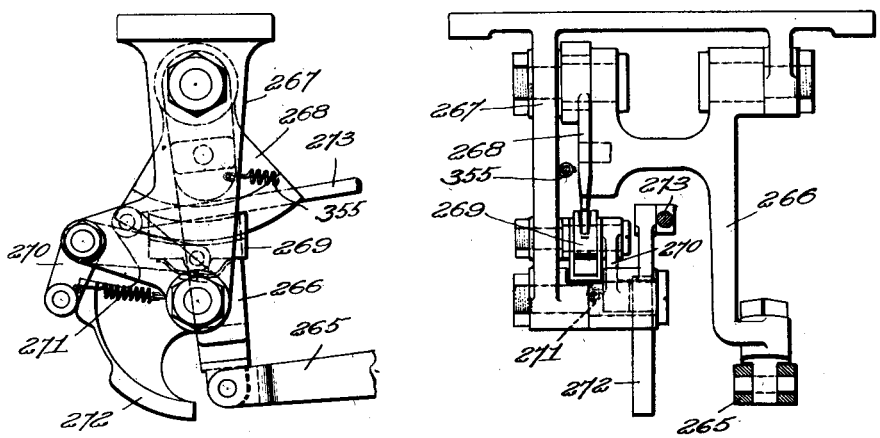
Figure 31:
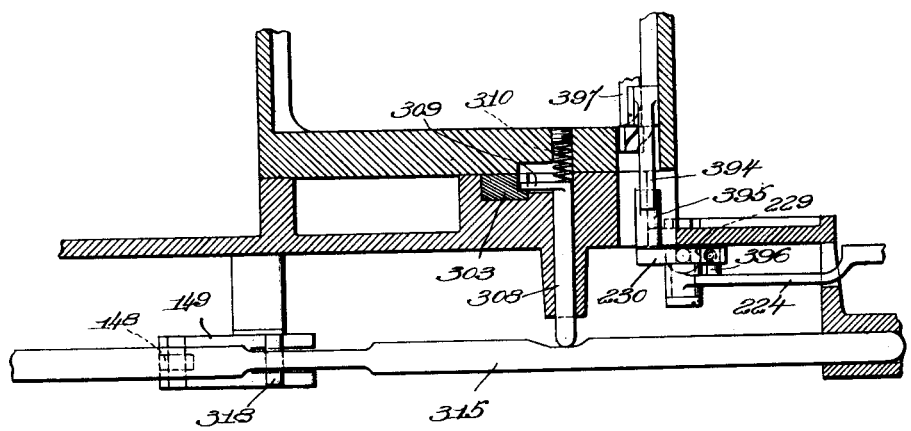
Figure 32:
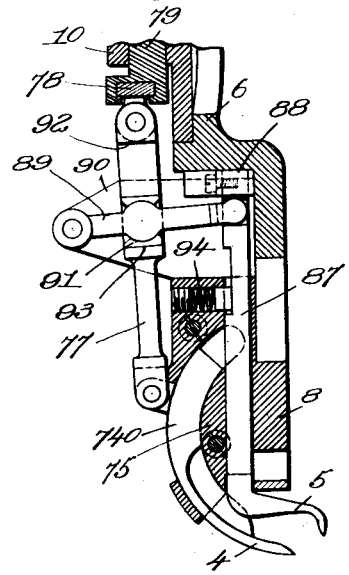
Figure 33:
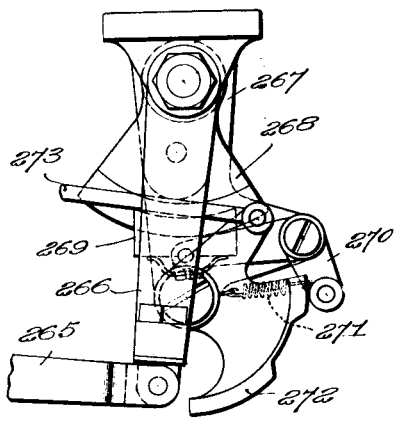

An automatic lasting machine constituting one specific embodiment of the various features of the present invention, and which may be utilized in practising the methods claimed, is illustrated in the accompanying drawings in which Fig. 1 is a view in front elevaton of the complete machine with a portion of the casing at the upper part of the machine broken away to show underlying parts; Fig. 2 is a view in side elevation of the machine looking from the left of Fig. 1 with the casing or frame of the base shown in section; Fig. 3 is a sectional plan view of the machine taken on a plane passing just below the cam shaft of the upper lasting mechanism; Fig. 4 is a sectional plan view showing on an enlarged scale a portion of the mechanism illustrated in Fig. 3; Fig. 5 is a plan view of a portion of the mechanism shown in Figs. 3 and 4 with the top plate of the machine base broken away; Fig. 6 is a view in front elevation partly in section of the upper portion of the machine, Fig. 7 is a view in side elevation partly in section illustrating particularly the driving and stopping mechanism of the machine; Fig. 8 is a plan view partly in section of the portion of the machine illustrated in Fig. 6; Fig. 9 is a view in side elevation partly in section of that portion of the head of the machine which supports and actuates the upper lasting devices; Fig. 10 is a view similar to Fig. 9, but looking in the opposite direction; Fig. 11 is a detail view on an enlarged scale of the upper lasting devices and their supporting and actuating mechanism, the view being taken on a vertical plane transverse to the direction of feed passing inside of one of the side walls of the machine frame; Fig. 12 is a view similar to Fig. 11, but looking in the opposite direction; Fig. 13 is a detail sectional view of one of the supports upon which the lasting devices are mounted, together with the devices and mechanism carried by said support, the plane of the section being substantially vertical and extending in the direction of feed; Fig. 14 is a detail sectional view on the line 14 of Fig. 13; Fig. 15 is a detail perspective view of a needle or looper forming a part of the sewing mechanism; Fig. 16 is a detail sectional view substantially on the line 16 of Fig. 13; Fig. 17 is a detail sectional view taken on a vertical plane transverse to the direction of feed illustrating the action of the upper lasting devices in stretching opposite sides of an upper over the last and sewing the stretched upper to the rib of an insole; Fig. 18 is a detail sectional plan view taken substantially on the line 18—18 of Fig. 17; Fig. 19 is a detail sectional view taken on the line 19—19 of Fig. 17; Figs. 20 to 25 are detail views illustrating somewhat diagrammatically the operation of the sewing mechanism in sewing opposite sides of the upper to the sewing rib of the insole; Fig. 26 is a detail view illustrating in side elevation and partly in section the jack supporting mechanism and a mechanism for depresisng the jack and for moving it outwardly at the completion of the lasting operation and for severing the threads of the two seams: Figs. 27 and 28 are views similar to Fig. 26, but showing the parts in different positions; Fig. 29 is a detail view showing in side elevation the jack locking mechanism for locking the jack while the sewing threads are being severed; Fig. 30 is a view in front elevation of the parts illustrated in Fig. 29; Fig. 31 is a detail sectional view illustrating a portion of the mechanism which is shown in dotted lines in Fig. 6; Fig. 32 is a detail sectional view illustrating the connections for actuating a looper needle and a loop retainer; Fig. 33 is a detail view of the mechanism shown in Fig. 29, but looking in the opposite directions; Fig. 34 is a detail sectional view illustrating on an enlarged scale a portion of the mechanism shown in Figs. 26 to 28; Fig. 35 is a view similar to Fig. 34, but showing the parts in a different position; Fig. 36 is a detail sectional view taken on the line 36—36 of Fig. 34; Fig. 37 is a detail plan view of the thread cutting devices showing the cutting blades open; Fig. 38 is a view similar to Fig. 37 showing the cutting blades closed; Fig. 39 is a detail view showing in side elevation a cam shaft in the base of the machine and a portion of the connections through which the supports for the upper lasting devices are moved during the operation of the machine to compensate for the edge curvature of the shoe sole; Fig. 40 is a detail sectional view taken on the line 40 of Fig. 39; Fig. 41 is a detail view showing in front elevation the mechanism in the base of the machine which actuates the mechanism in the jack for unjacking the shoe and which also varies the tension of certain springs and controls the return movement of various parts of the machine to original position; Fig. 42 is a detail plan view partly in section of the mechanism illustrated in Fig. 41; Fig. 43 is a detail view of a cam and lever forming part of the mechanism illustrated in Figs. 41 and 42; Fig. 44 is a detail vertical sectional view of a portion of the mechanism shown in Figs. 41 and 42; Fig. 45 is a detail sectional plan view taken on the line 45 of Fig. 44; Fig. 46 is a detail sectional plan view taken on the line 46—46 of Fig. 41; Fig. 47 is a detail vertical sectional view taken on the line 47—47 of Fig. 46; Fig. 48 is a detail view in side elevation partly broken away of the connections between a cord and weight which are used to operate certain parts of the machine; Fig. 49 is a view in rear elevation of the parts illustrated in Fig. 48; Fig. 50 is a view similar to Fig. 48, but looking in the opposite direction; Fig. 51 is a detail sectional plan view of a portion of the jack supporting structure taken on a plane indicated approximately by the line 51 of Fig. 52; Fig. 52 is a vertical sectional view of the parts illustrated in Fig. 51 taken on the line 52 of said figure; Fig. 53 is a vertical sectional view of the parts illustrated in Fig. 51 taken on the line 53 of said figure; Fig. 54 is a detail sectional view illustrating the shoe supporting jack with a shoe mounted thereon, the parts of the jack being in the position which they assume before the start of the lasting operation; Fig. 55 is a detail view illustrating the position of certain parts of the jack mechanism before the shoe is placed on the jack; Fig. 56 is a detail view showing in side elevation a modified construction of lasting devices; Fig. 57 is a detail view partly in section of the mechanism shown in Fig. 56, but with the parts in a different position; Fig. 58 is a view similar to Fig. 57 showing the parts in a still different position; and Fig. 59 is a detail view looking from the left of Fig. 56.

This application, so far as it discloses the subject matter of applicant's pending application Ser. No. 539,280, filed February 25, 1922, as a renewal of application Ser. No. 271,393, filed January 16, 1919, is a continuation of said application.

The illustrated machine, while adapted for lasting shoes made in most respects according to present commercial methods and more specifically for lasting the sides of shoes, the toe and heels of which are lasted upon machines of the so-called "bed" type, has nevertheless been particularly designed to be employed as one unit in a series of automatic machines which are intended primarily to practice a radically new method of making shoes which is disclosed and claimed in an application for Letters Patent of the United States, Ser. No. 476,659, filed in the name of George E. Warren, June 11, 1921, and assigned to the assignee of the present application. According to the method disclosed in that application, the toe and heel of the upper of a shoe are preliminarily molded so as to have approximately their final shape and the heel end of the upper is also permanently secured to the insole before the last is inserted within the shoe. The subsequent step of lasting the sides of the shoe, approximately from the breast line at the heel to the tip line at the toe, is the specific function of the machine herein shown.

The machine illustrated in the drawings is designed to be entirely automatic in its action, except for the removal of a shoe which has been operated upon from the jack, the placing of another shoe thereon, and the bringing of the shoe into position to start the operation. The machine comprises a shoe supporting jack movable longitudinally to feed the shoe, and two sets of grippers for stretching the upper and stitch forming devices arranged to act simultaneously at opposite sides of a shoe to work progressively both sides of the shoe upper over the last and sew the upper to the rib of the insole, the term "stretching" as herein used being understood as defining the operation of drawing, pulling, straining, or otherwise working the upper smoothly over the last, whether or not the upper is actually elongated or distorted during this operation. The upper stretching grippers and stitch forming devices and carried by two supports which are provided with channel guides arranged to bear against the inner surface of the sewing rib of the insole at opposite sides of the shoe. The supports are mounted in the machine so that they are capable of a bodily movement toward and from each other and are interconnected so that they move simultaneously towards and from each other. A spring tends to separate the supports and cause the channel guides to remain in contact with the inner surface of the sewing rib throughout the lasting and sewing operation on the shoe. The upper stretching grippers and stitch forming devices are thus positioned varying distances apart as the shoe bottom varies in width, and since the supports are interconnected the channel guides serve also to determine the lateral position of the shoe in the machine. The supports are also mounted in the machine so that they can be rotated about axes substantially perpendicular to the surface of the shoe sole and passing through the rib engaging surfaces of the channel guides. Automatic mechanism is provided operating in timed relation with the longitudinal movements of the shoe for rotating the supports so as to cause the needles to pierce the sewing rib in paths substantially normal to the rib and to bring the upper engaging surfaces of the gripping jaws into a position substantially parallel with the portion of the edge of the upper being operated upon. The rotary movements imparted to the supports thus compensate for the edge curvatures of the shoe sole.

The channel guides and the supports upon which they are mounted are fixed against vertical movement, and in order to maintain the channel guides in contact with the surface of the shoe sole at opposite sides of the shoe throughout the lasting and sewing operation tipping movements are imparted to the jack transversely of the direction of feed. These tipping movements are produced by automatically acting mechanism timed with relation to the travel of the shoe, and maintain both sides of the shoe in proper postion to be acted upon by the upper stretching and stitch forming devices. These movements thus act to compensate for the transverse curvature of the surface of the shoe sole.

The upper stretching grippers have an updraw movement away from the shoe sole, and in order to maintain this updraw movement in the proper direction so as to draw the upper over the last tightly and smoothly longitudinal tipping movements are imparted to the shoe supporting jack by automatically acting mechanism timed with relation to the travel of the shoe. These longitudinal tipping movements maintain the direction of updraw movement of the grippers substantially normal to the longitudinal curvature of the surface of the sole, and thus compensate for this longitudinal curvature.

The jack of the illustrated machine is carried upon a spindle, the lower end of which is connected by a universal joint to a jack support mounted for movement in the line of feed and also transversely of the line of feed. This permits the jack at the upper end of the spindle to be moved inwardly and outwardly transversely of the line of feed to locate the shoe in the machine and to be moved longitudinally to feed the shoe past the upper stretching and stitch forming devices, and also permits the lower end of the spindle to be moved to impart the tipping movements to the jack necessary to compensate for the longitudinal and transverse curvatures of the surface of the shoe sole. The jack is held from rotation at all times in a constant angular position with relation to the line of feed, the only movements imparted to the jack to feed the shoe and to return the shoe to its original position being longitudinal movements.

When the machine is at rest with the jack in position to permit the removal of a shoe and the placing of another shoe thereon, the jack is out of normal operating position in the machine. The placing of a shoe on the jack unlocks the connections through which the jack has been actuated to feed the preceding shoe, leaving the jack free to be moved by the operator. The jack is moved by the operator to bring the shoe which has been placed upon the jack to starting position and this movement of the jack adjusts the feeding mechanism for the size of the shoe to be operated upon. Upon starting the machine into operation the feeding mechanism is locked in adjusted position so that it can function properly to feed the shoe.

The longitudinal movements of the jack to feed the shoe, the tipping movements of the jack to compensate for the longitudinal and transverse curvatures of the surface of the shoe sole and the rotary or turning movements of the supports for the upper stretching and stitch forming devices to compensate for the edge curvature of the shoe sole, are produced and controlled by pattern cam mechanism driven in timed relation to the upper stretching and stitch forming devices. This pattern cam mechanism also acts to vary the tension of a spring which determines the stretching strain exerted by the lasting grippers on the upper and the tension of the spring which tends to separate the supports for the upper stretching and stitch forming devices and to hold the channel guides mounted on the supports in contact with the sewing rib at opposite sides of the shoe.

The illustrated machine is provided with a driving mechanism from which the lasting mechanism and the pattern cam mechanism are driven, and is also provided with a stopping mechanism, which, at the completion of the lasting operation, is automatically thrown into operation, and which acts to disconnect the lasting and the pattern cam mechanism from the driving mechanism. After the lasting and the pattern cam mechanism are disconnected from the driving mechanism, the jack is depressed, the threads of both seams are severed, the jack is moved outwardly, and a final movement is imparted to the pattern cam mechanism to cause the jack to be moved longitudinally in the direction opposite to the feed to its original position. This is accomplished by an auxiliary mechanism, normally idle, but which is automatically connected to the driving mechanism when the lasting and the pattern cam mechanism are disconnected.

To permit the shoe to be moved away from the stitch forming devices as the jack is depressed at the conclusion of the lasting operation, means are provided, operated from the stopping mechanism, for releasing the tension on the main threads of the two seams.

As the jack is depressed at the conclusion of the lasting operation, the supports carrying the upper stretching and stitch forming devices are moved towards each other to remove the channel guides from engagement with the sewing rib and are locked in this position by means of a latch until the machine is again started into operation, when the latch is automatically actuated to release the supports to permit them to separate so as to bring the channel guides into engagement with the sewing rib. This permits the shoe sole to be readily disengaged from the channel guides at the completion of the lasting operation, but is more particularly for the purpose of facilitating the positioning of the shoe in the machine at the start of the lasting operation.

As has been stated, when the illustrated machine is at rest the jack is out of operating position. Before starting the machine into operation the jack is moved by the operator into operating position and this movement not only determines the point on the shoe at which the operation is started, but also adjusts the feeding mechanism for the size of shoe being operated upon. It is important that the shoe be brought into a position so that the operation is started at a predetermined definite point on the shoe, and to enable this to be done with absolute accuracy and without any special attention on the part of the operator, the jack of the illustrated machine is provided with a gage which is brought into contact with a cooperating gage at the start of the operation on the shoe. This cooperating gage is mounted in the machine so as to be movable into and out of operating position. It is moved into operating position during the downward and outward movement of the jack after the lasting operation has been completed. A locking latch is provided for holding the cooperating gage in operating position until the jack has been positioned for operation on the next shoe. Upon starting the machine into operation this latch is actuated to release the gage and permits it to move into its inoperative position.

The jack of the illustrated machine comprises mechanism, tripped into operation in placing a shoe on the jack, and acting automatically to locate the shoe in a predetermined position longitudinally on the jack and clamp the shoe in position. The jack also comprises mechanism mounted in the jack for unclamping the shoe and for resetting the locating and clamping mechanism. This resetting and unclamping mechanism is actuated and controlled by the pattern cam mechanism and suitable connections between the pattern cam mechanism and the resetting and unclamping mechanism. The construction and mode of operation is such that the shoe is unclamped and the clamping mechanism is reset during the longitudinal movement of the jack to its original position after it is moved outwardly from the machine.

In addition to the mechanism and devices above referred to, the illustrated machine is provided with mechanism which operates automatically to stop the machine upon the occurrence of mis-stitch in either seam by reason of breakage of a thread or for other cause. This stopping mechanism is actuated and controlled from the take-up mechanism which operates on the main threads and acts upon the occurrence of a mis-stitch in either seam to disconnect the lasting mechanism and the pattern cam mechanism from the driving mechanism without throwing into operation the auxiliary mechanism for depressing the jack and performing the other operations above referred to.

The driving and stopping mechanism of the illustrated machine, the mechanism which is thrown into operation when the lasting devices are thrown out of operation and which depresses the jack and moves it outwardly, the parts of the jack which operates to locate longitudinally and clamp and unclamp the shoe, and the pattern cam mechanism and connections therefrom to the jack for imparting feeding and tipping movements to the jack, are similar in many respects to the corresponding mechanisms of the machine disclosed in the application of Laurence E. Topham and Alfred R. Morrill, filed July 21, 1919, Ser No. 312,366, and assigned to the assignee of the present application. Reference to said application may be had for a disclosure of details not fully illustrated and described in the present application.

Referring to the drawings and particularly to Figs. 11 to 19, inclusive, an upper stretching gripper comprising gripping jaws 1 and 2 is arranged to act upon the upper at each side of a shoe. Each of the grippers is mounted upon a support and upon each support is also mounted a set of stitch forming devices comprising a main needle 3, a looper needle 4 and a loop retainer 5. Each support, as best shown in Fig. 13, comprises a cylindrical portion 6 from the lower end of which flanges project downwardly, to which are secured downwardly extending parallel plates 7 and 8. To the lower end of the plate 7 is secured a block 9 which is shaped to form a presser foot arranged to bear against the surface of the sole of a shoe presented to the machine and engage the inner surface of the sewing rib so as to constitute a channel guide. The presser feet act as abutments to engage the sole surface near each edge and thus hold the sole against the last bottom and also resist the strain of the grippers on the work. As the shoe is moved longitudinally to transfer the point of operation of the lasting and sewing devices along the shoe the channel guides are pressed yieldingly against the inner surface of the rib at opposite sides of the shoe, as indicated in Figs. 11 and 12, and thus position the grippers and sewing devices properly as the shoe sole varies in width. To permit the channel guides and the supports to which they are secured to move towards and from each other the cylindrical portion 6 of each support is mounted in a carrier block 10 which is secured to bearing studs or trunnions 11 and 12 mounted to turn in the overhanging side walls 13 and 14 of the portion of the machine frame which carries the mechanism for supporting and actuating the upper stretching and stitch forming devices. The hubs of the blocks 10 which receive the pivot studs 11 are provided with arms 15 extending laterally towards each other and provided with intermeshing segmental gears 16. The supports for the upper stretching and stitch forming devices and the channel guides secured thereto are thus compelled to move towards and from each other in unison so that the channel guides, by contacting with the sewing rib of the shoe, not only control the position of the upper stretching and stitch forming devices laterally of the shoe, but also determine the lateral position of the shoe in the machine.

To cause the channel guides to be pressed yieldingly against the inner surface of the sewing rib, one of the pivot studs 11 is provided with a downwardly extending arm 17 to which is connected one end of a spring 18, as best shown in Fig. 9. The other end of the spring 18 is connected to the vertical arm of a bell crank 19, the horizontal arm of which is connected by a rod 20 to the pattern cam mechanism, hereinafter described, by which the rod 20 and bell crank 19 are actuated during the lasting operation to vary the tension of the spring 18 so as to maintain the channel guides against the sewing rib with the required amount of pressure at all times. To the lower end of the arm 17 is also connected one end of an adjustable rod 21, the other end of which is connected to the vertical arm of a bell crank 22. The upper end of the arm 22 is provided with a slot which is engaged by a pin on the forward end of a bar 23 mounted to slide in a horizontal guideway formed in a block 24 secured to the side wall 13 of the machine frame. Cooperating with the bar 23 are two locking rolls 25 which are spring pressed towards each other as shown in Fig. 9 and engage the lower side of the bar 23 and inclined surfaces on the block 24. A releasing plunger 26 provided with a wedge shaped upper end is located between the rolls and is acted upon by a cam 27 on the actuating cam shaft 28 for the lasting mechanisms. An upward movement of the plunger 26 forces the rolls 25 apart and thus releases the bar 23, while a downward movement of the plunger permits the rolls to lock the bar against movement in either direction. This mechanism locks and unlocks the supports for the upper stretching and stitch forming devices during each cycle of operations of these devices, the mechanism being so timed that the supports are locked against movement during the passage of the main sewing needles 3 through the upper and sewing rib.

By reason of the manner in which the cylindrical portion 6 of each support is mounted in the carrier block 10, each support is capable of a rotary or turning movement about an axis substantially perpendicular to the surface of the shoe sole. This construction permits the supports to be rotated or turned, as the point of operation of the lasting and sewing devices is transferred along the shoe, to cause the main sewing needles 3 to operate in paths substantially normal to the sewing rib. These movements also rotate the grippers so that the upper engaging surfaces of the gripping jaws are substantially parallel to the edge of the shoe upper and are thus enabled to grasp the upper with certainty and to act on the upper to the best advantage. To produce the least possible amount of bodily displacement of the stitch forming devices and grippers from the operating point the supports are so mounted that the axes about which they rotate pass through the rib engaging surfaces of the channel guides. Each support is held in place in a carrier block 10 between a flange at the lower end of the cylindrical portion 6 and a ring 29 clamped upon the upper end of the cylindrical portion, as best shown in Figs. 13 and 16. From each ring 29 a stud 30 extends which is connected by a rod 31 to one arm of a bell crank lever 32, the other arm of which is connected to a link 33 which is actuated from the pattern mechanism hereinafter described (see Figs. 6, 8 and 16). Through these connections the supports for the upper stretching and stitch forming devices are given the desired rotary positioning movements to compensate for the edge curvature of the shoe sole or of the sewing rib as the point of operation is transferred along the shoe.

Referring to Figs. 11 to 19 inclusive, the inner jaw 1 and the outer jaw 2 of each pair of grippers are pivotally connected together at 34. The jaw 1 has a plate-like portion extending a considerable distance above the pivot 34 which is provided with a laterally extending pin 35 about midway its length and with an inclined slot 36 at its upper end. The pin 35 engages an inclined guiding surface 37 formed in one of the plates 7 and 8 and the slot 36 is engaged by a guiding pin 38. The gripping jaw 1 is thus mounted between the parallel plates 7 and 8 of the support so that it is capable of an upward and downward movement away from and towards the shoe sole. During this movement it is guided by the slot 36 and surface 37 so that it moves upwardly and slightly inwardly over the sewing rib. The jaw 2 of each gripper is also provided with an upwardly extending plate-like portion, and in this portion of the gripper and in the corresponding portion of the gripper 1 are formed slots 39 and 40 arranged at an angle to each other and engaged by a pin 41. The arrangement of the slots 39 and 40 is such that an upward movement of the pin when the grippers are open and in their lowest position will first close the gripping jaw 2 upon the jaw 1 and then move the jaws bodily upward. To cause the gripping jaws to be closed before an upward movement takes place, a friction device is provided which bears against the upper end of the jaw 1. This friction device consists of two plates 42 and 43, best shown in Fig. 13, mounted upon the pin 38 at opposite sides of the upper end of the gripping jaw 1, and a spring 44 interposed between a nut 45 on the free end of the pin and the plate 42. The pin 41 (see Fig. 17) is mounted at the free end of a lever consisting of parallel bars 46 pivotally connected at 47 to a link 48 pivotally mounted between the flanges projecting downwardly from the cylindrical portion 6 of the support. The lever 46 and link 48 form a toggle which acts to force the grippers inwardly over the shoe sole as soon as the upward movement of the pin 41 is stopped by the resistance offered by the shoe upper. The lever 46 is connected by a rod 49 to a cross head 50 (see Fig. 13) mounted to slide in the cylindrical portion 6 of the support. This portion of the support is made hollow to receive the cross head 50 which is semi-cylindrical in shape and which has a bearing against the inner wall of the cylindrical portion 6 and against the face of a corresponding cross head forming a portion of the mechanism for actuating the main thread needle of the sewing mechanism, as will be hereinafter described.

The grippers are actuated to pull simultaneously upon the opposite sides of the shoe upper, and to so actuate them the cross heads 50 are connected by means of connecting rods 51 to opposite sides of a cross head 52 (see Figs. 10, 11 and 13). To permit the supports to be rotated without interfering with the connections between the cross head 50 and the cross head 52 the pivot pin on the lower end of each link 51 is formed on a segmental block 53 mounted in a correspondingly shaped horizontal recess or guideway in the cross head 50 (see Figs. 13 and 16). The cross head 52 is actuated from a cam on the shaft 28 through a cam lever 54, the rear end of which is engaged by the cam on the cam shaft and the forward end of which is connected to the cross head 52 by means of a lever 55. The lever 55 is pivotally mounted on the forward end of the lever 54 and has its forward end pivotally connected to the cross head 52 and its rear end connected to a vertical rod 56 (see Fig. 10), the lower end of which is attached to a spring 57. With this construction an upward movement of the forward end of the lever 54 acts through the lever 55 to exert a yielding upward pull upon the cross head 52. The relative movement permitted between the lever 55 and the lever 54 is limited by adjustable stop screws 58 mounted in the lever 55 and arranged to contact with opposite sides of a projection 59 from the hub of the lever 54. The strain exerted upon the upper by the grippers will depend upon the tension of the spring 57, and in order that this strain may be varied during the lasting operation as different portions of the upper are acted upon the tension of the spring 57 is varied by connections to the pattern cam mechanism, as will be hereinafter described. In this connection it is to be noted that the grippers act automatically to exert a heavier strain upon thick stock than upon thin stock, due to the fact that the jaws engage thick stock earlier in the cycle so that more of the movements of the lever 46 and pin 41 are expended in moving the jaws upwardly and inwardly. To guide the cross head 52 in its up and down movements it is connected at its upper end by means of a parallel motion link 60 to an arm 61 pivotally mounted upon the frame of the machine, and of a length equal to the forward end of the lever 54. The arm 61 and the forward end of the lever 54 are connected by a link 62.

The operation of the sewing mechanism will be clearly understood from an inspection of Figs. 20 to 25. In these figures the sole of the shoe being operated upon is indicated at 63, the sewing rib of the sole at 64 and the shoe upper at 65. While the shoe is stationary the needles 3, which are eye pointed and curved and handle the main sewing thread, are moved simultaneously towards each other and pass through the upper and sewing rib, as indicated in Figs. 20, 21 and 22. This carries the loops of the main sewing thread through the upper and sewing rib. The needles are now retracted slightly, causing the thread to bulge at the upper sides of the needles between the needle eyes and the sewing rib. The looper needles 4, which are arranged to move in paths at right angles to the needles 3 just inside of the sewing rib and which are also curved and eye pointed, are now advanced through the loops of the main sewing thread, as indicated in Figs. 20, 21 and 22, so as to carry a loop of locking thread through each loop of main thread. Each locking loop is now entered by a loop retainer 5 which passes downwardly between the looper needle and the leg of the loop nearest the sewing rib, this movement of the loop retainer being permitted by a recess in the side of the looper needle just back of the eye. The loop retainers 5 now dwell while the looper needles 4 retract from the main needle loops leaving the locking loops therethrough, the main needles retract leaving their loops on the inside of the sewing rib engaged by the locking loops, the main threads are acted upon by the take-ups to draw the stitches tight, as indicated in Fig. 25, and finally the loop retainers are lifted from the locking loops. The work is now fed the distance of a stitch and the operations are repeated to form the seam illustrated in Fig. 25. It will be noted from an inspection of Figs. 20 to 25 that each channel guide is recessed to receive the looper needle and is cut away above the recess sufficiently to permit the loop retainer to enter the locking loop. By reason of this construction and the fact that the looper needle is curved, the channel guide can extend beneath the path of the looper needle along the sewing rib close up to the point where the main needle pierces the rib. The main needles 3 are slightly offset so as to enter the rib out of line with each other in order to avoid any possible interference of the needles with each other. The needles pass through the rib 64 of the insole in a plane substantially parallel to the surface of the sole and close to the base of the rib so that the shoe upper is drawn snugly against the rib and the feather of the insole outside of the rib, and is firmly secured in the angle between these parts.

The carrier for each main sewing needle 3 (see Figs. 17 and 19) is in the form of a yoke 66 which straddles the gripping jaws 1 and 2 and which is supported by pivot studs or trunnions 67 near the lower ends of the side plates 7 and 8. Each needle carrier is oscillated through a connecting link 68, the lower end of which is pivoted to the carrier and the upper end of which is carried by a cross head 69 similar to the cross head 50 and mounted in a similar manner in the cylindrical portion 6 of the support for the upper stretching and stitch forming devices. Each cross head 69 is connected by means of a segmental block 70 and link 71, having a similar construction to the segmental block 53 and link 51, to the cross head 72 mounted to move above the supports for the upper stretching and stitch forming devices beside the cross head 52. The cross head 72 is actuated from a cam on the actuating shaft 28 through a lever 73 (see Figs. 10 and 11), the rear end of which is engaged by a cam on the shaft, and the forward end of which is pivotally connected to the cross head. To guide the cross head during its up and down movements, it is connected to the frame of the machine by a parallel motion link 74.

Each looper needle (see Figs. 13, 15 and 32) is formed on the lower end of a segmental bar 740. This bar is mounted to slide in a correspondingly shaped guideway formed in a flange 75 projecting from the plate 8. The bar is held in its guideway by a retaining plate 76. A link 77 connects the bar 740 with a segmental shaped block 78 (see Figs. 13 and 14) mounted in a correspondingly shaped horizontal guideway in the lower end of a vertical plunger 79 mounted in the carrier block 10. This segmental block and slot connection in the mechanism for actuating the looper needle is for the purpose of permitting rotary movement of the support for the upper stretching and stitch forming devices while maintaining an operative engagement between the link 77 and the plunger 79. Each plunger 79 is actuated through a bell crank 80 mounted in the carrier block 10, one arm of which is shaped to engage a slot in the upper end of the plunger 79 and the other arm of which is shaped to engage a transverse slot in a plunger rod 81 mounted to slide axially through the pivot stud 12 of the carrier block 10, this pivot stud being in the form of a hollow sleeve so as to form a guideway for the rod. The plunger rods 81 (see Figs. 8 and 10) are connected at their outer ends to the opposite ends of a cross head 82 and this cross head is actuated from a cam on the actuating cam shaft 28 by means of a lever 83. The rear end of this lever engages a cam on the cam shaft and the forward end of the lever is provided with a block 84 which engages a slot in the cross head 82. The block 84 is mounted upon a pin projecting eccentrically from a stud 85 mounted in the lever 83 so as to be capable of rotary adjustment and held in position by a clamping bolt 86.

Each loop retainer 5 (see Figs. 13 and 32) is formed on the lower end of a rod 87 mounted to slide in a vertical guideway formed in the plate 8. To the upper end of the rod 87 is secured a rectangular block 88, the sides of which engage the inner surfaces of a guideway and thus prevent the rod from turning so as to displace the loop retainer. Near its upper end the rod 87 is provided with a slot which is engaged by the inner end of a short lever 89, the outer end of which is pivotally mounted between the flange 75 and a flange 90 projecting from the plate 8. Between its ends the lever 89 has a bearing in a block 91 mounted on the lever and arranged to be engaged by shoulders 92 and 93 formed on the connecting rod 77 and arranged to extend respectively above and below the block. The loop retainer is actuated by the engagement of the shoulders 92 and 93 with the block 91 and there is sufficient lost motion between the shoulders and the block to produce the desired amount of dwell in the movement of the loop retainer. To insure the proper movement of the loop retainer a friction block is arranged to bear against the side of the rod 87 and is pressed against the rod by a spring 94.

The take-ups for the main sewing threads consist of levers 95 mounted side by side on a pivot stud 96 and provided at their forward ends with rolls over which the main sewing threads pass, there being a take-up lever and roll for each thread (see Figs. 6, 8, 10, 11 and 12). The take-up levers are mounted to turn freely on the pivot stud 96 and are actuated by means of a cam lever 97 mounted on the pivot stud 96 at one side of the levers 95. The rear end of the lever 97 is acted upon by a cam on the actuating shaft 28 and the forward end of the lever extends between and above the forward ends of the take-up levers. The actuating lever 97 is connected to the take-up levers by means of a pin 98 (see Figs. 8 and 10) projecting from the rear portion of the lever 97 through slots in the rearwardly extending portions of the take-up levers. The forward ends of the take-up levers are connected to the actuating lever by means of springs 99. With this construction the take-up levers 95 are normally held by the springs 99 in a position in which the pin upon the actuating lever engages the top of the slots in the take-up levers, but at the limit of the upward stroke of the take-up levers they are allowed to yield with relation to the actuating lever, the strain of the thread overcoming the tension of the springs 99. This yielding connection between the take-up levers and their actuating lever is utilized in stopping the machine in case of a mis-stitch, as will be hereinafter described.

Each main thread leads from the eye of a needle 3 over a guide roll 100 mounted in an arm projecting from the carrier block 10 of a support for the upper stretching and stitch forming devices, under a guide roll 101 mounted on the carrier block 10, over a take-up roll, downwardly under a guide roll 102 mounted on a plate 103 secured to the side wall 13 of the machine frame (see Fig. 6), upwardly over a guide roll 104, rearwardly through a guiding tube 105, around a tension wheel 106, over guide rolls 107 and 108 to a wax pot 109, and thence to the source of supply. All of the rolls above referred to are duplicated for each thread as are also the tension wheels 106. These tension wheels are constructed as is usual in wax thread sewing machines and are mounted side by side upon a supporting stud 110. The tension wheels are mounted to turn upon the stud 110 and their hubs are separated by a plate 111 (see Figs. 8 and 10). To prevent this plate from turning it is provided with an upwardly extending portion which is engaged by a pin 112 projecting from the bearing for the stud 110 through a hole in the plate. A spring 113 interposed between the bearing for the stud 110 and a nut 114 screw threaded upon the stud forces the stud in a direction to cause a washer 115 at the other end of the stud to be pressed against the hub of one of the tension wheels 106 and press the hubs of the wheels and the separating plate 111 towards the bearing for the stud 110, and thus exert a braking action on the tension wheels to produce the required amount of tension on the threads during the stitch setting action of the take-ups. A constant tension is maintained upon the threads during the lasting operation, but the tension is automatically released at the conclusion of the operation, as will be hereinafter described.

The locking threads lead from the looper needles 4 to guides 116 on the side wall 14 of the machine frame, then rearwardly through guides 117, as indicated in Figs. 2 and 10, and then to the source of supply.

The jack of the illustrated machine comprises a hollow spindle 118 upon the upper end of which the body portion of the jack is carried. At its lower end the spindle 118 is connected by a gimbal joint to a support in the form of a ring 119 (see Figs. 4, 51, 52 and 53). The gimbal joint comprises a gimbal ring 120, pivot pins 121 connecting the ring 120 to the ring 119, and pivot pins 122 connecting the ring 120 with the enlarged lower end of the spindle 118, the pivot pins 121 and 122 being arranged upon diameters of the ring 120 at right angles to each other. The supporting ring 119 is mounted on the outer end of an arm 123 which is pivotally mounted at its rear end so as to be capable of swinging vertically upon a support 124. This support is mounted so as to swing about a substantially vertical axis upon a frame 125 and the frame 125 is pivotally mounted at its lower end upon the frame of the machine base so as to be capable of swinging about a horizontal axis. With the exception of the supporting ring 119, this jack supporting structure is similar to that of the machine disclosed in the application of Topham and Morrill, Ser. No. 312,366, hereinbefore referred to. This jack supporting structure permits the jack at the upper end of the spindle to move inwardly and outwardly in a direction transverse to the line of feed and to be moved longitudinally back and forth in the line of feed, these movements being permitted by the gimbal joint at the lower end of the spindle. This construction also permits the lower end of the spindle to be moved to impart transverse and longitudinal tipping movements to the jack, the transverse tipping movements being produced by swinging the frame 125 about its pivotal connection with the machine base and the longitudinal tipping movements being produced by swinging the support 124 about its connection with the frame 125. To force the arm 123 upwardly so as to hold the sole of a shoe supported on the jack in contact with the channel guides during the lasting and sewing operation, a cord 126 is connected to the outer end of the arm and leads upwardly over a pulley 127 on the machine base through a guide 128 over a second pulley 129 and connects with a spring 130. To maintain the jack in a constant angular position with relation to the line of feed regardless of the swinging movements imparted to the jack supporting structure, the supporting ring 119 is connected by a parallel motion link 131 to an arm projecting from the frame 125.

The mechanism for moving the jack longitudinally to feed the shoe during the lasting operation (see Figs. 3, 4 and 39) comprises a feed lever 132 pivotally mounted at its rear end in the top plate of the machine base so as to swing in a horizontal plane and connected at its forward end by a bar 133 to the toe portion of the jack. The lever 132 is connected to one arm of a cam actuated lever 134 by means of links 135 and 136 which are pivotally connected together and to the free end of a swinging guiding link 137. The other end of the lever 134 is engaged by a pattern cam 138 (see Fig. 40) mounted upon a shaft 139. This shaft corresponds to the pattern cam shaft of the machine of application Ser. No. 312,366 hereinbefore referred to and is rotated through one complete revolution by mechanism hereinafter described during the operation of the machine in lasting a shoe and returning the jack with the shoe thereon to its original position. The cam shaft 139 is rotated continuously, but the shape of the cam 138 is such, as shown in Fig. 40, that the feeding of the shoe takes place intermittently. The swinging guiding link 137 is fulcrumed upon a lever 140 which is held locked in position during operation on a shoe. At its forward end the lever 140 is pivotally mounted at 141 upon the machine base so that it can be adjusted about the pivot 141 as a center to change the position of the fulcrum of the link 137. It will be apparent from an inspection of Fig. 3 that an adjustment of the fulcrum of the link 137 about the pivot 141 will vary the path of the pivotal connection of the links 135 and 136 and thus vary the length of the feeding movements imparted to the jack. The means for locking the fulcrum carrying lever 140 in adjusted position and holding it stationarily in position during the operation on a shoe comprises a rod 142 pivotally connected to the rear end of the fulcrum carrying lever and arranged to slide through a block 143 pivotally mounted on the machine base. The rod 142 is engaged by the inner cam shaped ends of short levers 144 mounted in the block 143, the outer ends of which levers have a pin and slot connection with a cross bar 145. This cross bar is connected to a rod 146, the forward end of which is pivotally connected to a short horizontal arm 147 pivotally mounted on the machine base. This arm is connected by a link 148 to one arm of a lever 149, the hub of which is engaged by a latch 150. With the lever 149 in a position to be engaged by the latch 150, the fulcrum carrying lever 140 is locked in position and it remains in this position during the operation on a shoe, during the returning of the shoe and jack to original position and until the next shoe to be operated upon is placed upon the jack. As has been stated, when the machine is at rest with the jack in position to permit the placing of a shoe thereon, the jack is out of operating position. The act of placing the shoe on the jack causes the fulcrum carrying lever 140 to be unlocked, as will be hereinafter described, and thus practically disconnects the jack from its feeding mechanism and permits an adjustment of the feeding mechanism for the size of the shoe to be operated upon, by the movement of the jack to bring the shoe to starting position. In this connection it will be noted that the toe of the shoe, regardless of its size, is always brought to the same position on the jack and that the operation on a shoe is started near the breast line of the heel. The toe portion of the jack, and consequently the end of the connecting rod 133 which is connected to the jack, is thus located different distances from the lasting devices at the start of the operation on different sizes of shoes and a corresponding variation will occur in the initial position of the feed lever 132. As will be apparent from an inspection of Fig. 3, any change in the position of the feeding lever 132 while the fulcrum carrying lever 140 is unlocked and the cam actuated lever 134 is stationary will swing the fulcrum carrying lever about its pivot and thus adjust the fulcrum of the swinging guiding link 137.

The frame 125 is actuated to impart the desired transverse tipping movements to the jack by a cam on the cam shaft 139 through a lever 151 pivotally mounted on a vertical shaft 152 and having one end in engagement with the cam and the other end connected to the frame 125 by a link 153.

The support 124 is swung on the frame 125 to impart the desired longitudinal tipping movements to the jack by a cam on the cam shaft 139 and connections comprising a lever 154 mounted on the shaft 152 and a connecting link 155 which connects the lever with an arm projecting from the lower end of the support.

The desired rotary or turning movements of the supports for the upper stretching and stitch forming devices are also produced from cams on the cam shaft 139 through suitable connections. These connections (see Figs. 4, 8, 9, 10, 39 and 40) comprise levers 156 and 157 having their hubs sleeved one over the other on the shaft 152 and having one arm in engagement with a cam on the cam shaft and the other arms connected by links 158 and 159 to arms projecting from the lower ends of vertical rock shafts 160 and 161. At its upper end each of these rock shafts is provided with laterally projecting arm 162 which engages corresponding arms 163 on the lower ends of shafts 164. The shafts 164 are mounted in the portion of the machine frame which supports the lasting and sewing mechanisms and at their upper ends are provided with horizontally extending arms 165 which are pivotally connected to the rear ends of the links 33 which are connected to the bell cranks 32 for the upper stretching and stitch forming devices, as hereinbefore described. Springs 166 connected to the links 33 act upon the links in a direction to maintain the projecting arms 163 on the rock shafts 164 in contact with the projecting arms 162 on the rock shafts 160 and 161.

The mechanism hereinbefore referred to for varying automatically during the lasting operation the tension of the spring 18 which tends to separate the supports for the upper stretching and stitch forming devices and the spring 57 which determines the stretching strain exerted upon the upper by the lasting grippers comprises a cam 167 (see Figs. 41, 42 and 43) and pivotal connections for varying the tension of the spring 18, and a cam 168 (see Figs. 41, 44 and 45) and suitable connections for varying the tension of the spring 57. These cams are driven in timed relation with the cam shaft 139 and are operative, as are the cams on the came shaft 139, throughout one complete cycle of operations of the machine in lasting a shoe. The connections between the came 167 and the spring 18 comprise a lever 169 engaged by the cam, the bell crank 19 hereinbefore referred to and the rod 20 which connects the bell crank with the lever 169. The connections between the cam 168 and the spring 57 comprise a rock shaft 170, an arm 171 secured to the lower end of the rock shaft and engaged by the cam, an arm 172 projecting from the upper end of the rock shaft, a rod 173 connected to the arm 172 and a bell crank 174, one arm of which is connected to the lower end of the spring 57 and the other arm of which is engaged by the rod 173.

The lasting mechanism and the pattern cam mechanism are driven from a sleeve 175 (see Figs. 6 and 7) mounted loosely on a vertical constantly rotating power driven shaft 176. This sleeve is provided at its upper end with a friction clutch member 177 which cooperates with a clutch member 178 fastened on the shaft 176. A spiral gear 179 is secured to the sleeve 175 and this gear meshes with a spiral gear 180 secured to the actuating cam shaft 28 of the lasting mechanism. The spiral gear 179 also meshes with a spiral gear 181 secured to the upper end of a vertical shaft 182. This shaft at its lower end is provided with a clutch block 183 connected to the shaft by a key 184 on the block engaging a transverse slot in the lower enlarged end of the shaft. The lower face of the block 183 is provided with teeth engaging correspondingly shaped teeth on the upper surface of the enlarged upper end of a short vertical shaft 185, the teeth being so arranged that the shaft 185 can be driven from the shaft 182 through the clutch block, but can be rotated in the same direction independently of the shaft 182 while the shaft 182 is stationary. This is for the purpose of permitting the pattern cam mechanism to be actuated independently of its driving mechanism to cause the jack to be moved longitudinally to its original position after having been moved outwardly at the conclusion of the lastitng operation, as will be hereinafter described. The lower end of the shaft 185 is provided with a gear 186 meshing with a gear 187 (see Fig. 39) on the upper end of a sleeve journaled on the shaft 152. Below the gear 187 the sleeve is provided with a series of gears 188 which in effect constitute an elongated gear meshing with a gear 189 upon the end of the pattern cam shaft 139. The pattern cam shaft 139 is thus driven continuously so long as the members of the main driving clutch 177 and 178 are engaged, and the ratio of the gearing is such that nearly one complete rotation is imparted to the pattern cam shaft while the sides of the shoe upper are being stretched over the last and sewed to the rib of the insole approximately from the breast line at the heel to the tip line at the toe. The pattern cam shaft 139 is provided with a series of sets of cams as in the machine of application Ser. No. 312,366 hereinbefore referred to, there being a set of cams for each style of shoe to be operated upon. The different sets of cams are brought into cooperative relation with the cam levers by a longitudinal adjustment of the cam shaft, the construction for producing this adjustment being the same as disclosed in application Ser. No. 312,-366, and comprising a shaft 190 passing axially through the shaft 139 which is in the form of a sleeve journaled upon the shaft 190. The lower end of the shaft 190 (see Fig. 2) has a screw threaded engagement with a vertically adjustable sleeve 191 mounted in the lower portion of the machine base. The cam shaft 139 rests upon the upper end of the sleeve 191 so that a vertical adjustment of the sleeve produces a corresponding adjustment of the cam shaft. At its upper end above the top plate of the machine base the shaft 190 is provided with an arm 192 by which the shaft 190 may be turned manually to adjust the cam shaft. One complete turn of the shaft 190 will move the shaft sufficiently to shift from one set of cams to another. To hold the cam levers away from the cams while the cam shaft is being adjusted, the shaft 152 upon which the cam levers, with the exception of the lever 134, are mounted, is provided with shouldered collars 193, as in the machine of Ser. No. 312,366, which, when the shaft 152 is turned by an arm 194 connected to the upper end of the shaft, engage the hubs of the levers and move the cam ends of the levers away from the cams. To move the cam lever 134, through which the feed lever is actuated, away from its cam, a link 195 is connected to one arm of the lever 134, as indicated in Fig. 3, and this link has a pin and slot connection with the outer end of an arm 196 secured to the shaft 152. To lock the arm 192 in position until the arm 194 is actuated to remove the cam levers from the cams a pin at the outer end of the arm 194 is arranged to engage a slot in the arm 192.

The cams 167 and 168, which control respectively the tension of the spring which separates the supports for the upper stretching and stitch forming devices and the tension of the spring which determines the stretching strain exerted by the lasting grippers upon the upper, are driven in timed relation to the cam shaft 139 from a gear 197 secured to the shaft 185 below the gear 186. This gear meshes with a gear 198 upon the upper end of a vertical shaft 199, the lower end of which is provided with a small gear 200 meshing with a large gear 201, to the lower surface of which the cam 168 is secured. The ratio of the gearing for driving the cam 168 is such that the cam makes one third of a revolution during each complete revolution of the pattern cam shaft 139. Accordingly, the cam 168 is formed with three similar portions about its periphery. The cam 167, for convenience of construction, is mounted upon a part of a mechanism, hereinafter described, which is driven from the gear 201 and which is utilized in actuating and controlling the mechanism mounted in the jack for jacking and unjacking the shoe.

The stopping mechanism which at the completion of the lasting operation acts to disconnect the lasting mechanism and the pattern cam mechanism from the driving mechanism comprises a bell crank lever 202 (see Figs. 6 and 7), the horizontal arm of which engages a cam groove 203 in the sleeve 175 and the vertical arm of which is provided at its lower end with a hole adapted to receive a locking bolt 204. During the lasting operation the sleeve 175 is held in its upward position with the clutch members 177 and 178 in engagement by means of a spring 205 interposed between the lower end of the sleeve and a flange on a bushing 206 surrounding the shaft 176 and resting on a shoulder on the machine frame. Also during the lasting operation the locking bolt 204 is held in retracted position, so that the bell crank 202 vibrates idly. The locking bolt 204 is mounted in one end of a horizontally movable locking bolt carrier 207, the other end of which projects beyond the machine frame, as indicated in Fig. 6, and is acted upon by a spring 208 which bears against a collar upon the carrier and tends to move it towards the left, as viewed in Fig. 6. At the end of the lasting operation the locking bolt 204 is released, as will be hereinafter described, and is forced by its spring 209 (see Fig. 8) against the side of the bell crank 202, and as soon as the hole in the bell crank is brought into alignment with the locking bolt the bolt enters the hole in the bell crank. This occurs at a predetermined point in the rotation of the shaft 176 and of the actuating cam shaft 28 of the lasting mechanism, and locks the lower end of the vertical arm of the bell crank to the locking bolt carrier. Continued rotation of the shafts and of the sleeve 175 oscillate the bell crank in a direction to move the locking bolt carrier 207 to the right, as viewed in Fig. 6, against the tension of the spring 208. A partial return movement is permitted to the locking bolt carrier and then its return movement to the left is stopped by a spring pressed latch lever 210, a projection on the upper side of which engages a shoulder on the locking bolt carrier. The lower end of the vertical arm of the crank is now held stationary and continued rotation of the sleeve 175, by reason of the engagement of the cam groove 203 with the horizontal arm of the bell crank moves the sleeve downwardly against the tension of the spring 205, thereby disconnecting the clutch members 177 and 178 and bringing a brake member 212 formed on the lower end of the sleeve 175 into engagement with a fixed brake member 213. This disconnects the lasting mechanism and the pattern cam mechanism from the driving mechanism and stops the sewing mechanism with the main needles, the looper needles and the loop retainers in retracted position.

The means for holding the locking bolt 204 in retracted position during the lasting operation comprises a horizontally arranged lever 214 (see Figs. 6 and 8), one arm of which is forked and engages the inner face of a disk 215 secured to the outer end of the locking bolt and the other arm of which is provided with a bevel gear segment meshing with a bevel gear segment upon the upwardly projecting arm of a lever 216. This lever is arranged to swing in a vertical plane and the arm opposite the bevel gear segment is pivotally connected to the upper end of a vertical rod 217. This rod is acted upon by a spring 218 which tends to raise the rod and is provided with a lateral projection 219 which during the lasting and sewing operation is engaged by a spring pressed latch 220. So long as the latch 220 is in engagement with the upper surface of the projection 219 the rod 217 is held in its depressed position and the locking bolt 204 is held out of engagement with the vibrating lever 202 of the stop mechanism. The latch lever 210 which limits the movement of the locking bolt carrier to the left during the operation of the stopping mechanism is provided with a slot 221 which is engaged by a pin projecting from the lever 216 so that the latch is withdrawn from engagement with the locking bolt carrier when the rod 217 is depressed and is held out of engagement with the locking bolt carrier until the rod is released.

At the conclusion of the lasting operation the latch 220 is automatically withdrawn from the projection 219 of the rod 217 so as to set the stop motion into operation by connections actuated from the pattern cam shaft 139. The latch 220 is mounted to slide horizontally in guideways on the machine frame and is pressed towards the rod by means of a spring 222. The latch on its upper surface is provided with a V-shaped notch, opening towards the rod, which is engaged by a pin 223 projecting downwardly from the right hand end of a lever 224, as viewed in Fig. 6. This lever is mounted to swing in a horizontal plane and its movements either forwardly or rearwardly will cause the pin 223 to retract the latch 220, thereby throwing the stop motion into operation. After the pattern cam shaft 139 has made nearly a complete revolution the left hand end of the lever 224 is swung forwardly, to throw the stop mechanism into operation, by the engagement of a block 225 (see Figs. 3 and 5) secured to the upper surface of the gear 189 at the upper end of the cam shaft 139, with a lever 226 pivotally mounted at 227 and connected to a rod 228, the forward end of which is mounted to slide in a guiding block 229 pivotally mounted on the machine frame. The forward end of the rod 228 is arranged to engage the end of a dog 230 pivotally mounted at the left hand end of the lever 224. This dog is in the form of a bell crank with one arm normally in position to form in effect a continuation of the rod 228. This dog is interposed between the rod 228 and the lever 224 in order to permit the lever to be moved rearwardly when the machine is stopped on account of a mis-stitch, as will be hereinafter described. The arrangement of the connections above described is such that as the cam shaft 139 nears the end of a revolution the lever 226 is rocked by the engagement therewith of the block 225, the rod 228 is moved longitudinally towards the front of the machine and the lever 224 is swung forwardly to actuate the latch 220 and throw the stop mechanism into operation.

The mechanism which is normally idle (see Figs. 6, 7 and 8), but which is automatically connected to the driving shaft 176 when the lasting mechanism and the pattern cam mechanism are disconnected therefrom by the action of the stop mechanism, and which acts to depress the jack, sever the threads of both seams, move the jack outwardly and impart the final movement to the pattern cam mechanism, comprises an eccentric 231, mounted to turn loosely upon a hollow stud 232 formed on the machine frame below and in axial alignment with the shaft 176. Vertically below the eccentric 231 is a clutch block 233 mounted to slide longitudinally on and to rotate with a continuously rotating shaft 234. This shaft is provided on its upper end with a gear 235 which is driven from a gear 236 at the lower end of the shaft 176 through gears 237 and 238. The opposed faces of the clutch block 233 and eccentric 231 are provided with teeth through which the eccentric can be driven from the clutch block whenever the block is raised into engagement with the eccentric. The block 233 is engaged by the forked arm of a lever 239, the other arm of which is provided with a projection arranged to be engaged by a projection on the lower end of a rod 240. The upper end of this rod is connected to an arm 241 on one end of a rock shaft 400, to the other end of which is secured an arm 242 provided with a bevel gear segment meshing with a bevel gear segment on the horizontal arm of a bell crank 243, the vertical arm of which is forked and engages a flanged sleeve at the left hand end of the locking bolt carrier 207. The lever 239 is normally held in a position in which the clutch block 233 is out of engagement with the eccentric 231 by means of a spring pressed conical pointed pin 244, and the rod 240 is normally held in such position that the projection on the rod is at one side of the projection on the lever 239, as shown in Fig. 7. The lower end of the rod 240 is arranged to move vertically between two pins 245 projecting upwardly from a short lever 246 pivoted concentrically with the latch actuating lever 224. The lever 246 is acted upon by two spring pressed plungers 247 mounted in the lever 224 and arranged so that their tendency is to keep the lever 246 in alignment with the lever 224. With this construction, when the lever 224 is swung forwardly to throw the stop mechanism into operation, the lever 246 will be retained in its original position by reason of the engagement of the side of the projection on the rod 240 with the projection on the lever 239. As the stop mechanism operates, the movement of the locking bolt carrier 207, first to the right, as viewed in Fig. 6, and then to the left, will raise and lower the rod 240, the rod being moved forwardly by the lever 246 as the projection on the rod passes above the projection on the lever 239 during the upward movement of the rod, and actuating the lever 239 during its downward movement to move the clutch block 233 into engagement with the eccentric 231. To permit the clutch block to be moved away from the eccentric and thus throw the eccentric out of operation the rod 240 is moved rearwardly to release the lever 239. This takes place after the eccentric has made a complete revolution. To thus move the lever 246 rearwardly and to release the lever 239 the lever 246 (see Fig. 4) is provided with gear teeth 248 engaged by teeth on one arm of a lever 249. At its other end the lever 249 is provided with a swinging dog 250 adapted to be engaged by a dog 251 on an arm 252 projecting from a rock shaft 253 which is rocked forwardly and backwardly during the rotation of the eccentric, the construction being such that during the forward movement of the arm the dog 251 passes the dog 250 without actuating the lever 249, but during the return movement of the arm the engagement of the dog 250 with the dog 251 actuates the lever 249 to return the lever 246 to its original position and thus move the rod 240 out of engagement with the lever 239.

As has been stated the mechanism actuated by the eccentric 231 includes a rock shaft 253. This rock shaft is below and in vertical alignment with a rock shaft 254 and is connected thereto by a key and slot so that the two shafts turn in unison. At its upper end the shaft 254 is provided with a laterally extending arm 255 (see Figs. 6 and 8) to which is connected the eccentric strap and link 256 of the eccentric 231. At its lower end the rock shaft 253 is provided with an arm 257 carrying bevel gear teeth which mesh with a bevel gear segment 258 secured to a short horizontal shaft 259. Loosely mounted upon the shaft 259 is a plate like arm or lever 260 the rear side of which, during forward movement of the segment 258, is engaged by a pin 261 projecting from the segment (see Fig. 34). During the rotation of the eccentric 231 the segment 258 is moved forwardly and then rearwardly and during its forward movement the lever 260 is moved from a substantially horizontal position to a vertical position. The lever 260 is retained in this position by the engagement of a spring pressed latch 262, mounted on the lever, with a projecting ledge 263 on the machine frame.

The lever 260 depresses the jack and moves it outwardly. Near its lower free end it is provided with a cross bar 264, which, during the forward swinging movement of the lever, (see Figs. 26, 27 and 28) engages the upper surface of a bar 265 and first depresses the bar and then moves it longitudinally towards the front of the machine. The bar at its forward end is connected by a ball and socket joint to the jack spindle and its rear end is connected by a swivel joint to the lower end of an arm 266 pivotally mounted in a bracket 267 depending from the top plate of the machine base. It will be apparent from an inspection of Figs. 26, 27 and 28 that the upper surface of the bar 265 which is engaged by the cross bar 264 is so shaped that the jack will dwell for a brief space of time, after being depressed, before it is moved outwardly. While the jack thus dwells in depressed position the thread severing mechanism is actuated, and in order to lock the jack at this time against outward movement, locking mechanism is provided for preventing longitudinal movement of the bar 265. This mechanism, shown in detail in Figs. 29 and 30, comprises a braking segment 268 on the arm 266 and a cooperating brake shoe 269 mounted upon the horizontal arm of a bell crank 270. The forward arm of this bell crank is acted upon by a spring 271 which tends to move the brake shoe into engagement with the braking segment, and is also acted upon by segmental cam 272, pivotally mounted in the bracket 267, and connected by a rod 273 to an arm projecting from the rock shaft 259. The shape of the cam 272 is such that the brake shoe 269 is held pressed against the braking segment 268 during the dwell of the jack in depressed position and is then removed from the braking segment to permit the continued movement of the lever 260 to move the jack outwardly. This final outward movement of the jack is produced by the engagement of the cross bar 264 of the lever 260 with the upper end of a plunger 274 mounted in the bar 265. Before striking the plunger 274, the cross bar 264 passes over a projection 275 on the bar 265 so that when the jack is in its outward position it is held against either inward or outward movement by the engagement of the cross bar 264 with the recess formed between the projection 275 and the plunger 274.

The thread severing mechanism comprises two cutting blades 276 (see Figs. 26, 28, and 34 to 38) pivoted together at 277 to the forward end of a bar 278 mounted to slide in a substantially horizontal plane forwardly and rearwardly transversely of the shoe supported upon the jack. The guideway for the bar 278 consists of a sleeve 279 also mounted to slide forwardly and rearwardly transversely of the shoe upon the jack in a guideway 280 on the machine frame. The hubs of the cutting blades 276 are provided with gear segments which mesh respectively with racks 281 formed on arms projecting forwardly from the forward end of the sleeve 279. The construction and arrangement of the parts of the thread severing mechanism so far described are such that a bodily forward movement in unison of the sleeve 279 and the bar 278 will move the cutting blades bodily into a position to act on the threads of the two seams and then a continued independent movement of the bar 278 will move the cutting blades from open position, as illustrated in Fig. 37, to closed position, as illustrated in Fig. 38. The cutting blades are of a length sufficient to extend across the shoe and as their cutting edges pass by each other they sever substantially simultaneously the four threads of the two seams. This operation is best shown in Figs. 26 and 27. A retracting movement together of the bar 278 and sleeve 279 imparts a bodily retracting movement to the cutting blades and then an independent movement of the bar 278 returns the blades to their original open position, as shown in Fig. 37.

To actuate the thread cutting blades in the manner above described, the rear end of the bar 278 is connected by means of a link 282 to the upper end of an arm 283, the lower end of which is pivotally mounted upon a stud 284. Also pivotally mounted upon the stud 284 beside the arm 283 is an arm 285, and this arm is connected by means of a link 286 to an arm 287 projecting from the rock shaft 259. A pawl 288 is mounted upon the free end of the arm 285 and is acted upon by a spring 289, the tendency of which is to hold the pawl in engagement with a lug 290 projecting from the side of the arm 283. With this construction, as the segment 258 and the shaft 259 are rocked in a direction to move the jack depressing lever 260 downwardly and forwardly, the arm 283 is swung forwardly and a forward movement is imparted to the bar 278. As the bar 278 is thus moved the sleeve 279 is carried with it until the movement of the sleeve is stopped by a pin 291 which projects upwardly from the guideway for the sleeve into a longitudinal slot in the sleeve. The throw of the arm 283 is sufficient to continue the forward movement of the bar 278 to actuate the thread cutting blades, as hereinbefore described. The cutting of the thread takes place before a forward movement is imparted to the jack, and in order to permit this movement of the jack without imparting further movement to the thread cutting mechanism the pawl 288 is removed from engagement with the projection 290. This is accomplished by means of a cam groove 292 (see Figs. 3, 4, 9 and 36) formed in a stationary plate of the machine frame and engaging a pin 293 projecting laterally from the pawl. The position of these parts at the limit of the forward movement of the jack depressing lever 260 is indicated in Fig. 28. During the return movement of the segment 258 and rock shaft 259 the arm 285 engages the arm 283 and moves it backwardly and with it the cutting mechanism to original position. During the backward movement of the bar 278 the sleeve 279 moves with the bar until stopped by the engagement of the end of the slot in the sleeve with the pin 291 when the continued backward movement of the bar 278 opens the cutting blades to the position shown in Fig. 37.

The final movement of the pattern cam mechanism, after the jack has been moved outwardly, to move the jack longitudinally to original position is imparted through connections between the pattern cam shaft 139 and the arm 257 at the lower end of the rock shaft 253 which, as has been hereinbefore described, is oscillated first in one direction and then in the other by the eccentric 231. These connections consist of a rod 294 (see Figs. 3 and 5), the forward end of which is pivotally connected to the arm 257 and the rear end of which is connected to one arm of a bell crank 295, the other arm of which carries the pivot 227 for the lever 226. As has been described, the lever 226 is actuated by the block 225 on the gear 189 to throw the stop mechanism into operation at the completion of the sewing and lasting operation. As the rotation of the cam shaft ceases the lever 226 remains resting upon the block 225 and remains in this position until the eccentric 231 is thrown into operation. During the forward swinging movement of the arm 257 the bell crank 295 is rocked in a direction to move the lever 226 bodily so that it drops behind the block 225. As the arm 257 swings back to its original position during the latter part of the rotation of the eccentric 231, the lever 226 acts as a pawl to cooperate with the block 225 to turn the cam shaft a sufficient distance to complete its revolution. It will be noted that the cams on the cam shafts 139 are all open cams, so that as the cam shaft completes its revolution the cam levers which engage the cams are permitted to move towards the center of the shaft and thus return the parts to which they are connected to their starting position. As the cam shaft completes its revolution therefore the jack is moved longitudinally in the direction opposite to the direction of feed to the position occupied when the shoe was placed upon the jack. The final movement imparted to the pattern cam mechanism also completes the movement of the cams 167 and 168 so that the springs controlled by these cams are restored to their original condition.

The means operated from the stopping mechanism for releasing the tension on the main threads is best shown in Figs. 6, 8 and 9 and comprises an arm 296 secured to the rock shaft 400 which, as has been hereinbefore described, is rocked by the longitudinal movement of the locking bolt carrier of the stopping mechanism. The upper end of the arm 296 is provided with a cam surface which engages an arm 297 at the lower end of a short vertical rock shaft 298. At the upper end of the rock shaft 298 is an arm 299 which bears against the end of the stud 110 upon which the tension wheels are mounted. These parts are so constructed and arranged that as the lasting mechanism is stopped and before the jack is depressed the stud 110 is moved longitudinally to permit the tension wheels to rotate freely.

The mechanism for moving the supports carrying the upper stretching and stitch forming devices towards each other to remove the channel guides from engagement with the sewing rib at the conclusion of the lasting operation and to hold them locked in this position until the machine is again started into operation, comprises a cam surface on the upper side of the arm 255, forming a part of the mechanism actuated by the eccentric 231 as hereinbefore described, which cam surface is arranged to engage a roll at the outer end of the horizontal arm of the bell crank 22 (see Fig. 9). As the arm 255 is swung during the first portion of the rotation of the eccentric 231 the bell crank 22 is rocked in a direction to move the supports for the upper stretching and stitch forming devices towards each other. As the horizontal arm of the bell crank 22 reaches its highest position a spring pressed locking latch 300 mounted on the bell crank engages a block 301 on a stationary part of the machine frame. The supports of the upper stretching and stitch forming devices are thus locked in position until the locking latch is moved out of engagement with the block 301 which occurs when the machine is again thrown into operation, as will be hereinafter described.

The gages which cooperate to position the jack with relation to the operating devices to start the operation at a predetermined point on the shoe (see Figs. 2, 6, 31, 34 and 35) consist of a guiding pin 302 projecting laterally from a bracket secured to the heel portion of the jack, and a gage bar 303 provided at its forward end with a vertical guiding slot 304. The upper portion of the guiding slot is of a width equal to the diameter of the pin 302, while the lower portion of the slot is provided with outwardly flaring walls forming an inverted V to receive and guide the pin 302 during the upward movement of the jack to bring the shoe into operating position. The bar 303 is mounted to move forwardly and rearwardly in a guideway in the machine frame so as to bring it into and out of operative position. The bar is moved into the operative position indicated in Figs. 2, 28 and 35, during the downward and outward movement of the jack at the completion of a lasting operation, by the forward swinging movement of the arm 283 through which the thread severing mechanism is actuated. To enable the bar 303 to be so actuated it is provided at its rear end with a standard 305 on the upper end of which is pivotally mounted a forwardly extending arm 306 provided with a hooked end which extends into a position to be engaged by a pin 307 projecting laterally from the upper end of the arm 283. With this construction the gage bar 303 will be moved forwardly into operative position as the jack is moved downwardly and outwardly. To maintain the gage bar in this position until the machine is again thrown into operation after the jack has been positioned properly for the operation on the next shoe, a vertically sliding locking pin 308 is provided, which is mounted in the machine frame at one side of the gage bar, and the upper end of which is provided with a lateral projection 309 arranged to engage a recess in the bar. The locking pin 308 is acted upon by a spring 310 which forces the pin downwardly into locking engagement with the recess in the bar as soon as the bar reaches its forward operative position.

After the jack is positioned in the machine to start the operation at the desired point, the machine is thrown into operation through connections operated from a foot treadle 311. This treadle is connected by a vertical rod 312 to one arm of a bell crank 313, the other arm of which is connected by a link 314 to a rod 315 mounted to slide in a guideway in the upper front portion of the machine base. A depression of the foot treadle moves the rod 315 to the right as viewed in Figs. 1 and 6, which brings the right hand end of the rod into engagement with a lever 316. The lever 316 is provided with an arm extending over a flange at the lower end of the rod 217 of the stop mechanism, so that an actuation of the lever 316 as the rod 315 continues to move to the right depresses the rod 217 until the latch 220 snaps over the projection 219 on the rod and locks the rod in its depressed position. This downward movement of the rod 217 withdraws the locking bolt of the stop mechanism from the bell crank 202 and permits the sleeve 175 on the driving shaft 176 to be moved by the spring 205 so as to engage the clutch member 177 with the driving clutch member 178. The rod 315 is provided with a recess in its upper surface in which the lower end of the locking pin 308 for the gage bar rests while the gage bar is in its forward operative position. The movement of the bar 315 to the right in starting the machine lifts the locking pin 308 from engagement with the gage bar and permits a spring 317 connected to the gage bar to retract the gage bar to its inoperative position. The movement of the bar 315 to the right on starting the machine also causes a pin 318 on the bar to engage the lever 149 and move the lever into a position to be engaged by the locking latch 150 and cause the lever, through the connections hereinbefore described, to lock the feeding mechanism in adjusted position so as to permit it to function properly in feeding a shoe.

A depression of the rod 217 on starting the machine also removes the latch lever 210 from engagement with the lock bolt carrier and allows the lock bolt carrier to move a short distance to the left, as viewed in Fig. 6. This movement of the lock bolt carrier produces a slight counter-clockwise movement of the shaft 400, as viewed in Fig. 9, and causes a spring pressed dog 319 mounted on a projection from the hub of the arm 296 to engage the locking latch 300 and move it from the block 301, thereby permitting the supports for the upper stretching and stitch forming devices to be separated until the channel guides engage the sewing rib at opposite sides of the shoe.

Referring now to Figs. 54 and 55 the jack of the illustrated machine comprises a toe supporting arm 320, rigid with the hollow spindle 118, and a heel supporting arm 321 pivoted at its lower end upon the upper end of the spindle 118 so as to be capable of movement towards and from the toe supporting arm. The arm 320 is provided at its upper end with a toe rest 322, and the heel supporting arm is provided with a last pin 323 projecting upwardly from a lever 324 pivotally mounted upon the upper end of the arm 321, the arrangement being such that a pivotal movement of the lever 324 is permitted to force the toe of the shoe downwardly against the toe rest 322 and clamp the shoe in position on the jack. The lever 324 is provided with a gear segment 325 which is engaged by a gear segment on the hub of an arm 326 pivotally mounted on the arm 321 and connected by a spring 327 to the toe supporting arm 320. The tendency of this spring is to move the heel supporting arm 321 towards the toe supporting arm and to rock the lever 324 so as to clamp the toe portion of the shoe against the toe rest. While the jack is at rest in its forward position away from the lasting devices the heel supporting arm 321 is held separated from the toe supporting arm by means of a toggle lever consisting of links 328 and 329. The link 328 is pivotally connected to the heel supporting arm 321 and the link 329 is pivotally connected to the upper end of a lever 330 mounted upon a transverse pin 331 in the lower portion of the toe supporting arm 320. When the links of the toggle lever are in alignment and the lever 330 is in its extreme position to the left, as illustrated in Fig. 54, the heel supporting arm 321 is held separated from the toe supporting arm 320. This is the position of the parts when the jack is at rest at the front of the machine before a shoe has been placed on the jack, as shown in Fig. 55. When the shoe is placed on the jack the toggle lever is broken and the spring 327 is allowed to act to move the shoe longitudinally until the toe of the shoe reaches a predetermined position and then to clamp the shoe in the position to which it has been moved. The toggle lever is broken as the shoe is placed on the jack by the downward movement of a spring supported plunger 332 mounted on the lever 324 which carries the last pin 323. This plunger extends into a position to be engaged and depressed by the shoe last. At its lower end the plunger 332 is provided with a spring pressed dog 333 which, before a shoe is placed on the jack, stands directly above the laterally bent end of an arm 334 forming a part of the link 328 of the toggle lever. To limit the longitudinal movement of the shoe after the toggle is broken a rack bar 335 is pivotally mounted on the heel supporting arm 321 and engages a pinion 336 on a transverse shaft 337 mounted in the upper end of the toe supporting arm 320 below the toe support 322. To the shaft 337 is secured a ratchet wheel 338 with which cooperates a locking pawl 339. With the heel and toe supporting arms of the jack in separated position the locking pawl 339 is held out of engagement with the ratchet wheel 338 by a projection 340 at the end of the rack bar 335 which engages a lug on the locking pawl. As the heel supporting arm of the jack moves towards the toe supporting arm after the toggle lever has been broken, the locking pawl 339 is released by the projection 340 on the rack bar and is caught by a latch 341. A spring 342 is interposed between the latch and the locking pawl and serves to maintain the latch in engagement with the pawl and also moves the pawl into engagement with the ratchet wheel as soon as the latch is actuated to release the pawl. This release of the pawl by the latch is effected by the engagement of the toe end of the shoe with a feeler lever 343 which is arranged to actuate the latch 341 through a rod 344. To retard the movement of the heel supporting arm 321 towards the arm 320 under the force of the spring 327 a dash pot mechanism is provided comprising a cylinder 345 secured at its lower end to the jack frame, a longitudinally movable bar 346 having rack teeth formed at its upper end meshing with the pinion 336, and a piston 347 secured to the bar 346.

The toggle lever is straightened while the toe and heel supporting arms are in the position indicated in Fig. 54 by a movement of the lever 330 to the right, and then a return movement of the lever 330 to the left, while the toggle is in straightened position, separates the heel supporting arm from the toe supporting arm and unjacks the shoe. The straightening of the toggle lever is assisted by a spring 348 connected to the heel supporting arm 321 and to a projection from the link 328. The lever 330 is actuated from a lever 349 pivoted on the transverse pin 331. The levers 330 and 349 are connected by means of a coiled spring 350 and the lever 349 is provided with an abutment screw 351 which is held by the action of the spring 350 against a shoulder 352 formed on the lever 330. The lever 349 is provided with a bevel gear segment which meshes with a bevel gear upon the upper end of a shaft 353 journaled in the hollow spindle 118. This shaft is rotated first in one direction and then in the other at the proper times during the operation of the machine to straighten the toggle lever and to separate the heel supporting arm from the toe supporting arm to unjack the shoe, as will be hereinafter described.

The jack is held in its outward position by the engagement of the lever 260 with the bar 265 until the shoe which has been operated upon is removed from the jack and another shoe placed thereon. As the shoe to be operated upon is forced down upon the jack the jack is depressed, thereby swinging the bar 265 downwardly. The upper end of the plunger 274 is shaped to extend over the cross bar 264 on the lever 260, and as the bar 265 is depressed a downward pull is exerted on the cross bar 264. The cross bar forms a part of a slide, mounted in the lever 260, which is connected by means of a rod 354 with a lateral projection from the hub of the locking latch 262. As the jack is depressed, therefore, the latch 262 is freed from engagement with the ledge 263 on the machine frame. Continued downward movement of the jack causes the cross bar 264 to be raised above the projecting lug 275, the plunger 274 yielding to permit this movement, and then the lever 260 is swung backwardly to its original position by means of a spring 355 connected between the lever and the bracket 267. During this backward movement of the lever 260 the lever 149 of the mechanism for locking and unlocking the feed mechanism for the jack is released by the engagement with the locking latch 150 of a spring pressed pin 356 mounted in the lever 260. Placing a shoe on the jack therefore releases the jack so that it can be moved into operating position and unlocks the feeding mechanism for the jack so that it can be adjusted during this movement of the jack.

The mechanism mounted in the jack for unclamping the shoe and for resetting the mechanism which locates the shoe in a predetermined position longitudinally on the jack and clamps the shoe in position is actuated and controlled from the pattern cam mechanism through a flexible cord 357. This cord passes around a pulley 358 mounted in the forward end of the arm 123 of the jack supporting structure and arranged to rotate about a vertical axis passing through the center of the gimbal ring which forms a portion of the joint at the lower end of the jack supporting spindle 118 (see Figs. 51, 52 and 53). The pulley 358 is connected to the lower end of the shaft 353, which is journaled in the jack spindle, by a gimbal joint comprising a gimbal ring 359 mounted by pivotal pins 360 on arms extending upwardly from the hub of the pulley and connected by pivot pins 361 to the arms of a yoke secured to the lower end of the shaft 353, the pivot pins 360 being located in the same horizontal plane with the pivot pins 121 of the gimbal ring 120 which forms a portion of the gimbal joint connecting the jack spindle to its support. One end of the cord 357 is secured to the periphery of a grooved pulley 362, the hub of which is pinned to a sleeve 363 (see Fig. 44) journaled upon a vertical stud 364 mounted in a stationary bracket of the machine frame. From the pulley 362 the cord 357 passes over a guide pulley 365 mounted on the arm 123 of the jack supporting structure near its rear end, thence around the pulley 358 at the forward end of the arm, thence around a guide pulley 366 mounted on the arm 123 a short distance in front of the pulley 365 and thence over a guiding pulley 367 to a weight 368. During the operation of the lasting mechanism in working the sides of the shoe upper over the last and securing the upper to the sewing rib from the heel breast line to the tip line of the shoe, the pulley 362 is rotated in a direction to wind the cord around the pulley. This imparts a rotary motion to the pulley 358 and shaft 353 in a direction to swing the lever 330 of the mechanism mounted in the jack towards the right, as viewed in Fig. 54, so as to straighten the links 328 and 329 of the toggle lever. The pulley 362 then remains stationary while the jack is being depressed and moved laterally out of the machine. As the final movement is imparted to the pattern cam mechanism to move the jack longitudinally to its original position the pulley 362 is allowed to rotate backwardly under the influence of the weight 368, and thus, through the cord 357, the pulley 358 and shaft 353 are rotated in a reverse direction to swing the lever 330 of the jack mechanism to the left as viewed in Fig. 54 so as to move the heel supporting arm 321 away from the toe supporting arm 320 and unjack the shoe. For actuating the pulley 362 in this manner it is provided with a latch 369 pivotally mounted on its under surface and arranged to be engaged by one of a series of three pawls 370 secured to the upper face of the gear 201. The gear 201 is mounted to rotate loosely upon the lower portion of the sleeve 363 to which the hub of the pulley 362 is pinned. As has been hereinbefore described the gear 201 is connected through gearing to the pattern cam shaft 139 and the ratio of the gearing is such that the gear 201 makes a third of a revolution for each complete revolution of the shaft 139. The latch 369 is provided with a projecting arm 371 which, as the gear 201 and pulley 362 are rotated during the lasting operation, is brought nearly, but not quite, into engagement with the small gear 200 which meshes with the gear 201. When the final movement is imparted to the cam shaft 139 to complete its revolution and thereby move the jack longitudinally to its original position, a sufficient movement is imparted to the gear 201 and pulley 362 to bring the arm 371 of the latch 369 into engagement with the gear 200, thereby lifting the latch from engagement with the pawl 370 and permitting the pulley 362 to be turned backwardly through a third of a revolution to a position in which the latch 369 is engaged by the next succeeding pawl 370.

To retard the backward rotation of the pulley 362 under the influence of the weight 368 the illustrated machine is provided with a checking or snubbing mechanism. This mechanism (see Figs. 42 to 47) comprises an oscillating segmental piston 372 mounted to move back and forth in a semi-cylindrical chamber formed in a casing 373. For convenience of construction the casing 373 is formed with a cylindrical chamber, one half of which is filled by a stationary semi-cylindrical block 374. The piston 372 projects from a vertical shaft 375, the lower end of which is reduced in size and is journaled in the lower portion of the casing and the upper end of which is journaled in a plug 376 which closes the upper end of the chamber in the casing. To the lower end of the shaft 375 is secured an arm 377 formed at its outer end as a segmental gear which meshes with a segmental gear 378 on the hub of the pulley 362. The pulley 362 is thus connected to the piston 372 so that the piston is oscillated in the chamber by the forward and backward movement of the pulley. The chamber in the casing 373 is filled with a suitable fluid, and in order to retard the movement of the piston in one direction while permitting it to move with substantial freedom in the opposite direction the piston is provided with a passageway 379, leading from one side of the piston to the other, and with a check ball valve 380 to prevent the flow of liquid in one direction. To provide for a comparatively slow movement of the liquid from one side of the piston to the other, a passageway 381 is formed in the block 374 communicating with the chamber in the casing 373 at opposite sides of the piston. To provide a piston operating mechanism having the requisite amount of strength the arm 377, which is connected to the piston shaft, is made integral with and forms a part of a yoke 382 which straddles the casing 373, and which is provided with a slot engaging a key 383 formed at the upper end of the piston shaft 375.

As affording a convenient construction, the cam 167 which controls the tension of the spring which separates the supports for the upper stretching and switch forming devices, which has been hereinbefore described, is secured to the yoke 382.

From an inspection of Figs. 1, 2, 3 and 4 it will be obvious that the action of the cord 357 and weight 368 is not only to actuate the mechanism in the jack for unclamping the shoe, but also to exert a force on the jack supporting structure which tends to maintain the cam levers through which the tipping movements are imparted to the jack in contact with their cams. In the illustrated machine the cord 357 and weight 368 are also utilized to exert a force on the feeding arm 132 of the jack feeding mechanism and the fulcrum carrying lever 140, tending to keep the cam lever through which the feeding lever is actuated in contact with its cam and tending to move the fulcrum carrying lever towards one limit of its adjustment. To secure these results the cord 357, instead of being attached directly to the weight 368, is formed for a portion of its length as a sprocket chain (see Figs. 48, 49 and 50), and this sprocket chain passes around a sprocket wheel 384 mounted in a yoke 385 which is secured to the weight 368. From the sprocket wheel the cord passes upwardly over a pulley 386 on the machine frame and then horizontally around a pulley 387 also mounted on the machine frame, then around a pulley 388 mounted on the fulcrum carrying lever 140, then around a pulley 389 mounted on the pivot of the fulcrum carrying lever and is finally secured to a pin 390 projecting downwardly from the feed lever 132. To render the checking or snubbing mechanism effective to retard the downward movement of the weight 368 and the return movement of the cam levers and other parts upon which a force is exerted by any portion of the cord 357, a locking device is provided for locking the sprocket wheel from rotation during a portion of the downward movement of the weight. This locking device comprises a clutch roll 391 arranged to bear against the cylindrical hub of the sprocket wheel 384 and cooperate with the surface of a recess in a plunger 392. The plunger 392 is mounted in the bracket 385 and is acted upon by a spring 393 surrounding the plunger and interposed between the bracket and a flange at the upper end of the plunger. This spring tends to hold the plunger in raised position so that the roll 391 is supported by the lower shoulder of the recess in the plunger out of locking engagement with the hub of the sprocket wheel. This is the position of the parts while the pulley 362 is being rotated in a direction to wind the cord 357 upon the pulley and while the feed lever 132 is being actuated to feed the jack longitudinally. During this portion of the operation of the machine the sprocket wheel 384 can rotate in either direction as the two ends of the cord 357 are drawn upon. At the conclusion of the lasting operation the weight 368 will have been raised to such a position that the plunger 392 contacts with a fixed stop on the machine frame so that the plunger is depressed and the roll 391 is allowed to clutch the hub of the sprocket wheel 384. After the pulley 362 is released from the gear 201 so that it can be rotated by the force exerted on the cord 357 by the weight 368 a strain is kept upon the portion of the cord between the pulley and the sprocket wheel by the checking or snubbing mechanism and thus the clutching engagement of the clutch roll 391 with the hub of the sprocket wheel is maintained. The sprocket wheel is thus prevented from rolling down the sprocket chain and thereby causing a sudden return movement of the feeding lever 132. As soon as the cam lever which actuates the feed lever 132 is returned into contact with its cam the continued downward movement of the weight produces a rotation of the sprocket wheel 384 in a direction to release the clutch roll 391 and permit the plunger 392 to return to its original position.

The mechanism for stopping the machine in case of a mis-stitch in either seam (see Figs. 4 and 10) comprises a bell crank 394, the vertical arm of which extends in front of a pin 395 projecting upwardly from the dog 230 on the lever 224 through which the stop motion is thrown into operation at the conclusion of the lasting operation, as hereinbefore described. A movement of the vertical arm of the bell crank 394 to the rear will swing the dog 230 until it is moved out of engagement with the end of the rod 228, and since the movement of the dog on the lever is limited by a pin 396 projecting from the lever 224 into a recess in the dog, the continued rearward movement of the vertical arm of the bell crank 394 will swing the lever 224 rearwardly. This rearward movement of the lever 224 will withdraw the latch 220 from the projection 219 on the vertical rod 217 and thus set the stopping mechanism into operation. As the machine is stopped, however, the eccentric 231 will not be thrown into operation and the jack will remain in the position which it occupies at the time of the mis-stitch. The horizontal arm of the bell crank 394 is pivotally connected to the lower end of a vertical bar 397, the upper end of which is provided with a lateral extension 398 which is located below the extreme rear ends of the take-up levers 95. As has been hereinbefore described the take-up levers are allowed to yield with relation to their actuating cam lever 97 at the limit of the upward stroke of the take-up levers, the strain of the thread overcoming the tension of the springs 99. In the normal operation of the machine this yielding movement of the take-up levers is sufficient to maintain their rear ends out of engagement with the bar 397. In case of a mis-stitch, however, due to the breaking of a thread in either seam or for other cause, the strain on one of the main sewing threads is removed, and during the upward stroke of the take-up which acts on this thread the take-up lever does not yield with relation to the actuating cam lever 97, and its rear end, which in effect forms a catch, passes down beneath the projection 398 on the bar 397. The bar 397 is acted upon by a spring 399 which holds it in the position indicated in Fig. 10, its movement under the force of the spring 399 being limited by a stop bar 401. As the rear end of one of the take-up levers is carried downwardly on the occurrence of a mis-stitch, the upper end of the bar 397 is pressed rearwardly and as the end of the lever passes beneath the projection 398 the bar 397 is moved forward, so that the shoulder formed by the projection engages the rear end of the take-up lever. This connects the take-up lever with the bar 397 so that as the rear end of the lever is again moved upwardly by the actuating cam lever 97 the bar 397 is raised and the bell crank 394 is actuated to set the stopping mechanism into operation, as be-above described. During its upward movements the bar 397 is pressed rearwardly by the engagement of the stop pin 401 with a cam surface 402 on the bar so that the bar is moved out of engagement with the rear end of the take-up lever and is returned to its original position.

In the operation of the machine a mis-stitch, when it occurs, is almost invariably the result of the breaking of one of the main threads under the strain exerted by the take-up. At this time the needle is out of the work and, because of the fact that the stop mechanism is thrown into operation immediately during the return movement of the take-up lever, the machine is stopped before the needle again enters the work. By the action of the take-up before the thread breaks, the last formed stitch is locked in the work at the last needle hole, so that the seam up to and including the thread in the last needle hole is complete. The needle can be rethreaded and the machine at once started again into operation, the needle entering the work at the distance of one stitch from the last needle hole formed in the work, and the first loop of needle thread being locked in the work by the locking thread, which remains unbroken, so that for all practical purposes a continuous seam is formed without backing up the machine so as to restart the seam at a point back of that at which the breakage of the thread occurs.

The manner in which the illustrated machine will preferably be operated in side lasting a shoe has been indicated in connection with the description of the various parts. It may be stated, however, that according to certain applications of the invention, the toe and heel ends of the upper may have been already lasted in any usual or suitable manner but, preferably, said ends are preliminarily molded to approximately their final shape and to produce inturned flanges, the heel flange being permanently secured to the insole, all before the parts are assembled upon the last. As indicated in Fig. 54 and as set forth also in the Warren application heretofore mentioned, the inturned toe flange terminates in an upstanding flange so that in assembling the parts upon the last these toe flanges of the upper are caused to fit or interlock with the feather and rib of the insole and may be secured thereto by two or three light wire staples. The present application has discovered that it is possible to dispense with the usual tacks or other means for securing the insole to the last, not only because of the interlocking at the toe just described, but also because the lasting is performed simultaneously at opposite sides of the shoe so that there is substantially no tendency to displace the insole laterally on the last bottom and this method of lasting an upper to a sole thus loose on the last is a feature of the present invention.

As has been stated the lasting operation progresses along the shoe from the breast line of the heel towards the toe. This is the preferred mode of operation, as it has been found that the surplus stock, if any, can be distributed to better advantage and more satisfactory work produced when the lasting operation progresses from the heel towards the toe, than when the operation progresses from the toe towards the heel. During the operation of the machine hereinbefore described in progressively lasting the sides of the shoe upper eleven upper stretching movements are imparted to the lasting grippers and eleven stitches are taken along each side of the shoe. The mechanism for varying the tension of the spring which controls the stretching strain exerted by the grippers upon the upper is so arranged that very little, if any, strain is exerted upon the upper during the first four operations of the grippers. At this time the shank portion of the shoe is being operated upon. At the fifth operation the strain of the grippers on the upper is increased and as the operation progresses from the shank to the forepart this strain continues to increase during the sixth, seventh and eighth operations of the grippers, at which time the stretching strain exerted by the grippers is all that can safely be exerted upon the leather of the shoe upper. The heavy strain continues through the ninth and tenth operations of the grippers, but on the eleventh operation the strain is substantially decreased so as to avoid displacing on the last the toe portion of the upper which has been previously molded. The same number of movements are imparted to the lasting grippers and the same number of stitches are taken regardless of the size of the shoe being operated upon, the only adjustment of the machine for shoes of different sizes being that of the mechanism for feeding the jack longitudinally. The effect of this adjustment is a variation in the length of the stitches.

In the modified construction of lasting devices illustrated in Figs. 56 to 59, the inner and outer jaws of each pair of grippers are pivotally connected as in the construction hereinbefore described and are provided with slots arranged at an angle to each other and engaged by a cross pin. This pin corresponds to the pin 41 of the construction hereinbefore described but, instead of being mounted upon one lever of a toggle, is mounted directly in the lower end of a link 403, the upper end of which is connected to the cross head 50. The upper end of the plate-like portion of the inner jaw is provided with a vertically extending slot, and this slot is engaged by a guiding pin corresponding to the pin 38, upon which is mounted a friction device similar to the device hereinbefore described. With this construction the gripping jaws are closed during the first portion of the upward movement of the pin 41, and then a bodily upward movement is imparted to the jaws. As a strain is exerted upon the upper during the upward movement of the jaws, the jaws are permitted to swing into the line of the strain exerted upon the upper, the swinging movement taking place around the pin 38 as a center. The grippers thus act to the best advantage upon the upper and draw it tightly to the sides of the last.

Coacting with each pair of grippers a wiper or presser is provided for pressing the upper snugly into the angle formed by the rib and feather of the insole. Each of these wipers consists of the substantially horizontally arranged plate-like portion of an arm or lever 404 pivotally mounted at 405 at the side of the plate 7 of a support for the lasting devices. The arm 404 extends downwardly from its pivot 405 parallel to the face of the plate 7 and then curves towards the left, as viewed in Fig. 59, so as to bring the portion of the arm forming the wiper into a position to engage the upper in line with the channel guide or presser foot 9 transversely of the shoe. The wiper is arranged to move inwardly towards the center line of the shoe and during such movement engages the upper, as indicated in Fig. 57, and presses it into the angle formed by the feather and rib of the insole, as indicated in Fig. 58. During this movement of the wiper the jaws of the gripper are actuated to release the upper sufficiently to permit the stock required to fit into the angle to be supplied from the portion held by the gripper. The wiper completes its movement ahead of the main needle 3, so that the needle does not penetrate the upper until the upper has been fitted into the shoulder of the insole by the wiper. During the retracting movement of the needle, the wiper remains in engagement with the upper and holds the upper firmly pressed into the shoulder of the sole until the takeup has acted to set the stitch. To guard against any displacement of the shoe sole during the action of the wipers, the sole engaging surfaces of the presser feet are provided with corrugations.

For imparting the above described motions to the wipers, each wiper arm 404 is provided with a roll 406 arranged to be engaged by a cam surface 407 at the free end of an arm 408. The arm 408 has formed thereon a pivot stud 409 which is mounted in the plate 7 of a support for the lasting devices, and to this stud 409 is rigidly secured an arm 410. The arm 410 at its free end is provided with a slot arranged to be engaged by a stud 411 at the pivotal connection of a needle carrier 66 with its actuating link 68. The shape and arrangement of these parts is such that the movements above described are imparted to the wipers from the needle actuating mechanism. A spring 412 acts upon the wiper arm 404 to maintain the roll 406 in contact with the cam surface 407.

A thread guide, consisting of a perforation at the lower end of an arm 413 secured to a support for the lasting devices, is located close to the needle and provides a direct path for the thread through the needle eye at the time the stitch is set by the takeup and eliminates any liability of injury to the thread at the eye of the needle when the thread is drawn back through the eye.

The gripping jaws are opened and moved downwardly to again grasp the upper by the downward movement of the pin 41. During the first portion of the downward movement of the pin the jaws are opened and, in order to guide the jaws, after being opened, during their downward movement so as to bring them into position to grasp the upper and to insure the passage of the inner jaw outside of the sewing rib, a guiding surface 414 is provided in one of the plates 7 and 8 of the support for the lasting devices arranged to be engaged by the pin 35 on the inner jaw and to guide said jaw during its downward movement outside of the sewing rib.

Certain features of the modified construction of lasting devices illustrated in Figs. 56 to 59 form the subject-matter of a divisional application filed December 24, 1928, Serial No. 328,265.

It is to be understood that, as already suggested, the present invention is not limited in scope to the particular embodiment and steps above described by way of illustration, but is capable of embodiment in various other specific forms and indeed certain features of it may be embodied in machines for performing substantially different operations within the scope of the invention and of the appended claims.

Therefore, what is claimed as new is:—

1. A shoe machine comprising tools constructed and arranged to operate progressively along opposite sides of a shoe and to move approximately in planes transversely of the shoe, in combination with mechanism acting automatically to move said tools and shoe relatively in order to maintain the planes of movement of the tools in substantially the same predetermined angular relation to the contour of the shoe.

2. A shoe machine comprising tools constructed and arranged to operate progressively along opposite sides of a shoe, in combination with mechanisms acting automatically and independently to maintain the tools at the respective sides of the shoe in substantially the same predetermined angular relation to the contour of the shoe.

3. A lasting machine having, in combination, means operating on the upper at opposite sides of a shoe simultaneously to work different portions of the upper successively over a last upon which an insole having a rib substantially parallel to the sole edge has been placed, and means for securing said portions to the rib of the insole.

4. A lasting machine having, in combination, devices operating to work portions of the upper at opposite sides of a shoe simultaneously over a last upon which an insole having a rib substantially parallel to the sole edge has been placed and secure said portions in the angle between the rib and the feather of an insole, and means for causing said devices to operate progressively along the sides of the shoe.

5. A lasting machine having, in combination, means operating on the upper simultaneously at opposite sides of a shoe to work the upper over a last and over an insole placed on the last, and means for inserting fastenings substantially parallel to the shoe bottom to secure the upper to the sole inside of the edge.

6. A lasting machine having, in combination, means for engaging the inner face of the rib of an insole at opposite sides of a shoe, means for drawing portions of the upper at opposite sides of a shoe simultaneously in a direction substantially perpendicular to the shoe bottom, and means for securing the upper at each side of the shoe to the outer face of the rib.

7. A machine of the class described having, in combination, a shoe supporting jack, pulling devices co-operating with opposite sides of said support, means for moving the jack and devices relatively to produce the pulling effect, and means for moving the jack to determine the lateral position of the shoe in the machine.

8. A lasting machine having, in combination, two sets of lasting devices arranged to act on an upper at opposite sides of a shoe, and means for actuating said devices to work both sides of the upper progressively over a last upon which a sole having a rib substantially parallel to the sole edge has been placed and secure the upper in the angle between the rib and the feather of the sole.

9. A lasting machine having, in combination, two sets of lasting devices arranged to act on an upper at opposite sides of a shoe, and means for actuating said devices to work both sides of the upper progressively over a last upon which a sole having a rib substantially parallel to the sole edge has been placed and secure the upper in lasted position while leaving the inner face of the rib uncovered.

10. A lasting machine having, in combination, a shoe supporting jack, two sets of lasting devices arranged to act on an upper at opposite sides of a shoe supported upon the jack, means for relatively moving said devices and jack to transfer the point of operation along the shoe, and means for actuating said devices as the point of operation is transferred along the shoe to work progressively both sides of the upper over the last upon which a sole having a rib has been placed and to secure the upper in lasted position while leaving the inner face of the rib uncovered.

11. A lasting machine having, in combination, two sets of lasting devices arranged to act on an upper at opposite sides of a shoe, said lasting devices including upper stretching devices arranged to have an updraw movement away from the shoe sole, and means for actuating said lasting devices to last progressively both sides of the upper as the point of operation of said devices is transferred along the shoe and to secure the upper along curvilinear lines substantially parallel to the sole edge.

12. A lasting machine having, in combination, two sets of lasting devices arranged to act on an upper at opposite sides of a shoe, means for actuating said devices to last progressively both sides of the shoe upper as the point of operation of said devices is transferred along the shoe, and means for moving said devices towards and from each other to position them for operation on the shoe upper and cause the upper to be secured by fastenings along curvilinear lines substantially parallel to the sole edge.

13. A lasting machine having, in combination, a shoe supporting jack, two sets of devices including upper stretching and securing devices arranged to act on an upper at opposite sides of a shoe supported upon the jack, means for relatively moving said devices and jack to transfer the point of operation along the shoe, and means for actuating said devices as the point of operation is transferred along the shoe to stretch progressively both sides of the shoe upper over the last and to cause the upper to be secured by fastenings along curvilinear lines substantially parallel to the sole edge.

14. A lasting machine having, in combination, a shoe supporting jack, two sets of devices including upper stretching and securing devices arranged to act on an upper at opposite sides of a shoe supported upon the jack, means for moving the jack to transfer the point of operation along the shoe, and means for actuating said devices as the point of operation is transferred along the shoe to stretch progressively both sides of the shoe upper over the last and to cause the upper to be secured by fastenings along curvilinear lines substantially parallel to the sole edge.

15. A lasting machine having, in combination, a shoe supporting jack, two sets of lasting devices arranged to act on an upper at opposite sides of a shoe supported upon the jack, means for relatively moving said devices and jack to transfer the point of operation along the shoe, means for actuating said devices to last progressively both sides of the shoe upper as the point of operation of said devices is transferred along the shoe, and means for moving said devices toward and from each other to position them for operation on the shoe upper and cause the upper to be secured by fastenings along curvilinear lines substantially parallel to the sole edge.

16. A lasting machine having, in combination, two sets of lasting devices arranged to act on an upper at opposite sides of a shoe, means for actuating said devices to last progressively both sides of the shoe upper as the point of operation of said devices is transferred along the shoe, and supports on which said devices are mounted rotatable about axes substantially perpendicular to the shoe bottom to change their angular position as different portions of the shoe upper are operated upon.

17. A lasting machine having, in combination, two sets of devices arranged to act on an upper at opposite sides of a shoe, said devices including upper stretching grippers arranged to have an updraw movement away from the shoe sole and upper securing devices, means for actuating said devices to stretch progressively and secure in lasted position both sides of the shoe upper as the point of operation of said devices is transferred along the shoe, and supports for said grippers rotatable about axes substantially perpendicular to the shoe bottom to position the grippers for operation on different portions of the shoe upper.

18. A lasting machine having, in combination, two sets of devices arranged to act on an upper at opposite sides of a shoe, said devices including upper stretching devices and mechanism for securing the upper to the rib of the shoe sole, means for actuating said devices to stretch progressively and secure in lasted position both sides of the shoe upper as the point of operation of said devices is transferred along the shoe, and supports on which said upper securing mechanism is mounted, rotatable about axes substantially perpendicular to the shoe bottom, to locate said mechanism in the proper angular position with relation to the rib.

19. A lasting machine having, in combination, two sets of upper stretching and sewing devices arranged to stretch the upper at opposite sides of a shoe and sew the upper to the rib of the shoe sole, said sewing devices including needles arranged to pass through the upper and sewing rib, means for actuating said stretching devices to stretch progressively both sides of the shoe as the point of operation of said devices is transferred along the shoe, and supports for said needles rotatable about axes substantially perpendicular to the shoe bottom to cause the needles to operative in paths substantially perpendicular to the sewing rib.

20. A lasting machine having, in combination, two sets of lasting devices arranged to act on an upper at opposite sides of a shoe, means for actuating said devices to last progressively both side of the shoe upper as the point of operation of said devices is transferred along the shoe, and supports on which said devices are mounted movable towards and from each other to position said devices the proper distance apart and rotatable about axes substantially perpendicular to the shoe bottom to change the angular position of said supports as different portions of the upper are operated upon.

21. A lasting machine having, in combination, a shoe supporting jack, two sets of lasting devices arranged to act on an upper at opposite sides of a shoe supported on the jack, means for relatively moving said devices and jack to transfer the point of operation along the shoe, means for actuating said devices to last progressively both sides of the shoe upper as the point of operation of said devices is transferred along the shoe, and supports on which said devices are mounted movable towards and from each other to position said devices the proper distance apart and rotatable about axes substantially perpendicular to the shoe bottom to change the angular position of said supports as different portions of the shoe upper are operated upon.

22. A lasting machine having, in combination, two sets of lasting devices arranged to act on an upper at opposite sides of a shoe, means for actuating said devices to last progressively both sides of the shoe upper as the point of operation of said devices is transferred along the shoe, supports on which said devices are mounted rotatable about axes substantially perpendicular to the shoe sole, and means for rotating each support as different portions of the shoe upper are operated upon to change its angular position to compensate for the curvature of the sole edge.

23. A lasting machine having, in combination, a shoe supporting jack, two sets of lasting devices arranged to act on an upper at opposite sides of a shoe, means for moving the jack to transfer the point of operation along the shoe, means for actuating said devices to last progressively both sides of the shoe upper as the point of operation of said devices is transferred along the shoe, supports on which said devices are mounted rotatable about axes substantially perpendicular to the shoe sole, means for moving said supports towards and from each other to position said devices varying distances apart as the shoe sole varies in width, and means for rotating said supports to change their angular position as different portions of the shoe upper are operated upon.

24. A lasting machine having, in combination, a shoe supporting jack, two sets of lasting devices arranged to act on an upper at opposite sides of a shoe, means for moving the jack to transfer the point of operation along the shoe, means for actuating said devices to last progressively both sides of the shoe upper as the point of operation of said devices is transferred along the shoe, supports on which said devices are mounted rotatable about axes substantially perpendicular to the shoe sole, means for moving said supports towards and from each other to position said devices varying distances apart as the shoe sole varies in width, and means for rotating each support as different portions of the shoe upper are operated upon to change its angular position to compensate for the curvatures of the sole edge.

25. A lasting machine having, in combination, two sets of lasting devices arranged to act on an upper at opposite sides of a shoe, means for actuating said devices to last progressively both sides of the shoe upper as the point of operation of said devices is transferred along the shoe, and supports for said devices provided with channel guides arranged to bear against the rib of the insole at opposite sides of the shoe mounted to determine the lateral position of the shoe and to move towards and from each other as the shoe bottom varies in width.

26. A lasting machine having, in combination, two sets of lasting devices arranged to act on an upper at opposite sides of a shoe, means for actuating said devices to last progressively both sides of the shoe upper as the point of operation of said devices is transferred along the shoe, supports for said devices provided with channel guides arranged to bear against the rib of the insole at opposite sides of the shoe, a spring acting to separate the guides, and means for varying the tension of the spring as the point of operation of said devices is transferred along the shoe.

27. A lasting machine having, in combination, two sets of lasting devices arranged to act on an upper at opposite sides of a shoe, means for actuating said devices to last progressively both sides of the shoe upper as the point of operation of said devices is transferred along the shoe, and supports for said devices provided with channel guides arranged to bear against the rib of the insole at opposite sides of the shoe.

28. A lasting machine having, in combination, two sets of gripping devices arranged to act on an upper at opposite sides of a shoe, means for actuating said devices as the point of operation of said devices is transferred along the shoe to stretch progressively both sides of the upper over the last, and two sets of devices constructed and operating to secure the upper to the rib of the insole by fastenings extending generally parallel to the face of the insole.

29. A lasting machine having, in combination, two sets of lasting devices arranged to act on an upper at opposite sides of a shoe, means for actuating said devices to last progressively both sides of the shoe upper as the point of operation of said devices is transferred along the shoe, supports on which said devices are mounted movable towards and from each other to position said devices varying distances apart as the shoe bottom varies in width, and means for locking said supports in position during each cycle of operations of said devices.

30. A lasting machine having in combination, a shoe supporting jack, two sets of lasting devices arranged to act on an upper at opposite sides of a shoe supported upon the jack, means for relatively moving said devices and jack to transfer the point of operation along the shoe, means for actuating said devices to last progressively both sides of the shoe upper as the point of operation of said devices is transferred along the shoe, supports for said devices provided with channel guides arranged to bear against the rib of the insole at opposite sides of the shoe, and means for locking said supports in position during each cycle of operations of the lasting devices and for unlocking said supports to allow the channel guides to contact with the rib as the point of operation is transferred along the shoe.

31. A lasting machine having, in combination, a shoe supporting jack, two sets of lasting devices arranged to act on an upper at opposite sides of a shoe supported upon the jack, means for actuating said devices as the point of operation of said devices is transferred along the shoe to last progressively both sides of the upper, means for moving the jack intermittently between successive actuations of the lasting devices to feed the shoe, supports for said devices provided with channel guides arranged to bear against the rib of the insole at opposite sides of the shoe, and means for locking said supports in position during each cycle of operations of the lasting devices and to unlock said supports during the feeding of the shoe.

32. A lasting machine for shoes having a rib insole having, in combination, two sets of lasting devices arranged to act on an upper at opposite sides of a shoe, means for actuating said devices to last progressively a shoe upper as the point of operation of said devices is transfered along the shoe, supports on which said devices are mounted provided with channel guides arranged to bear against the rib of the insole at opposite sides of the shoe, means acting yieldingly to separate said supports, and means operating on stopping the machine to move said supports towards each other.

33. A lasting machine having, in combination, two sets of lasting devices arranged to act on an upper at opposite sides of a shoe, means for actuating said devices to last progressively both sides of the shoe upper as the point of operation of said devices is transferred along the shoe, supports on which said devices are mounted movable towards and from each other to position said devices varying distances apart as the shoe bottom varies in width, and means operating on stopping the machine to move said supports into a position to permit the removal and insertion of work.

34. A lasting machine having, in combination, two sets of lasting devices arranged to act on an upper at opposite sides of a shoe, means for actuating said devices to last progressively a shoe upper as the point of operation of said devices is transferred along the shoe, supports on which said devices are mounted provided with channel guides arranged to bear against the rib of the insole at opposite sides of the shoe, means acting yieldingly to separate said supports, means operating on stopping the machine to move said supports towards each other, means for holding said supports in the position to which they are moved, and means operating on starting the machine to release said supports.

35. A lasting machine having, in combination, a shoe supporting jack, two sets of lasting devices arranged to act on an upper at opposite sides of a shoe supported upon the jack, said devices including upper stretching devices arranged to have an updraw movement away from the shoe sole, means for relatively moving said devices and jack to transfer the point of operation of said devices along the shoe, means for actuating said upper stretching devices to stretch progressively both sides of the shoe upper as the point of operation of the lasting devices is transferred along the shoe, and means for relatively moving the upper stretching devices and jack to maintain the updraw movement of the upper stretching devices in a direction substantially normal to the longitudinal curvature of the shoe sole.

36. A lasting machine having, in combination, a shoe supporting jack, two sets of lasting devices arranged to act on an upper at opposite sides of a shoe supported upon the jack, means for relatively moving said devices and jack to transfer the point of operation of said devices along a shoe, means for actuating said devices to last progressively both sides of the shoe upper as the point of operation of said devices is transferred along the shoe, and means for relatively moving said devices and jack to compensate for the transverse curvature of the shoe sole.

37. A lasting machine having, in combination, a shoe supporting jack, two sets of lasting devices arranged to act on an upper at opposite sides of a shoe supported upon the jack, means for relatively moving said devices and jack to transfer the point of operation of said devices along the shoe, means for actuating said devices to last progressively both sides of the shoe upper as the point of operation of said devices is transferred along the shoe, and means for tipping the shoe laterally to bring the opposite sides of the shoe sole at the point of operation into the desired plane transversely of the shoe.

38. A lasting machine having, in combination, a shoe supporting jack, two sets of lasting devices arranged to act on an upper at opposite sides of a shoe supported upon the jack, means for relatively moving said devices and jack to transfer the point of operation of said devices along the shoe, means for actuating said devices to last progressively both sides of the shoe upper as the point of operation of said devices is transferred along the shoe, and means for tipping the shoe longitudinally to maintain the shoe sole in proximity to the point of operation in the desired plane longitudinally of the shoe.

39. A lasting machine having, in combination, a shoe supporting jack, two sets of lasting devices arranged to act on an upper at opposite sides of a shoe supported upon the jack, means for relatively moving said devices and jack to transfer the point of operation of said devices along the shoe, means for actuating said devices to last progressively both sides of the shoe upper as the point of operation of said devices is transferred along the shoe, and means for tipping the shoe laterally and longitudinally to maintain the portion of the shoe sole in proximity to the point of operation in the desired plane.

40. A lasting machine having, in combination, a shoe supporting jack, two sets of lasting devices arranged to act on an upper at opposite sides of a shoe supported upon the jack, means for relatively moving said devices and jack to transfer the point of operation of said devices along the shoe, means for actuating said devices to last progressively both sides of the shoe upper as the point of operation of said devices is transferred along the shoe, and means for relatively moving said devices and jack to compensate for the surface and edge curvature of the shoe sole.

41. A lasting machine having, in combination, a shoe supporting jack, two sets of lasting devices arranged to act on an upper at opposite sides of a shoe supported upon the jack, means for relatively moving said devices and jack to transfer the point of operation of said devices along the shoe, means for actuating said devices to last progressively both sides of the shoe upper as the point of operation of said devices is transferred along the shoe, supports for said devices rotatable about axes substantially perpendicular to the shoe bottom, means for tipping the shoe to compensate for the surface curvatures of the shoe sole, and means for rotating said supports to change their angular position to compensate for the edge curvatures of the shoe sole.

42. A lasting machine having, in combination, a shoe supporting jack, two sets of devices including upper stretching and securing devices arranged to act on an upper at opposite sides of a shoe supported upon the jack, means for relatively moving said devices and jack to transfer the point of operation along the shoe from the heel portion of the shoe towards the toe, and means for actuating said devices as the point of operation is transferred along the shoe to stretch progressively both sides of the shoe upper over the last and to secure the upper in lasted position.

43. A lasting machine having, in combination, two sets of lasting devices arranged to act on an upper at opposite sides of a shoe, means for actuating said devices to last progressively both sides of the shoe upper as the point of operation of said devices is transferred along the shoe, and presser feet arranged to bear against the sole surface near opposite edges of the sole mounted to move towards and from each other as the shoe sole varies in width.

44. A shoe machine having, in combination, a pair of guides, yielding means tending to maintain said guides at opposite sides of the shoe laterally in engagement with a part of the shoe during a relative movement of the shoe and guides to transfer the points of engagement of the guides along the shoe, means for operating on the shoe during such engagement and mechanism for moving said guides in opposition to said yielding means.

45. A shoe machine having, in combination, starting and stopping mechanism, a pair of guides, means tending to maintain said guides at opposite sides of the shoe laterally in engagement with a rib of a shoe sole, and means connected with said mechanism for moving said guides out of such engagement.

46. A shoe machine having, in combination, a pair of guides, yielding means tending to maintain said guides laterally in engagement with a rib adjacent to opposite edges of a sole, in combination with means for performing operations upon the shoe at opposite sides thereof, and means for preventing relative inward movement of the guides during the operations on the shoe.

47. A machine of the class described having, in combination, operating mechanism, a shoe supporting jack, means for moving the jack in co-operation with the operating mechanism, guides for the jack in its movement, said guides being arranged to engage the sole rib at opposite sides of the supported shoe, and means for yieldably separating the guides.

48. A machine of the class described having, in combination, lasting devices, a jack movable longitudinally and laterally of a shoe supported thereon, means for moving the jack longitudinally of the shoe to feed it in co-operation with said devices, guides with which the shoe contacts to determine its position laterally, and a spring acting to separate the guides.

49. A machine for forming stitches constructed and operating to secure the upper of a shoe to a sole simultaneously adjacent to opposite sides of the shoe and comprising a pair of needles movable in paths approximately at right angles to the sole edge, in combination with looping devices movable in paths approximately parallel to said edge.

50. A lasting machine having, in combination, means engaging the bottom of a shoe, means operating on the upper at opposite sides of the shoe simultaneously to work different portions of the upper into lasted position, and means for sewing said portions to the rib of the insole.

51. A machine of the class described having, in combination, a shoe supporting jack, means for working an upper over a last on the jack and for securing the upper in lasted position, and means for imparting predetermined movements to the jack as the point of operation is transferred along the shoe to compensate for the curvature of the bottom of the last.

52. A machine of the class described having, in combination, a shoe supporting jack, an upper pulling device co-operating with said support, means for moving the support and device relatively to produce the pulling effect, and cam controlled means for moving the support to maintain the pull substantially normal to the longitudinal curvature of the shoe bottom.

53. A machine of the class described having, in combination, lasting devices, a movable carrier, a spindle connected to the carrier for universal movement, a jack mounted upon the spindle, means for moving the carrier to compensate for the curvature of the shoe, and means for oscillating the spindle upon the carrier to feed the work.

54. A machine of the class described having, in combination, a jack, lasting devices, a plurality of members arranged to contact with a jacked shoe and guide it, and means for tipping the jack and said devices relatively about said members as a fulcrum.

55. A machine of the class described having, in combination, lasting devices, a shoe supporting jack, means for moving the jack in co-operation with the devices, and a guide for the jack in its movement, said guide being arranged to engage the sole rib of a supported shoe.

56. A lasting machine having, in combination, grippers, a single actuator therefor, connections including a spring between said grippers and actuator, and controlling mechanism for causing said grippers as they are moved yieldingly from said actuator first to stretch an upper upward over a last and then to carry it inward relative to the last bottom.

57. A lasting machine comprising a shoe supporting jack, upper gripping mechanism, means for relatively moving said jack and mechanism to transfer the point of operation along the shoe, a support which is movable transversely of the jack and on which said gripping mechanism is mounted, a channel guide also mounted on said support and constructed and arranged to bear against the rib of the sole of a shoe carried by said jack for controlling the position of said gripping mechanism, and other mechanism for securing the upper in lasted position.

58. A machine of the class described comprising a shoe supporting jack, sewing mechanism, means for relatively moving said jack and mechanism to transfer the point of operation along the shoe, a support which is movable transversely of the jack, and on which said sewing mechanism is mounted, a channel guide also mounted on said support and constructed and arranged to bear against the rib of the sole of a shoe carried by said jack for controlling the position of said sewing mechanism, and means tending to maintain said channel guide laterally in engagement with said rib.

59. In a lasting machine, the combination of a gripper constructed and operating to pull successive portions of an upper progressively along the side of a shoe, and automatic means for moving the gripper to maintain the plane of the gripped portion of the upper substantially parallel to that portion of the side of the last adjacent to the portion of upper being pulled.

60. In a lasting machine, the combination of a gripper arranged to turn on an axis substantially perpendicular to the shoe bottom, means for operating the gripper to seize and pull successive portions of an upper as they are presented to the gripper, and means acting without attention on the part of the operator for turning the gripper in accordance with the varying lateral curvature of the shoe bottom.

61. In a lasting machine, the combination of a gripper constructed and arranged to pull successive portions of an upper progressively along a shoe, automatic means for disposing each portion of the gripped upper in substantial parallelism to the adjacent part of the rib of an insole to which it is to be secured, and means for securing the upper to said rib.

62. A machine of the class described comprising mechanism constructed and operating to work a shoe upper over a last in combination with sewing mechanism for securing the upper to the rib of the insole, said sewing mechanism including an eye needle, and devices cooperating therewith to form a loop lock stitch with the lock on the inside of the rib.

63. A machine for operating on shoes having, in combination, a shoe supporting jack, sewing mechanism for securing the upper to the sole of a shoe supported on the jack, said mechanism including a needle arranged to pass through the upper and the sewing rib of the shoe sole, a support for the needle, means for relatively moving the sewing mechanism and jack to transfer the point of operation of the sewing mechanism along the shoe, and means for moving the needle support to maintain the needle path substantially normal to the sewing rib.

64. A machine for operating on shoes having, in combination, sewing mechanism including a needle arranged to pass through the upper and sewing rib of a shoe sole, and a support for said needle rotatable about an axis substantially perpendicular to the shoe bottom to change the path of the needle as different portions of the sewing rib are reached during the sewing operation.

65. A shoe machine having, in combination, stitch forming devices including a tension device, a channel guide, means tending to maintain said guide laterally in engagement with a rib on a shoe sole, and means for moving said guide out of engagement with said rib and for simultaneously releasing the tension.

66. A lasting machine having, in combination, lasting devices, means for actuating said devices to last progressively a shoe upper as the point of operation of said devices is transferred along the shoe, a support on which said devices are mounted provided with a channel guide, and means acting on the support to press the channel guide yieldingly against the rib of the insole.

67. A lasting machine having, in combination, lasting devices, means for actuating said devices to last progressively a shoe upper as the point of operation of said devices is transferred along the shoe, a support upon which said devices are mounted provided with a channel guide and rotatable about an axis substantially perpendicular to the shoe bottom and passing through the work engaging edge of the channel guide, and means acting on the support to press the channel guide yieldingly against the rib of the insole.

68. A shoe machine having, in combination, a shoe support and mechanism for moving it to feed the shoe, a tool constructed and arranged to operate progressively along the shoe and to move both transversely and angularly of the direction of feed, and mechanism acting automatically to maintain the tool laterally in operative relation to the shoe and also in predetermined angular relation thereto.

69. A shoe machine having, in combination, a power shaft, a shoe support, a tool for operating progressively along a shoe carried by said shoe support, a tool support movable transversely of the shoe and also about an axis approximately perpendicular to the shoe bottom, a guide for the tool support, and means tending to maintain said guide in engagement with a contour of the shoe together with mechanism for turning the support automatically about said perpendicular axis to maintain the tool in predetermined angular relation to said contour.

70. A lasting machine having, in combination, lasting devices including an upper stretching device arranged to have an updraw movement away from the sole of a shoe presented to said devices, means for actuating said upper stretching device to stretch progressively the upper as the point of operation of said device is transferred along the shoe, and means for varying the strain exerted by said device as different portions of the upper are operated upon.

71. A lasting machine having, in combination, lasting devices including an upper stretching gripper arranged to have an updraw movement away from the sole of a shoe presented to said devices, a cam and intermediate connections including a spring for actuating said upper stretching gripper to stretch progressively the upper as the point of operation is transferred along the shoe, and means for varying the tension of said spring as different portions of the upper are operated upon.

72. A lasting machine having, in combination, lasting devices including an upper stretching gripper arranged to have an updraw movement away from the sole of a shoe presented to said devices, a cam and intermediate connections including a spring for actuating said gripper to stretch progressively the upper as the point of operation is transferred along the shoe, and a pattern cam and suitable connections for varying the tension of the spring as different portions of the upper are operated on.

73. A lasting machine having, in combination, a shoe supporting jack, lasting devices including an upper stretching gripper arranged to have an updraw movement away from the sole of a shoe supported on the jack, means for relatively moving the lasting devices and jack to transfer the point of operation along the shoe, means for actuating the upper stretching gripper to stretch progressively the upper as the point of operation is transferred along the shoe, and mechanism operating in timed relation to the relative movements of the jack and lasting devices in transferring the point of operation along the shoe to vary the strain exerted on the upper as different portions of the upper are acted upon.

74. A machine of the class described having, in combination, a shoe supporting jack, a pulling device co-operating therewith, means for imparting to the jack a work feeding movement in co-operation with said device, and means operating in predetermined relation to the feeding movement of the jack to vary the pull of the pulling device.

75. A machine of the class described having, in combination, a shoe supporting jack, a pulling device co-operating therewith, and cam mechanism for feeding a supported shoe and for operating the pulling device to exert a pull varying at different points on the shoe.

76. A machine for operating on shoes having, in combination, devices for performing an operation progressively along the bottom margin of a shoe mounted on a last, a shoe supporting jack, a gage on the jack, and a gage cooperating therewith for positioning the jack with relation to the operating devices to start the operation at a predetermined point on the shoe.

77. A machine for operating on shoes having, in combination, devices for performing an operation progressively along the bottom margin of a shoe mounted on a last, a gage normally out of gaging position during the operation for positioning the shoe as it is presented to the operating devices by the operator to start the operation at a predetermined point on the shoe, and means operating on stopping and starting the machine to move the gage into and out of gaging position.

78. A machine for operating on shoes having, in combination, devices for performing an operation progressively along the bottom margin of a shoe mounted on a last, a gage for positioning the shoe to start the operation at a predetermined point on the shoe, and means operating on starting the machine to move the gage out of gaging position.

79. A machine for operating on shoes having, in combination, devices for performing an operation progressively along the bottom margin of a shoe mounted on a last, a gage for positioning the shoe to start the operation at a predetermined point on the shoe, a lock for holding the gage in gaging position, a starting treadle, and connections actuated from the starting treadle for unlocking the gage.

80. A machine for operating on shoes having, in combination, devices for performing an operation progressively along the bottom margin of a shoe mounted on a last, a gage for positioning the shoe to start the operation at a predetermined point on the shoe, and means operating on stopping the machine to move the gage into gaging position.

81. A machine for operating on shoes having, in combination, devices for performing an operation progressively along the bottom margin of a shoe mounted on a last, a gage for positioning the shoe to start the operation at a predetermined point on the shoe, means operating on starting the machine for moving the gage out of gaging position, and means operating on stopping the machine for moving the gage into gaging position.

82. A machine for operating on shoes having, in combination, devices for performing an operation progressively along the bottom margin of a shoe, a shoe supporting jack comprising a toe support and a heel support movable towards and from the toe support to locate shoes of different sizes in predetermined position longitudinally on the jack, a gage device on the heel support, and a gage device cooperating therewith for positioning the jack with relation to the operating devices to start the operation at a predetermined point on the shoe.

83. A machine for operating on shoes having, in combination, devices for performing an operation progressively along the bottom margin of a shoe, a shoe supporting jack movable vertically and horizontally into and out of operating position, a gaging device on the jack, and a gaging device cooperating therewith for positioning the jack with relation to the operating devices to start the operation at a predetermined point on the shoe, said gaging devices comprising a pin and a cooperating guiding slot engaged during the vertical movement of the jack.

84. A machine for operating on shoes having, in combination, devices for performing an operation progressively along the bottom margin of a shoe mounted on a last, a shoe supporting jack movable to transfer the point of operation along the shoe and movable by the operator to bring the shoe to starting position, and gaging devices comprising a pin and a cooperating guiding slot engaged during the movement of the jack by the operator to guide a predetermined point on the shoe to the operating devices.

85. A machine for operating on shoes having, in combination, devices for performing an operation progressively along the bottom margin of a shoe mounted on a last, a shoe supporting jack movable to transfer the point of operation along the shoe and movable by the operator to bring the shoe to starting position, and means acting during the movement of the jack by the operator to guide a predetermined point on the shoe to the operating devices.

86. A machine for use in the manufacture of shoes having, in combination, operating mechanism, a jack freely movable when disconnected from its actuating mechanism and movable into co-operation with the operating mechanism, means for actuating said jack to present different parts of the work for the operation upon it, and means acting in the initial movement of the jack for guiding a predetermined point of the work to the operating mechanism.

87. A machine for use in the manufacture of shoes having, in combination, operating mechanism, a work support immovable with relation to the work but movable with the work into co-operation with the operating mechanism and during the operation, positioning means for producing a predetermined relation of the support and operating mechanism in the initial movement of co-operation, and means for rendering the positioning means ineffective prior to the operating movement.

88. A shoe machine having, in combination, a jack comprising toe and heel supports relatively movable toward and from each other according to the length of a shoe held in said supports, a tool constructed and arranged to operate progressively along the shoe, and a stud and a member with a recess connected with one of said supports and with said tool respectively, said recess tapering to the width of the stud as a minimum, and said parts being constructed and arranged to locate the jack in predetermined longitudinal relation to the tool preliminary to said progressive operation.

89. A machine for operating on shoes having, in combination, devices for performing an operation progressively along the bottom margin of a shoe, a shoe supporting jack mechanism operating at the completion of the operation on the shoe to depress the jack, means for locking the jack in depressed position, mechanism for performing an operation on the shoe while the jack is depressed, and means for unlocking the jack and moving it outwardly.

90. A machine for operating on shoes having, in combination, devices for performing an operation progressively along the bottom margin of a shoe, a shoe supporting jack, mechanism operating at the completion of the operation on the shoe to depress the jack, and mechanism for performing an operation on the shoe while the jack is depressed.

91. A machine for operating on shoes having, in combination, devices for performing an operation progressively along the bottom margin of a shoe, a shoe supporting jack, mechanism operating at the completion of the operation on the shoe to depress the jack, and mechanism for performing an operation on the shoe while the jack is depressed, and for thereafter moving the jack outwardly.

92. A machine of the class described having, in combination, operating mechanism including devices for securing parts of the work together, a shoe support movable into and out of co-operation with said mechanism, and a cutting member acting upon a securing element of the work when it is out of co-operation with the operating mechansim.

93. A machine of the class described having, in combination, sewing mechanism, a jack, means for moving the jack to remove a sewed shoe from said mechanism, and a cutter acting upon the thread in proximity to the shoe when thus separated from the sewing mechanism.

94. A machine for operating on shoes having, in combination, stitch forming and work feeding devices operating to sew a seam securing together parts of a shoe mounted upon a last, and means acting when thrown into operation to move the shoe away from the stitch forming devices and sever the thread.

95. A machine for operating on shoes having, in combination, stitch forming and work feeding devices operating to sew a seam securing together parts of a shoe mounted upon a last, and means acting when thrown into operation to sever the thread after the shoe has been moved away from the stitch forming devices.

96. A machine for operating on shoes having, in combination, stitch forming and work feeding devices operating to sew two seams simultaneously at opposite sides of a shoe, and means for severing the threads of both seams.

97. A sewing machine having, in combination, stitch forming devices, a shoe supporting jack movable to transfer the point of operation along the shoe, means for actuating the stitch forming devices to form a continuous seam as the point of operation is transferred along the shoe, means for moving the jack away from operating position at the completion of the sewing operation, and means for severing the thread while the jack is away from operating position.

98. A machine for operating on shoes having, in combination, stitch forming devices arranged to operate simultaneously at the opposite sides of a shoe, a shoe supporting jack movable to transfer the point of operation along the shoe, means for actuating the stitch forming devices to form two seams simultaneously along opposite sides of the shoe as the point of operation is transferred along the shoe, means for depressing the jack at the completion of the sewing operation, and means for thereafter severing the threads of both seams.

99. A machine for operating on shoes having, in combination, stitch forming and work feeding devices operating to sew two seams simultaneously at opposite sides of a shoe, and means acting automatically to stop the machine upon breaking the thread of either seam.

100. A sewing machine having, in combination, stitch forming devices including a take-up, a positively operated actuator, a yielding connection between the take-up and actuator for permitting relative movement under the strain of the thread, and mechanism rendered operative by the take-up and actuated by the actuator for stopping the machine upon breakage of the thread.

101. A sewing machine having, in combination, stitch forming devices including a take-up lever provided with a catch, a positively operated actuator for said take-up lever, a yielding connection between the take-up lever and actuator for permitting relative movement under the strain of the thread, and mechanism engaged by the catch and actuated by the actuator for stopping the machine upon breakage of the thread.

102. A machine for operating on shoes having, in combination, stitch forming and work feeding devices operating to sew a seam, said stitch forming devices including an eye pointed needle, a take-up and means co-operating therewith to form a loop lock stitch, and means acting automatically upon breakage of the thread by the action of the take-up to stop the stitch forming and work feeding devices before the needle again enters the work.

103. A machine for operating on shoes having, in combination, mechanism for sewing a seam including a needle, a take-up and devices co-operating therewith to form a lock stitch, and means acting automatically upon breakage of the thread by the action of the take-up to stop said mechanism before the needle again enters the work.

104. A machine of the class described having, in combination, a jack provided with a movable shoe clamping member, an actuating member extending into the jack, connections between the actuating member and clamping member, and means independent of the jack for applying power to the actuating member.

105. A machine of the class described having, in combination, a jack provided with a movable shoe clamping member, a shaft journaled in the jack, connections between the shaft and clamping member, and means for rotating the shaft to actuate the clamping member.

106. A machine of the class described having, in combination, a jack provided with movable shoe engaging means, power means for moving the jack in the performance of an operation upon the jacked shoe, actuating means for the engaging means, and means for applying power to the actuating means independently of the operating movement of the jack.

107. A machine of the class described having, in combination, a movable jack provided with a movable shoe positioning member, means for moving the jack, means for holding the jack against rotation during such movement, a shaft journaled in the jack, means for rotating the shaft, and connections between the shaft and positioning member.

108. A machine of the class described having, in combination, a jack support, a jack movable upon the support and having a movable shoe engaging member, an actuating member for the engaging member mounted in the jack, driving means for the actuating means, and universal joints connecting the jack and its support and the actuating member and its driving means.

109. A machine of the class described having, in combination, a jack support, a jack movable upon the support and having a movable clamping member, a universal joint connecting the jack and its support, a shaft journaled in the jack, connections between the shaft and clamping member, a universal joint connected to the shaft, and means for driving the shaft through the universal joint.

110. A machine for operating on shoes having, in combination, a shoe supporting jack comprising means for clamping a shoe in position on the jack, means for performing an operation on a shoe supported on the jack, mechanism mounted in the jack for unclamping the shoe, and means including connections actuated from without the jack for actuating said mechanism automatically to unclamp the shoe.

111. A machine for operating on shoes having, in combination, a shoe supporting jack comprising means for clamping a shoe in position on the jack, said jack being movable into and out of operating position, means for performing an operation on a shoe supported on the jack, mechanism mounted in the jack for unclamping the shoe, and means including connections actuated from without the jack for actuating said mechanism automatically to unclamp the shoe while the jack is out of operating position.

112. A machine for operating on shoes having, in combination, means for performing an operation progressively along the bottom margin of a shoe, a shoe supporting jack comprising means for clamping a shoe in position on the jack, said jack being movable to transfer the point of operation along the shoe, mechanism mounted in the jack for unclamping the shoe, and means including connections actuated from without the jack for actuating said mechanism automatically to unclamp the shoe.

113. A machine for operating on shoes having, in combination, a shoe supporting jack comprising mechanism acting automatically when thrown into operation to clamp a shoe placed on the jack, means for performing an operation on a shoe supported on the jack, mechanism mounted in the jack for resetting the clamping mechanism, and means including connections actuated from without the jack for actuating automatically the resetting mechanism.

114. A machine for operating on shoes having, in combination, a shoe supporting jack comprising mechanism acting automatically when thrown into operation to clamp a shoe placed on the jack, means for performing an operation on a shoe supported on the jack, mechanism mounted in the jack for unclamping the shoe and resetting the clamping mechanism, and means including connections actuated from without the jack for actuating automatically the unclamping and resetting mechanism.

115. A machine for operating on shoes having, in combination, a shoe supporting jack comprising mechanism acting automatically when thrown into operation to locate the shoe in a predetermined position longitudinally upon the jack, means for performing an operation on a shoe supported on the jack, mechanism mounted in the jack for resetting the locating mechanism, and means including connections actuated from without the jack for actuating automatically the resetting mechanism.

116. A machine for operating on shoes having, in combination, a shoe supporting jack comprising mechanism acting automatically when thrown into operation to locate a shoe in a predetermined position longitudinally on the jack and clamp the shoe in position, means for performing an operation on a shoe supported on the jack, mechanism mounted in the jack for resetting the locating and clamping mechanism, and means including connections actuated from without the jack for actuating automatically the resetting mechanism.

117. A machine for operating on shoes having, in combination, a shoe supporting jack comprising mechanism acting automatically when thrown into operation to locate the shoe in a predetermined position longitudinally on the jack and clamp the shoe in position, means for performing an operation on a shoe supported on the jack, mechanism mounted in the jack for resetting the locating and clamping mechanism and for unclamping the shoe, and means including connections actuated from without the jack for actuating automatically the resetting and unclamping mechanism.

118. A machine for operating on shoes having, in combination, means for performing an operation progressively along the bottom margin of a shoe, a shoe supporting jack provided with a hollow spindle, a jack support, a gimbal joint connecting the spindle and the support, a shaft within the spindle, a gimbal joint at the end of the shaft, mechanism on the jack operated by the rotation of the shaft, and means acting automatically to rotate the shaft through the gimbal joint.

119. A machine for operating on shoes having, in combination, means for performing an operation progressively along the bottom margin of a shoe, a shoe supporting jack comprising a spindle upon the upper end of which the body of the jack is mounted, a jack support movable in a substantially horizontal plane, a gimbal joint connecting the spindle and the support, a vertical shaft movable horizontally with the jack support, means for rotating said shaft, a shaft within the spindle, and a gimbal joint connecting the two shafts, the gimbal rings on both gimbal joints being mounted to turn about axes located in the same plane.

120. A shoe machine having, in combination, lasting mechanism, means comprising a stepped cam for effecting relative movement of the shoe and said mechanism to transfer the point of operation progressively and intermittently along the shoe, and means for imparting a continuous movement to the cam.

121. A machine for operating on shoes having, in combination, means for operating on a shoe, a jack supporting structure comprising a horizontally swinging arm, a jack support mounted to turn on a vertical axis on the free end of said arm, and a parallel motion link connected to the jack support to maintain the jack in a constant angular position with relation to the direction of feed.

122. A machine for operating on shoes having, in combination, means for operating on a shoe, a jack supporting structure comprising an arm mounted to swing horizontally to move the free end of the arm in the direction of feed, a support on which the arm is mounted, movable transversely of the direction of feed, a jack support mounted to turn on a vertical axis on the free end of said arm, and a parallel motion link connecting the jack support and the support for the arm to maintain the jack in a constant angular position with relation to the direction of feed.

123. The method of side lasting a shoe, the toe and heel ends of the upper of which have been previously molded, which consists in working the sides of the upper over the last progressively from the heel breast line to the tip line and securing the upper in lasted position.

124. The method of side lasting a shoe, the toe and heel ends of the upper of which have been previously molded, which consists in working the opposite sides of the upper over the last at the breast line of the shoe and securing these portions of the upper in lasted position, and then repeating said operation progressively along the sides of the last to the tip line of the shoe.

125. That improvement in the art of making shoes which comprises assembling an upper and an insole on a last with the forepart of the insole unsecured to the last, progressively lasting the shoe by repeatedly updrawing the upper and working it over the last while simultaneously engaging opposite sides thereof, and securing the upper in lasted position to the insole.

126. That improvement in the art of making shoes which comprises simultaneously drawing portions of an upper on opposite sides of a shoe in planes substantially parallel to the edge of the sole adjacent to said portions, securing said portions simultaneously to said sole, and repeating said operations progressively along the sides of the shoe.

127. That improvement in the art of making shoes, which comprises working an upper over a last, and then sewing the two sides of the upper simultaneously to a sole.

128. A machine of the class described comprising mechanism for working an upper over a last, in combination with mechanism constructed and operating to sew opposite marginal portions of the upper simultaneously to a sole.

129. A shoe machine comprising a pair of guides arranged to engage an abutment adjacent the opposite edges of a shoe sole, means tending to maintain said guides laterally in engagement with said abutment during a relative movement of the sole and guides to transfer the points of engagement of the guides along said abutment, in combination with mechanism for operating progressively upon the sole.

130. A machine of the class described comprising mechanism constructed and operating to engage the margin of an upper at opposite sides of a last and to pull simultaneously thereon to stretch the upper over the last, in combination with mechanism constructed and operating to sew opposite marginal portions of the stretched upper simultaneously to a sole upon the last.

131. A machine of the class described comprising grippers constructed and operating to engage the margin of an upper at opposite sides of a last, mechanism for moving the grippers in a general direction perpendicular to the last bottom and also inwardly from each side over said bottom, in combination with sewing mechanism constructed and operating to secure the stretched upper at both said sides simultaneously to the rib of a sole upon the last.

132. A machine of the class described, comprising gripping mechanism constructed and operating to seize the margin of an upper at opposite sides of a last and to pull the upper simultaneously at both sides first in a general direction perpendicular to the last and then inwardly, in combination with sewing mechanism constructed and operating to secure the upper by a lockstitch to the rib of an insole simultaneously at both sides thereof.

133. A machine of the class described comprising mechanism constructed and operating to last both sides of a shoe simultaneously, in combination with sewing mechanism constructed and operating to secure the upper of a shoe in lasted position simultaneously at both sides of the shoe, said sewing mechanism including a needle and looping means co-operating therewith to form a lockstitch.

134. A machine of the class described comprising gripping mechanism constructed and operating to stretch an upper over a last, in combination with sewing mechanism for securing the upper in lasted position, said sewing mechanism including an eye needle and devices co-operating therewith to form a loop lockstitch.

135. A lasting machine comprising a guide constructed and arranged to bear laterally against an abutment on a sole mounted upon the bottom of a last, in combination with movable gripping mechanism constructed and operating to stretch an upper over the last and controlled in position by said guide, and other mechanism for securing the upper in lasted position.

136. A lasting machine comprising a channel guide constructed and arranged to bear against the rib of a sole mounted upon the bottom of a last, in combination with mechanism constructed and operating to stretch an upper over the last including means connected with the channel guide for controlling the direction of movement of said mechanism, and other mechanism, for securing the upper in last position.

137. A machine of the class described comprising a channel guide constructed and arranged to bear against the rib of a sole mounted upon the bottom of a last, in combination with gripping mechanism constructed and operating to stretch an upper over the last, and sewing mechanism supported by said channel guide for securing the upper in lasted position.

138. A machine of the class described comprising a channel guide constructed and arranged to bear against the sewing rib of an insole mounted upon the bottom of a last, in combination with gripping mechanism constructed and operating to stretch an upper over the last, a curved needle supported by said channel guide and co-operating sewing mechanism for securing the lasted upper to said rib, and means for oscillating the needle to cause it to enter the rib at the side thereof opposite the channel guide.

139. A shoe machine having, in combination, a guide constructed and arranged to bear against the rib of a sole mounted upon the bottom of a last, means tending to maintain said guide laterally in engagement with said rib, and sewing mechanism controlled in position by said guide for securing an upper to said rib.

140. A machine of the class described having, in combination, a movable support, a channel guide and sewing devices mounted on said support, said devices including a curved needle, a looper and a thread finger, and mechanism for actuating said devices.

141. A shoe machine comprising a pair of guides, means tending to maintain said guides laterally in continuous engagement with a rib adjacent to opposite edges of a sole mounted upon a last, in combination with mechanism operating simultaneously on opposite sides of the last to secure an upper to said rib.

142. A shoe machine comprising a pair of channel guides, means tending to maintain said guides laterally in continuous engagement with the inside of the rib of an insole at opposite sides of a last upon which the insole is mounted, in combination with devices positioned by said guides for lasting and sewing the two sides of an upper simultaneously to said rib.

143. A shoe machine comprising a pair of guides, yielding means tending to maintain said guides laterally in continuous engagement with a rib adjacent to opposite edges of a sole, in combination with a lock for preventing movement in one direction of either of the guides with relation to the other, and means for rendering said lock operative for a portion of each cycle of operations only.

144. A shoe machine comprising a pair of guides, yielding means tending to maintain said guides continuously in engagement with a rib adjacent to opposite edges of a sole mounted on a last, in combination with two pairs of grippers and actuating mechanism therefor movable relatively to said guides and operating to seize opposite margins of an upper and stretch it over the last, and connections between said grippers and said guides for controlling the position of the grippers.

145. A shoe machine comprising a pair of guides, means tending to maintain said guides continuously in engagement with a rib adjacent to opposite edges of a sole, in combination with sewing mechanism adjacent to opposite edges of the sole and controlled in position by said guides for securing opposite margins of an upper to said rib.

146. A shoe machine comprising a pair of guides, means tending to maintain said guides continuously in engagement with a rib adjacent to opposite edges of a sole, in combination with sewing mechanism, including needles and looping devices all movable laterally with said guides, for securing opposite margins of an upper to said rib.

147. A shoe machine comprising a pair of swinging supports, a channel guide mounted upon each support, yielding means tending to maintain said guides continuously in engagement with a rib adjacent to opposite edges of a sole mounted on a last, grippers for stretching an upper over the last simultaneously at both sides, in combination with sewing mechanism, including a pair of needles, for securing the lasted upper to said rib, said grippers and needles being guided by said swinging supports.

148. A shoe machine comprising a work support, a pair of guides, means tending to move said guides laterally to maintain them in continuous engagement with a rib adjacent to opposite edges of a sole carried by said support, and additional means tending to move said support and guides vertically with relation to each other, in combination with one or more tools for operating upon the sole.

149. A shoe machine comprising grippers and actuating mechanism therefor constructed and operating to stretch an upper over a last by movements away from and inwardly over the last bottom, and sewing mechanism including a curved needle for securing the lasted upper in place, said grippers and needle being movable in the same plane.

150. A shoe sewing machine comprising a pair of needles and co-operating mechanism constructed and operating to form simultaneously a plurality of seams along opposite sides of a shoe, in combination with guides for controlling the operative relation of said needles and the shoe.

151. A shoe sewing machine comprising a plurality of sets of sewing instrumentalities and actuating mechanism therefor constructed and operating to form simultaneously a plurality of seams along opposite edges of a shoe, in combination with movable supports for said sets of instrumentalities which permit them to move toward and from each other while the seams are being formed.

152. A machine for forming stitches constructed and operating to secure the upper of a shoe to a rib on a sole simultaneously adjacent to opposite sides of the shoe and comprising a pair of curved needles movable in paths approximately at right angles to the sole edge, in combination with a pair of thread carrying loopers movable in paths approximately parallel to said edge and inside of said rib.

153. A shoe machine comprising mechanism constructed and operating to last both sides of a shoe simultaneously, in combination with sewing mechanism constructed and operating to secure the upper of the shoe in lasted position simultaneously at both sides of the shoe, together with stopping mechanism constructed and operating automatically to discontinue the operations of the lasting and sewing mechanisms when they reach a predetermined point adjacent the tip line of the shoe in their progressive action from near the breast line toward the toe.

154. A lasting machine having, in combination, two sets of mechanism including upper stretching and securing devices constructed and arranged to act on an upper at opposite sides of a shoe, means for actuating said devices to last progressively both sides of the shoe as the point of operation of said devices is transferred along the shoe, and supports on which said devices are mounted and which are movable towards and from each other to position said devices varying distances apart as the shoe bottom varies in width.

155. A lasting machine having, in combination, upper stretching devices, means for actuating said devices to last an upper progressively as the point of operation of said devices is transferred along a shoe on a last, a support on which said devices are mounted provided with a channel guide, and means acting on the support to press the channel guide yieldingly against the rib of the insole.

156. That improvement in the art of making shoes which comprises pulling simultaneously upon opposite marginal portions of an upper to stretch it over a last and sewing such portions simultaneously to the rib at opposite sides of a sole, and then repeating said operations progressively along the sides of the last.

157. That improvement in the art of making welt shoes which comprises gripping an upper on opposite sides of a last and stretching it by pulling simultaneously on both sides upwardly and inwardly sewing the stretched upper to the rib of an insole, and then repeating said successive pulling and sewing operations progressively along the sides of the last.

158. That improvement in the art of making welt shoes which comprises gripping an upper on opposite sides of a last and stretching it by pulling simultaneously upon both sides upwardly and inwardly relatively to a ribbed insole upon the last bottom and then while still holding the lasted upper under tension securing it to the rib of the insole by locked stitches, releasing the grip upon the upper, and then gripping other portions of the upper and repeating said operations.

159. That improvement in the art of making shoes which comprises engaging the two sides of an upper simultaneously and stretching it over a last, and then securing the upper by loop-lock thread fastenings to an insole while the upper is still held under tension.

160. That improvement in the art of making shoes which comprises forming an inturned flange at the toe of an upper, assembling the upper and a sole on a last with the forepart of the sole unsecured to the last but with the flange of the upper lying against the outer face of the sole, and then lasting the opposite sides of the shoe simultaneously.

161. That improvement in the art of making welt shoes which comprises assembling an upper and a rib insole on a last, drawing the upper over the last while simultaneously engaging opposite sides thereof, securing the upper in lasted position to the rib of the insole, and repeating said operations progressively along the sides of the last.

162. That improvement in the art of making welt shoes which comprises assembling an upper and a ribbed insole on a last with the forepart of the sole unsecured to the last, stretching the upper over the last while simultaneously engaging opposite sides thereof, and sewing the stretched upper in lasted position to the rib.

163. That improvement in the art of making shoes which comprises molding inturned and upstanding flanges at the margin of an upper about its toe end, assembling the upper and a ribbed sole on a last with the forepart of the sole unsecured to the last and with the flanges of the upper fitting the rib of the sole, then stretching the upper over the last simultaneously at opposite sides thereof, and securing it in lasted position to the rib.

164. That improvement in the art of making shoes which comprises molding one end of an upper with an inturned flange, assembling the molded upper with a sole on a last with the sole lying against the flange of the upper, and then simultaneously lasting the opposite sides of the shoe.

165. That step in the art of making shoes which comprises sewing an upper to a sole by forming seams simultaneously along opposite sides of the shoe.

166. That step in the art of making shoes which comprises sewing an upper to a sole on a last by forming simultaneously at opposite sides thereof a plurality of seams of lockstitches.

167. That step in the art of making shoes which comprises sewing a lasted upper to a ribbed insole on a last by forming simultaneously at opposite sides thereof a plurality of seams of loop lock stitches extending through the upper and rib approximately parallel to the face of the insole.

168. A lasting machine having, in combination, mechanism constructed and operating to engage the margin of an upper at opposite sides of a last and to pull simultaneously thereon to draw the upper over the last, in combination with mechanism constructed and operating to secure opposite marginal portions of the upper simultaneously to the rib of an insole upon the last.

ROBERT H. LAWSON.